(12) United States Patent
Aureglia et al.

(10) Patent No.: US 7,487,436 B2
(45) Date of Patent: Feb. 3, 2009

(54) SYSTEM AND METHOD IN A DATA TABLE MANAGING DELETION OPERATIONS IN RECURSIVE SCALABLE TEMPLATE INSTANCES

(75) Inventors: Jean-Jacques Aureglia, Saint Martin du Var (FR); Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 10/553,493

(22) PCT Filed: Feb. 27, 2004

(86) PCT No.: PCT/EP2004/003049

§ 371 (c)(1),
(2), (4) Date: Oct. 14, 2005

(87) PCT Pub. No.: WO2004/092978

PCT Pub. Date: Oct. 28, 2004

(65) Prior Publication Data

US 2006/0206496 A1       Sep. 14, 2006

(30) Foreign Application Priority Data

Apr. 18, 2003   (EP) .................................. 03368039

(51) Int. Cl.
   *G06F 17/00*       (2006.01)

(52) U.S. Cl. ...................... 715/212; 715/227
(58) Field of Classification Search ............... 715/212, 715/227
   See application file for complete search history.

(56) References Cited

U.S. PATENT DOCUMENTS 5,033,009 A    7/1991   Dubnoff (Continued)

FOREIGN PATENT DOCUMENTS

EP           0 690 394           1/1996

(Continued)

OTHER PUBLICATIONS

Lecolinet, "A molecular architecture for creating advanced GUIs", Proceedings, UIST 2003, published 2003 by ACM, p. 135-144.*
Rothermel, et al., "A Methodology for Testing Spreadsheets", ACM Transactions on Software Engineering and Methodology, vol. 10, No. 1, Jan. 1001, p. 110-147.*

(Continued)

*Primary Examiner*—Doug Hutton
*Assistant Examiner*—Amelia Rutledge
(74) *Attorney, Agent, or Firm*—Schmeiser, Olsen & Watts; William H. Steinberg

(57) ABSTRACT

A method and system for managing deletion operations in a recursive scalable template instance (RSTI) of an electronic data table having dimensions D1 and D2. The RSTI includes contiguous recursive element instances (REIs) ordered and aligned along D1. The REIs include scalable template instances (STIs). Contiguous elements are deleted, upon satisfying consistency condition(s), in a first STI. The RSTI is structured according to an associated recursive scalable template (RST) that includes a recursive element (RE) including at least one scalable template (ST). Each STI is structured according to an associated ST. The contiguous elements are structured according to a first ST associated with the first STI. A size of the first REI along dimension D1 is adjusted according to a size of a largest STI in the first REI. All REIs of the RSTI remain contiguous after the deleting and adjusting.

30 Claims, 23 Drawing Sheets

U.S. PATENT DOCUMENTS

| | | | |
|---|---|---|---|
| 5,272,628 A | 12/1993 | Koss | |
| 5,613,131 A | 3/1997 | Moss et al. | |
| 5,754,858 A | 5/1998 | Broman et al. | |
| 6,988,241 B1 * | 1/2006 | Guttman et al. | 715/220 |
| 7,051,276 B1 * | 5/2006 | Mogilevsky et al. | 715/209 |
| 7,089,256 B2 * | 8/2006 | Smialek | 707/102 |
| 7,246,311 B2 * | 7/2007 | Bargeron et al. | 715/251 |
| 2001/0049683 A1 | 12/2001 | Yoshikawa | |

FOREIGN PATENT DOCUMENTS

| | | |
|---|---|---|
| WO | WO 03/014987 | 2/2003 |

OTHER PUBLICATIONS

Szekely, et al., "Beyond interface builders: model-based interface tools", Proceedings of the INTERACT '93 and CHI '93 conference on Human factors in computing systems, publishied 1993, ACM, p. 383-390.*

Henrion: "What's Wrong with Spreadsheets—and How to Fix them with Analytica"; Lumina Decision Systems, Inc. Jul. 14, 2004 (10 pgs.).

Djang R W et al: Similarity Inheritance: A New Model of Inheritance for Spreadsheet VPLs; Visual Languages, 1998 Proceedings. 1998 IEEE Symposium on Halifax, NS, Canada, Sep. 1-4, 1998 at Nova Scotia, Canada (8 pgs.).

* cited by examiner

Recursive Scalable Template Instance Descriptor Table

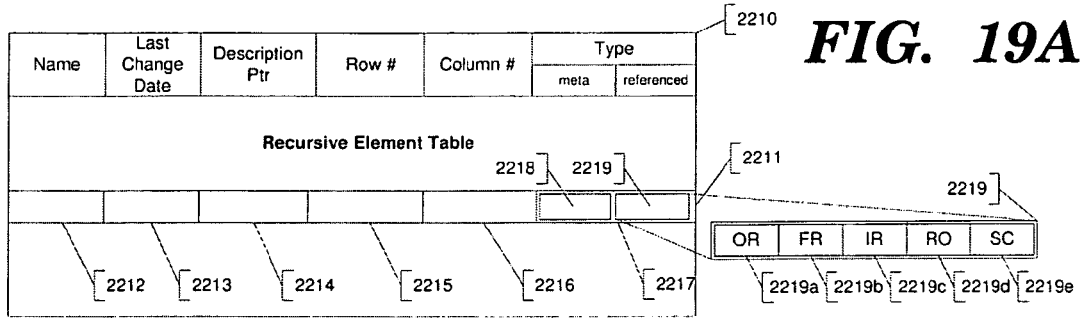
FIG. 19A
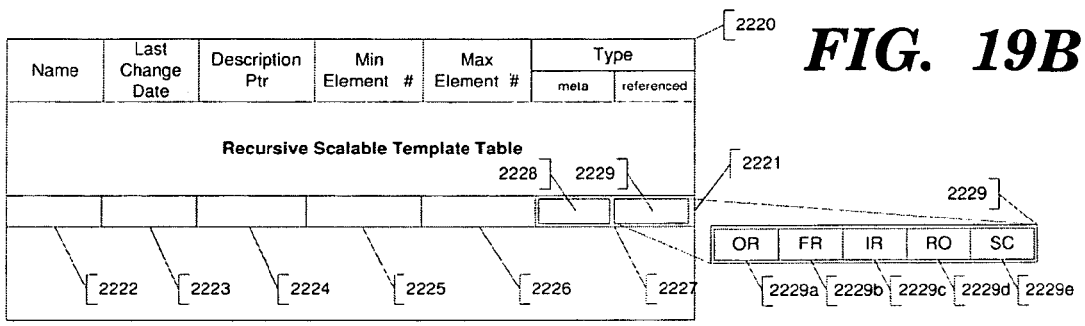
FIG. 19B
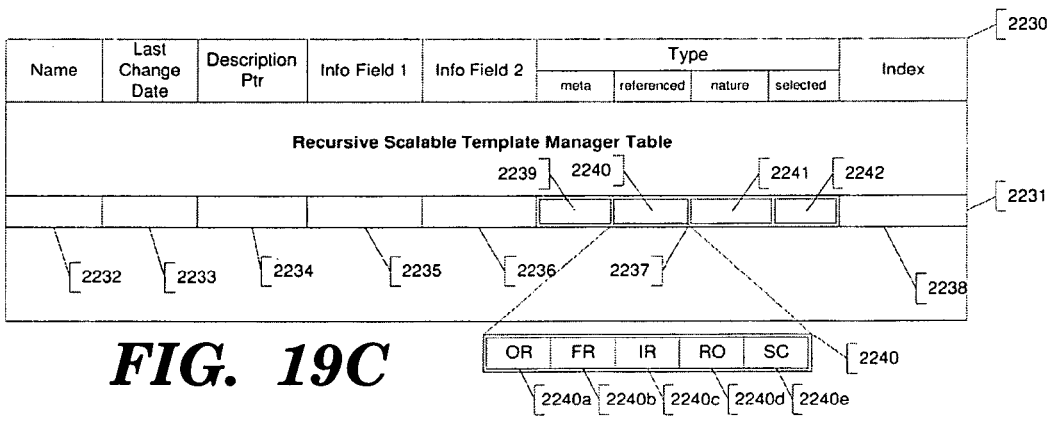
FIG. 19C
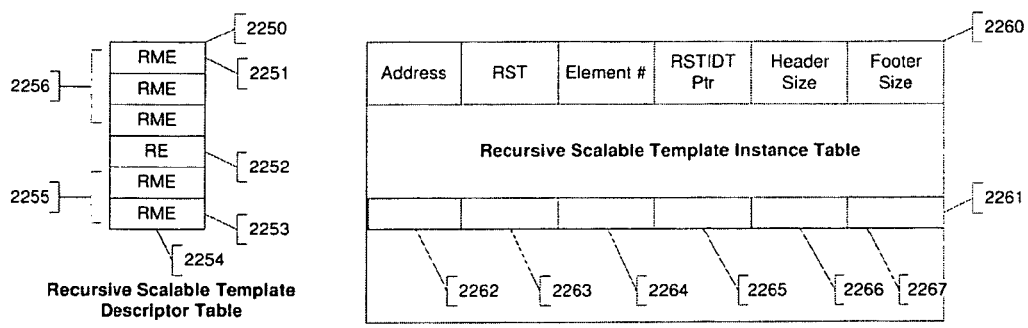
FIG. 19D
FIG. 19E

SYSTEM AND METHOD IN A DATA TABLE MANAGING DELETION OPERATIONS IN RECURSIVE SCALABLE TEMPLATE INSTANCES

TECHNICAL FIELD OF THE INVENTION

The present invention relates to the field of information processing by digital computers, more particularly to a method and system, in a data table, preferably in an electronic spreadsheet, for managing deletion operations in recursive scalable template instances.

BACKGROUND ART

One essential value of electronic spreadsheets is to organize data into columns and rows, while automating tedious calculations. A typical, common, and valuable example of such a set of data organized into columns and rows is a range of cells. Even if a range of cells receives a formal and strict definition within electronic spreadsheet environments, it is flexible enough so that information can be included in either a single range of cells or in a set of several ranges of cells. Ranges of cells therefore are quite useful objects. A range of cell can be defined and processed as a whole entity. For example it can be copied from one place to another place within the spreadsheet or from one spreadsheet file to another spreadsheet file. Ranges of cells are widely used in applications developed in the field of electronic spreadsheets. Most often, the ranges of cells are arranged according to some kind of structure, thus becoming structured ranges of cells. The contents of each cell is defined within an element, where an element is defined as a row of a structured range of cells, and then the same kind of element is repeated a certain number of times, to store/process a variable number of information pieces. Most of the time, several instances of similar structured ranges of cells are used. In the current context where no other tool is really available, instances of such similar structured ranges of cells are frequently created through cut/copy and paste operations. In order to keep a high level of intellectual control over growing quantities of information, human being needs to organize or structure this information. The hierarchical model is often used, because allowing nested structures. A typical and well known example of such a hierarchical structure is the directory tree of computer Operating Systems, such as DOS or Microsoft Windows. The root directory may contain files and/or a number of directories, which may themselves contain files and/or a number of directories, which may themselves contain files and/or a number of directories, etc. Recursivity help structure the information and maintain intellectual control over it. This need for recursivity applies as well, in spreadsheet environment to structured ranges of cells. When several instances of structured ranges of cells are defined and used in an electronic spreadsheet file, they are often themselves structured according to a specific superstructure arrangement or "array of structured ranges of cells" which can be duplicated between different electronic spreadsheet files or even within a single electronic spreadsheet file. Within such an array of structured ranges of cells, it is common to find several structured ranges of cells which follow the same intermediate superstructure, and also some other structured ranges of cells following other intermediate superstructures. The array of structured ranges of cells may then be viewed as a set of aggregated intermediate superstructures of structured ranges of cells. In the current context of conventional electronic spreadsheets, instances of such arrays of structured ranges of cells are frequently created through cut/copy and paste operations.

Creating a new instance of a structured range of cells is complex and lengthy, particularly because a conventional range of cells shows strong limitations:

(i) structure information (such as number of columns, number of rows), format information (such as font style, color or border), and contents information (such as formulas or raw— or informative—data) are mixed, (ii) the size of the range of cell is fixed at a given instant.

Therefore, when a spreadsheet user wants to create another range of cells with an identical structure, he/she needs to perform successively several operations. He/she needs to:

1. copy-paste an existing structured range of cells,
2. distinguish between areas containing raw— or informative—data and areas containing generic content such as formulas,
3. empty the copied structured range of cells of the copied raw data while trying to keep the structure, format and generic contents,
4. adjust the size of the structured copied range of cells to his new needs.
5. eventually, fill the raw data area with default values, in order to ease subsequent data entry.

Furthermore, before copying and pasting a structured range of cells, the user must prepare the place for the copied structured range of cells, with the risk of overwriting, and therefore loosing the preexisting information at the destination location. This chain of operations rapidly becomes tedious, lengthy and prone to error, especially when manipulated structured ranges of cells increase in size and complexity.

Updating a structured range of cells is also very often complex, lengthy and prone to error. Such updates include additions of new elements and modifications of existing elements. Several types of modifications can be performed without any specific problem in an electronic spreadsheet environment. However, this is not the case for some modifications, for instance for insertions. For example, if a row is added by means of a conventional function such as the spreadsheet row insertion method, the created row will be empty. This means that the value for every cell of every element needs to be entered. Entering data or executing copy/paste operations represents an important workload for the user, while the content of each element is known to a certain extent, and should follow the general structure of the structured range of cells. Moreover, normal spreadsheet functions such as the row insertion function may jeopardize the contents of some neighbour elements. A good example of an insertion jeopardising neighbour elements is the insertion of a row in a range of cells in which, on every row, a cell such as C17 or more generally (Cn), is pointing to a cell in the previous row, through a formula such as C16+B17, or more generally (Cn−1)+(Bn). After row insertion between rows 16 and 17, the formula in cell C18 becomes C16+B18 instead of the generic formula C17+B18, or more generally after row insertion between rows (n−1) and (n), the formula in cell (Cn+1) becomes (Cn−1)+(Bn+1) instead of the generic formula (Cn)+(Bn+1). As a second exemple, there are cases where modifications must be done consistently throughout the structured range of cells. Today, this can only be done using specific copy-paste operations applied to the exact area to be modified. This may prove to be very difficult, especially when manipulated structured ranges of cells increase in size and complexity.

Deleting an element of a structured range of cells is an operation prone to error. As a matter of fact, normal spreadsheet functions such as the row deletion function may jeopardize the contents of some neighbour elements, leading to unresolved references (#REF results) or, even worse to wrong formulas that may be difficult to identify. Solving this problem requires additional "context intelligence", taking into account the structure of the structured range of cells in which the element deletion occurs. Another need appears at the time the user invokes the conventional Delete function after selection in the spreadsheet of one or a plurality of cells. If the selection belongs to a structured range of cells, calling the Delete function by means of a menu or by pressing the "Delete" key, leaves room to ambiguity as to what the user wants to perform. Removing this ambiguity can only be done today by selecting the exact area to be deleted, which may prove to be very difficult, especially as manipulated structured ranges of cells increase in size and complexity. Solving this problem requires additional "context intelligence" to detect this situation, take advantage of the structure of the structured range of cells and offer the relevant choice to the user.

When recusivity is involved, creating a new instance of an array of structured ranges of cells is even more complex and lengthy, particularly because an array of structured range of cells involves a twofold level of structure:

At the lower level a set of multiple, and even different, instances of structured ranges of cells must be created. As previously mentioned, this operation is itself complex, lengthy and prone to error due to the limitations of conventional ranges of cells.

At the higher level, the creation of an instance of an array of structured range of cells would require that the spreadsheet user carry on several operations:
1. Identify an existing instance of an array of structured ranges of cells, used as a reference for creating the new instance.
2. Prepare the place, at the destination location, to hold the new instance, at the risk of possibly overwriting, and then loosing, any pre-existing information.
3. Copy-Paste the reference instance of the array of structured range of cells onto the destination location.
4. Adjust the structure of the newly created instance of an array of structured ranges of cells to his/her new needs, by either deleting or introducing within the array one or several intermediate superstructures of instances of structured ranges of cells.
5. Clean the content of each instance of structured ranges of cells comprised within the array.
6. Eventually fill each instance of structured ranges of cells with the relevant default values.

Deleting an object comprised in an instance of an array of structured ranges of cells is an operation prone to error. Besides the aforementioned risk of creating unresolved references when individual cells or ranges of cells are deleted, the conventional tools available in electronic spreadsheet environments are not keen to assist the spreadsheet user when a deletion operation is invoked after selection of a range of cells, in a recursive structure. Indeed if such a selected range of cells belongs to an instance of an array of structured ranges of cells, the scope of the deletion operation remains ambiguous: either deleting the contents of the IN fields belonging to the selected range of cells, or deleting the elements of the instance of the structured range of cells overlapping with the selected range of cells, or deleting the instances of structured ranges of cells overlapping with the selected range of cells, or even deleting the whole instance of the array of structured ranges of cells comprising the selected range of cells. To remove this ambiguity, the spreadsheet user has to carefully identify and then select the exact relevant range of cells so that the deletion operation exactly matches his needs. When the array of structured ranges of cells becomes large and complex, the previous operation becomes clearly difficult and prone to error. Solving this problem requires further additional "context intelligence" to detect this situation, take advantage of the twofold level of structure of the array of structured ranges of cells and offer the relevant choice to the user. U.S. Pat. No. 5,033,009 entitled "System for generating worksheet files for electronic spreadsheets" Steven J. Dubnoff, Mar. 3, 1989, is an interesting document of prior art. This invention develops the concepts of pattern data and variable data that may be integrated to generate a worksheet file through a worksheet file generator. However, this invention shows many limitations preventing it from solving the set of issues presented here above and, in particular:

It aims at producing a new output spreadsheet from a set of two input files, while there is a need, within a user application environment, to create and manipulate new entities within an existing electronic spreadsheet file, that the user is familiar with.

It contains no mechanism allowing the direct update of the output spreadsheet, other than the regular spreadsheet tool.

It contains no capability to manipulate within the same spreadsheet file, a variable number of different structures and a variable number of instances of each of those structure. The granularity is limited to the spreadsheet file, while the required granularity is that of a structured range of cells.

The so called "file format specification" really mixes structure information (such as number and relative position of columns and rows), presentation information (such as font, color, background, etc.), contents information (such as formulas, etc.).

SUMMARY OF THE INVENTION

As defined in independent claims, the present invention is directed to a method, system and program, in a multi-dimensional electronic data table comprising a plurality of data, preferably a spreadsheet, for managing deletion operations in a recursive scalable template instance; a recursive scalable template instance comprising a variable number of contiguous recursive element instances ordered and aligned along a first data table dimension and structured according to a recursive scalable template; said recursive scalable template comprising a recursive element including one or a plurality of scalable templates; each recursive element instance having a variable size along said first data table dimension and a same size along a second data table dimension; a recursive element instance comprising one or a plurality of scalable template instances; each scalable template instance of each recursive element instance being aligned along said first data table dimension; each scalable template instance within each recursive element instance being aligned along a second data table dimension; a scalable template instance comprising a variable number of elements structured according to a scalable template; an element being defined as a range of data; a range of data comprising one or a plurality of data. The method comprises the steps of:

detecting a delete command for deleting one or a plurality of contiguous elements selected in a scalable template instance of a recursive element instance;

identifying:
the scalable template instance where to delete said one or a plurality of selected elements;

the one or plurality of selected elements, in the scalable template instance, to delete;
the scalable template associated with said scalable template instance;
identifying:
the recursive scalable template instance and the recursive element instance comprising the identified scalable template instance;
deleting in the identified scalable template instance, the one or a plurality of selected elements; all remaining elements of the identified scalable template instance remaining contiguous;
adjusting the size of the identified recursive element instance along said first data table dimension according to the size of the largest scalable template instance in said recursive element instance; all remaining recursive element instances of the identified recursive scalable template instance remaining contiguous.

In a particular embodiment, the method comprises the further steps of:
detecting a delete command for deleting in a recursive scalable template instance, one or a plurality of selected contiguous recursive element instances;
identifying:
the recursive scalable template instance where to delete said one or a plurality of recursive element instances;
the one or plurality of recursive element instances to delete in the recursive scalable template instance;
the recursive scalable template associated with said recursive scalable template instance;
deleting in the recursive scalable template instance, the one or a plurality of selected contiguous recursive element instances; all remaining recursive element instances of the identified recursive scalable template instance remaining contiguous.

Further embodiments of the invention are provided in the appended dependent claims.

Acronyms

The following acronyms will be used for more conciseness:
EF stands for Element Format
EP stands for Element Profile
MEF stands for Meta-element Format
MEP stands for Meta-element Profile
RE stands for Recursive Element
RME stands for Recursive Meta-Element
RST stands for Recursive Scalable Template
RSTI stands for Recursive Scalable Template Instance
ST stands for Scalable Template
STI stands for Scalable Template Interface

BRIEF DESCRIPTION OF THE DRAWINGS

FIGS. 19A, 19B, 19C, 19D, 19E and 19F respectively illustrate the structure of the RE Table (RET), of the RST Table (RSTT), of the RST Manager Table (RSTMT), of a RST Descriptor Table (RSTDT), of the RSTI Table (RSTIT), and of a RSTI Descriptor Table (RSTIDT).

DETAILED DESCRIPTION OF THE PREFERRED EMBODIMENT

System Hardware

Figure 1A:
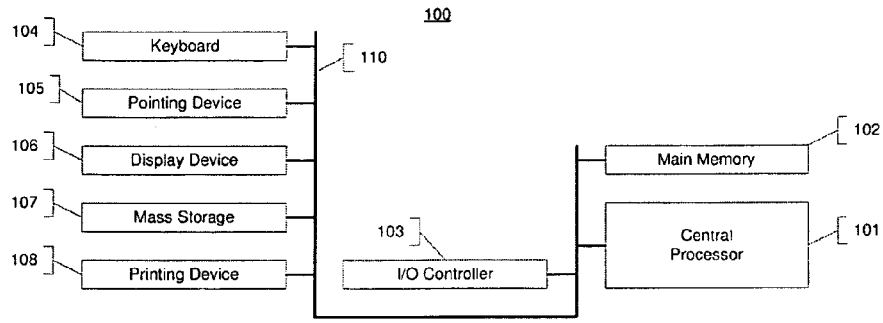
FIG. 1A is a schematic view of a computer system in which the present invention may be embodied.
Figure 1B:
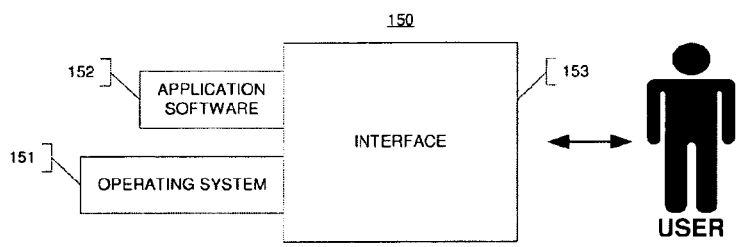
FIG. 1B is a schematic view of a software system including an operating system, an application software, and a user interface for carrying out the present invention.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In a preferred embodiment, the computer system 100 includes an IBM-compatible personal computer, which is available from several vendors (including International Business Machine—IBM Corporation of Armonk, N.Y.). Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the central processor 101 of the system 100. The system 100 receives user commands and data through user interface 153; these inputs may then be acted upon by the system 100 in accordance with instructions from operating module 151 and/or application module 152. The interface 153, which is preferably a graphical user interface (GUI), also serves to display results, whereupon the user may supply additional inputs or terminate the session. In a preferred embodiment, operating system 151 and interface 153 are Microsoft Win95, available from Microsoft Corporation of Redmond, Wash. Application module 152, on the other hand, includes a spreadsheet notebook of the present invention as described in further detail herein below.

Interface

The following descriptions will focus on the presently preferred embodiments of the present invention implementing the user interfaces described in international patent application PCT/EP 02/09483 (IBM's reference FR9 2001 0029) entitled "System and method in an electronic spreadsheet for exporting-importing the content of input cells from a scalable template instance to another" by Aureglia et al.

Recursive Scalable Template Management

A. Introduction

The Concept of Scalable Templates (ST's)

Conventional electronic spreadsheets include built-in means allowing the spreadsheet users to easily organize data into columns and rows, while automating tedious calculations. This set of organized data can be included in either a single range of cells or in a set of several ranges of cells. The range of cells is a quite useful, and widely used object in an electronic spreadsheet environment. It can be defined and processed as a whole entity. According to the invention described in international patent application PCT/EP 02/09483 (IBM's reference FR9 2001 0029), systems and methods are available to allow an electronic spreadsheet user to:

Define a structure, for a range of cells, including:
  (i) an optional header part made of one or more meta-elements;
  (ii) a mandatory body part made of one or more elements;
  (iii) an optional footer part made of one or more meta-elements.
  The structure of each meta-element of the header part may be defined in terms of attributes by a MEF, and in terms of contents by a MEP.
  The structure of all elements of the body part, may be defined in terms of attributes by an EF, and in terms of contents by an EP.
  The structure of each meta-element of the footer part may be defined in terms of attributes by a MEF, and in terms of contents by a MEP.
  This structure is called a ST. In summary, the ST defines a structure by specifying the number of fields, by referring to a couple of EF and EP that defines all body elements, and, optionally, by referring to one or several couples of MEF and MEP that define each meta-element of the header part or the footer part.
Manage ST's and underneath defined objects, known as EF's, EP's, MEF's and MEP's.
Create, or update EF's, MEF's.
Create, or update EP's, MEP's.
Create, or update a ST.
Create a STI abiding by a defined ST.
Remove one or a plurality of elements from a STI.
The above set of functions is supported by a set of tools:
the "RST Manager" method, or RSTM method for short;
the "EF Editor" method, or EFE method for short;
the "EP Editor" method, or EPE method for short;
the "ST Editor" method, or STE method for short;
the "ST Instanciator" method, or STI method for short;
the "STI Deletion Manager" method, or STIDM method for short.

The concept of Recursive Scalable Templates (RST's)

Figure 17A:
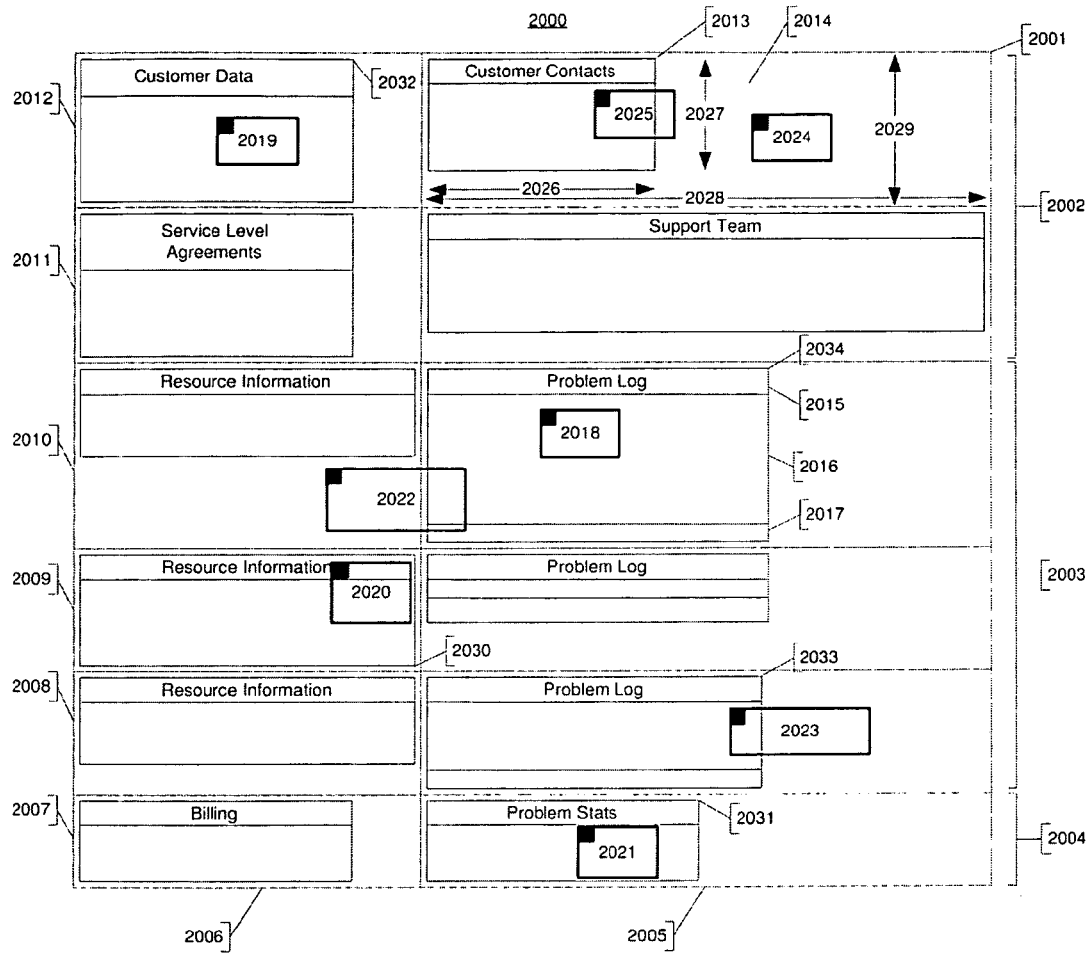
FIG. 17A illustrates the logical structure of a RSTI, according to the preferred embodiment of the present invention.
Figure 17B:
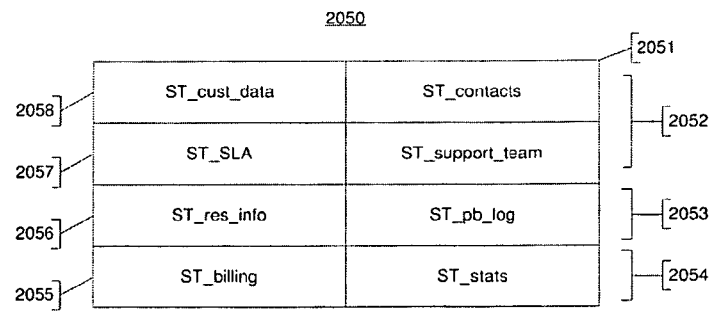
FIG. 17B illustrates the logical structure of a RST, according to the preferred embodiment of the present invention.

Having introduced the concept of ST's and of STI's, the concept of RST's and RSTI's becomes easier to capture. Indeed a RST can be seen as a two level structure. The highest level is logically equivalent to the structure of a ST, as a set of structured RE and RME's which can be logically mapped to element and meta-elements. The recursive nature of a RST appears at the lower structural level, because the RE and RME's are objects which themselves comprise STI's (instead of conventional spreadsheet cells, as it is the case for elements and meta-elements). In other words, a RST is a tiered structure of ST's. When a RST is instanciated, the same similarities can be articulated to describe the structure of the resulting RSTI. At a higher level, a RSTI presents a structure logically equivalent to the structure of a STI, but constituted by container ranges instead of individual cells. Within each container range, a lower level structure is present in the form of STI's. As a result a RSTI can be seen as a STI itself containing STI's in lieu of conventional cells. Such an object was therefore first introduced under the name of "an array of structured ranges of cells". Referring now to FIGS. 17A and 17B, a simple example of such a RST and RSTI will be used to illustrate the present application.

By referring first to FIG. 17B, the RST 2051 named "RST_customer" defines the structure followed by a Network Services Provider to record all the various data corresponding to a customer receiving networking services. This RST is organized around a structure comprising:

A header part 2052 where the customer data (such as company name, address, business, contract schedule, etc.) are recorded according to the structure of a ST named "ST_cust_data", where the customer contact points (such as CEO, CIO, CFO, managers, etc.) are recorded according to the structure of a ST named "ST_contacts", where the contracted service level agreements are recorded according to the structure of a ST named "ST_SLA", and where the customer support team (such as the transition manager, the delivery manager, the solution manager, etc.) is recorded according to the structure of a ST named "ST_support_team".

A body part 2053 where is recorded, for each customer resource receiving services from the service provider, the information required to manage this resource (such as location, IP address, configuration file, etc.) according to the structure of a ST named "ST_res_info", and where is recorded the current problem log for the same resource according to the structure of a ST named "ST_pb_log".

A footer part 2054 where is recorded the billing status for this customer, according to the structure of a ST named "ST_billing", and where are recorded the problem statistics for the customer managed resources, according to the structure of a ST named "ST_stats".

By referring then to FIG. 17B, the RSTI 2001 follows the structure of the RST 2051 "RST_customer". Indeed it is also organized around a structure comprising a header part 2002, a body part 2003, and a footer part 2004. The header part 2002 contains four STI's which are themselves organized according to the structure of the RST header part 2052, and which abide by the structures of the ST's ""ST_cust_data", "ST_contacts", "ST_SLA", and "ST_support_team". The body part 2003 is constituted by three different records 2010, 2009, and 2008, each of them organized according to the structure of the RST body part 2053, that is comprising two STI's which abide by the structures of the ST's "ST_res_info", and "ST_cpb_log". Finally the footer part 2004 contains two STI's which are themselves organized according to the structure of the RST footer part 2054, and which abide by the structures of the ST's "ST_billing", and "ST_stats".

Most often also, several instances of similar recursively structured ranges of cells are used. Within the logic of our example, as described above and illustrated in FIG. 17A, a similar recursively structured range of cells is created for each customer in a new sheet. In the current context of electronic spreadsheet environment, where no other tool is really available, instances of such similar recursively structured ranges of cells are frequently created through cut/copy and paste operations. We have already described the limitations of conventional tools for creating STI's. The creation of a RSTI is even more difficult and prone to errors due to the twofold structure of a RSTI. Indeed the additional difficulty appearing when manipulating such recursive objects is to determine the structural level at which should occur a given operation (such as copy-pasting a recursive object, identifying areas containing row data or structure specific data within a recursive object, adjusting the size of a recursive object, emptying some fields within a recursive object, correcting any error resulting from the previous operations applied to a recursive object, and filling default values in some fields within a recursive object). Furthermore, before the copy-paste operation, on the recursively structured range of cells, takes place, the user must prepare the place for the copied recursively structured range of cells, at the destination location, with the risk, if this is not done, of overwriting, and therefore loosing the preexisting information at this location. The chain of operations described above rapidly becomes tedious, lengthy and prone to error, mainly because the size and complexity of recursively structured ranges of cells are quickly reaching the limits of human beings, when using conventional tools. In a preferred embodiment of the present invention, a user-friendly solution to these problems is proposed by allowing the electronic spreadsheet user to:

Define a superstructure, for a range of cells, including
  (i) an optional header part made of one or more RME's;
  (ii) a mandatory body part made of one RE's;
  (iii) an optional footer part made of one or more RME's.
The structure of each RME of the header part is defined as an ordered collection of superstructure fields, each corresponding to a ST. The structure of all RE's of the body part, is defined as an ordered collection of superstructure fields, each corresponding to a ST. The structure of each RME of the footer part is defined as an ordered collection of superstructure fields, each corresponding to a ST. This superstructure is called a RST. In summary, the RST defines a superstructure by specifying the number of fields, by referring to a RE that defines the body part, and, optionally, by referring to one or several RME's that define the header part and/or the footer part.

Manage RST's and underneath defined objects, known as RE's and RME's.

Create, or update RE's.

Create, or update RME's.

Create, or update a RST.

Create a RSTI abiding by a defined RST.

The above set of functions is supported by a set of tools:
the "RST Manager" method, or RSTM method for short;
the "RE Editor" method, or REE method for short;
the "RST Editor" method, or RSTE method for short;
the "RST Instanciator" method, or RSTI method for short.

This set of functions is defined in much further details, in the following sections.

In our example, a RST is developed to define the generic structure of the "NSP Customer Repository" and thus to facilitate the creation of several instances of said "NSP Customer Repository". Now referring to FIG. 17B, the RST defining the structure of "NSP Customer Repository":

(i) Specifies the number of superstructure fields, 2 (two) in our example.

(ii) Defines the header part of 2052 "NSP Customer Repository", through the following steps:
  Defining the structure of a first ST "ST_cust_data", and of a second ST "ST_contacts".
  Defining the structure of a first RME 2058 comprising the two previous ST's.
  Defining the structure of a third ST "ST_SLA", and of a fourth ST "ST_support_team".

Defining the structure of a second RME 2057 comprising the two previous ST's.

(iii) Defines the body part 2053 of "NSP Customer Repository", through the following steps:

Defining the structure of a fifth ST "ST_res_info", and of a sixth ST "ST_pb_log".

Defining the structure of a RE 2056 comprising the two previous ST's.

(iv) Defines the footer part 2054 of "NSP Customer Repository", through the following steps:

Defining the structure of a first ST "ST_billing", and of a second ST "ST_stats".

Defining the structure of a RME 2055 comprising the two previous ST's.

From the above RST 2051, one or several RSTI's, such as the one illustrated in FIG. 17A, can be created, at very limited cost to the user and thus avoiding the many risks for error.

Deleting an Object From a RSTI, Deleting a RSTI

Deleting an element of a RSTI also is an operation prone to error. With our example of a "NSP Customer Repository", the spreadsheet user may have to deal for instance with the retirement of a member in the customer support team, or the removal of an existing customer managed resource, or the deletion of a duplicated problem in a problem log. Besides the difficulties inherent to the deletion of existing elements within a STI, as previously discussed, the deletion of existing pieces of information within a RST is even more challenging because:

Deleted objects may be defined at different structural levels. For instance, the deletion of a retired customer support team member or of a duplicated problem in a problem log would consist in removing an existing element from a defined STI (respectively the "Support Team" and "Problem Log" STI's), whereas the removal of an existing customer managed resource will ask to delete within the body part 2003 of the RSTI 2001 a pair of STI's "Resource Information" and "Problem Log" according to the structure of the associated RE 2056. Cautious deletion manipulations must be therefore performed by the spreadsheet user as any error will have to be recovered by preserving the two level structure of the RSTI.

The side effect resulting from the deletion of an existing object may be detrimental either at the lower structural level of the RSTI (for instance by corrupting a STI defined as part of the RSTI), or also at the higher structural level by corrupting the organisation of the various STI's which constitute the RSTI. The former case has already been addressed in the description of the deletion operation within a STI. The later case can be illustrated when the spreadsheet user needs to remove an existing customer managed resource at the top of the body part 2003 of the RSTI 2001. In this case the top "Resource Information" STI and the top "Problem Log" STI 2034 must be removed from the RSTI 2001. As the heights of the two removed STI's are not necessarily equal, the result of the deletion operation is that most probably the two lower existing STI's belonging to the body part 2003 will no longer be horizontally aligned, corrupting therefore the superstructure of the RSTI 2001.

In a preferred embodiment of the present invention, a user-friendly solution to these problems is proposed by allowing the electronic spreadsheet user to:

select what is to be deleted (cells content, or STI element, or RE, or whole RSTI), upon the automatic prompt triggered by calling the conventional Delete function, delete, within a RSTI, either the contents of input fields within selected cells, or the contents of input fields within selected elements, or the content of input fields within selected STI, or the whole selected elements, or the selected RE's, while maintaining the overall integrity of the RSTI, or delete a whole RSTI.

The above function is called the "RSTI Deletion Manages" method, or RSTIDM method for short, and is defined in much further details, in the following sections.

B. Concepts and Vocabulary

The purpose of this section is to formalize both some concepts (with associated objects) and some vocabulary defined within the scope of the present invention. In the following descriptions, it is assumed that spreadsheets are in two dimensions (2D), so that tables and structures can be described in a 2D environment. Moreover it is assumed that tables are organized vertically, so that the table headings are on the top of the table instead of being on its left. This allows to significantly clarify the description of the various original concepts, objects, and methods which are part of the present invention, but this does not limit in any way the scope of the invention. In other words, the underneath description can be generalized to environment with either 2D tables organized horizontally or with 3D tables, without departing from the spirit of the present invention.

B1. Preliminary Definitions

Structured Range of Cells: a structured range of cells is a range of cells that abides by some kind of structure organizing the data into rows and columns. Columns define fields aimed at containing the same kind of information on each row. Rows define records (or elements).

Table: the word table can be used to designate a structured range of cells.

Field: a field is a labeled column in a database or table that contains the same kind of information for each record (or element). For example, a customer table may contain fields labeled Name, Address and Tel #.

By extension, in a given record (or element), a given field refers to the cell located at the intersection of the record (or element) and the given field (labeled column).

The above definitions are for a 2D environment where columns define fields and rows define records. They can be transposed in a 2D environment where rows define fields and columns define record. They can also be transposed in a 3D environment, where, for example, sheets define records.

IN/OUT Cell: a cell is specified as "IN" cell when assumed to be used for recording user provided information. A cell is specified as "OUT" cell when assumed to be used for producing information (generally obtained through formulas whose arguments refer directly or indirectly to "IN" cells).

B2. Object Definitions

The following objects are defined to help the understanding of the invention.

Element Format: an EF is a spreadsheet object defining the structure of an element within a 2 dimensions or a 3 dimensions range of cells, in terms of format attribute:

Background attributes (color, pattern, etc. . . . ),

Alignment attributes (horizontal, vertical, text wrapping, alignment across columns, etc. . . . )

Font attributes (size, color, etc. . . . )

Line attributes (type, color, etc. . . . )

Protection of the field and any other conventional format attribute.

Meta-Element Format: a MEF is a spreadsheet object defining the structure of a meta-element within a 2 dimensions or a 3 dimensions range of cells, in terms of format attribute:

Background attributes (color, pattern, etc. . . . ),
Alignment attributes (horizontal, vertical, text wrapping, cell merging, etc. . . . )
Font attributes (size, color, etc. . . . )
Line attributes (type, color, etc. . . . )
Protection of the field
and any other conventional format attribute.

Element Profile: an EP is a spreadsheet object defining the structure of an element within a 2 dimensions or a 3 dimensions range of cells, in terms of content and destination:

formulas for fields to be computed from data comprised in other fields of the same element, or in other fields of another element or meta-element of the same STI, or even in other fields outside the STI.
field default values to be assigned at element creation time.
destination of the cells (data entry for "IN" cells or data produced for "OUT" cells).

Meta-Element Profile: a MEP is a spreadsheet object defining the structure of a meta-element within a 2 dimensions or a 3 dimensions range, in terms of content and destination:

formulas for cells to be computed from data comprised in other cells of the same element, or in other cells of another element or meta-element of the same STI, or even in other cells outside the STI.
cell default values to be assigned at meta-element creation time.
destination of the cells (data entry for "IN" cells or data produced for "OUT" cells)

Scalable Template (also referred to as "Template" or "ST"): A ST is a spreadsheet object defining the structure of a 2 dimensions or a 3 dimensions range of cells, in terms of {element+meta-elements} layout. The word "scalable" refers to the capability of the ST of defining a given structure for variable size (e.g. ranging from a minimum value to a maximum value) range of cells. The ST defines a structure by:

specifying the number of fields,
by referring to a couple of EF and/or EP that defines each body element, and,
optionally, by referring to one or several couples of MEF's and/or MEP's.

In a 2 dimensions environment, such MEF's/MEP's are either located above the EF/EP, constituting the ST "header" part, or located below the EF/EP, constituting the ST "footer" part. Either the ST "header" part or the ST "footer" part, or both of them may be empty.

When the element and meta-element references are only constituted by EP's and MEP's, then the ST only carries contents information and can thus be named Scalable Profiled Template.

When the element and meta-element references are only constituted by EF's and MEF's, then the ST only carries format information and can thus be named Scalable Formatted Template.

When the element and meta-element references are constituted by any combination of both EP's and EF', then the ST carries both profile and format information and can thus be named Scalable Profiled & Formatted Template.

Scalable Template Instance (also referred to as "Instance" or "scalable instance" or "STI"): A STI is a spreadsheet object abiding by the structure of a defined ST: a scalable formatted template, or a scalable profiled template, or a scalable profiled & formatted template. An STI may be viewed as a heir object of a ST. It contains a variable number of elements (at least one) containing information, in each field, corresponding to the parent structure, and constituting the "body" part, plus optionally one or several meta-elements, as defined by the ST, and constituting the "header" part and the "footer" part of the STI.

Element: An element is a spreadsheet object belonging to a STI, and made of elementary fields abiding either by an EF, or by an EP, or by a couple (EF, EP) found in the parent structure (respectively scalable formatted template, or scalable profiled template, or scalable profiled & formatted template). Without loosing any generality, it is assumed that an element always abides by a couple (EF, EP), where either the EF or the EP can be reduced to a void object.

Meta-Element: A meta-element is a spreadsheet object belonging to an STI, and made of elementary cells abiding either by a MEF, or by a MEP, or by a couple (MEF, MEP). Without loosing any generality, it is assumed that a meta-element always abides by a couple (MEF, MEP), where either the MEF or the MEP can be reduced to a void object.

Recursive Element: A RE is a spreadsheet object belonging to a RST, constituting the body part of the RST, and made of elementary fields used to record the names of ST's. A RE has a structure similar to the structure of an element, but instead of being instanciated as a range of cells, is instanciated as a range of STI's.

Example: The RE of the RST 2051, as illustrated in FIG. 17B, corresponds to the structure 2056, constituting the body part 2053 of this RST, and made of two fields which respectively contain the name of the ST's "ST_res_info" and "ST_pb_log".

Recursive Meta-element: A RME is a spreadsheet object belonging to a RST, belonging to the header and/or footer part of the RST, and made of elementary fields used to record the names of ST's. A RME has a structure similar to the structure of a meta-element, but instead of being instanciated as a range of cells, is instanciated as a range of STI's.

Example: A RME of the RST 2051, as illustrated in FIG. 17B, corresponds to the structure 2058, belonging to the header part 2052 of this RST, and made of two fields which respectively contain the name of the ST's "ST_cust_data" and "ST_contacts".

Recursive Scalable Template (also referred to as "Recursive Template" or "RST"): A RST is a spreadsheet object defining the superstructure of a 2 dimensions or a 3 dimensions range of cells, in terms of {RE+RME's} layout. The word "scalable" refers to the capability of the RST of defining a given superstructure for variable size (e.g. ranging from a minimum value to a maximum value) range of cells. The RST defines a superstructure by:

specifying the number of fields,
by referring to a RE that defines the body part of the RST, and,
optionally, by referring to one or several RME's.

In a 2 dimensions environment, such RME's are either located above the RE, constituting the RST "header" part, or located below the RE, constituting the RST "footer" part. Either the RST "header" part or the RST "footer" part, or both of them may be empty.

Example: A RST 2051 is illustrated in FIG. 17B. It is constituted by a header part 2052, a body part 2053 and a footer part 2054. The header part comprises two RME's 2058 and 2057, both with two fields, and which respectively contain the name of the ST's "ST_cust_data", "ST_contacts" and "ST_SLA", "ST_support_team". The body part comprises one RE 2056 with two fields which respectively contains the name of the ST's "ST_res_info", "ST_pb_log". The footer part comprises one RME 2055 with two fields which respectively contains the name of the ST's "ST_billing", "ST_stats".

Recursive Scalable Template Instance (also referred to as "Recursive Instance" or "Recursive Scalable Instance" or as RSTI): A RSTI is a spreadsheet object abiding by the structure of a defined RST. A RSTI may be viewed as a heir object of a RST. It contains a variable number of container rows (at least one) containing one or a plurality of STI's, corresponding to the parent RE structure, and constituting the "body" part, plus optionally one or several other container rows containing one or a plurality of STI's, corresponding to the parent RME's structure, and constituting the "header" part and the "footer" part of the RSTI.

> Example: A RSTI 2001 is illustrated in FIG. 17A. This RSTI abides by the RST 2051 as illustrated in FIG. 17B. It is constituted by a header part 2002, a body part 2003 and a footer part 2004. The header part comprises two container rows 2012 and 2011. The body part comprises three container rows 2010, 2009 and 2008. The footer part comprises one container row 2007. Each container row contains two container ranges, such as the container range 2014 which can be seen as the intersection of the top container row 2012 and of the right container column 2005. Each container range contains a STI which abides by the structure of the ST defined as part of the RE or RME member of the RST 2051. For instance the STI 2034 comprised within the container range intersection of the container row 2010 and of the container column 2005 abides by the structure of the ST named "ST_pb_log", as defined in the RME 2056 of the RST 2051, and is itself constituted by a header part 2015, a body part 2016 and a footer part 2017.

Container rows: a container row is a spreadsheet object belonging to a RSTI, and corresponding to the range of cells containing the STI's which are structured according to the definition of a RE or of a RME part of the RST that the RSTI abides by. The number of rows of a container row is equal to the number of rows of the highest STI it contains. A container row can also be referred to as a recursive element instance (REI). A container row can be seen within a RSTI as equivalent to an element within a STI. Example: The container row 2012 is illustrated in FIG. 17A, and corresponds to the range of cells comprising the STI's 2032 and 2013 which are defined within the RSTI 2001. The number of rows of this container row is equal to the number of rows of the STI 2032 which is higher than the STI 2013.

Container columns: a container column is a spreadsheet object belonging to a RSTI, and corresponding to the range of cells containing the STI's which occupy the same superstructure position within the container rows of the RSTI. The number of columns of a container column is equal to the number of columns of the widest STI it contains. Example: The container column 2006 is illustrated in FIG. 17A, and corresponds to the range of cells comprising the STI's occupying the leftmost position within the RSTI 2001. The number of columns of this container column is equal to the number of columns of the STI 2030 which is the widest STI on the left side of the RSTI 2001.

Container ranges: a container range is a spreadsheet object belonging to a RSTI, and corresponding to the intersection of a container row and of a container column. Each container range contains a single STI which occupies the top and leftmost corner. A container range within a RSTI can be seen as equivalent to a single cell within a STI. Example: The container range 2014 is illustrated in FIG. 17A, and corresponds to the intersection of the container row 2012 and of the container column 2005, both belonging to the RSTI 2001. This container range 2014 contains the STI 2013.

B3. Notations

The following notation: $\Pi_{i \in S} a_i$ corresponds to the multiplication of the terms $a_i$, the index i belonging to the set S. The following notation: $LCM(\{a_i\})_{i \in S}$ corresponds to the Least Common Multiplier of the terms $a_i$, the index i belonging to the set S. If S is constituted by a single element a, then $LCM(\{a_i\})_{i \in S}$ is equal to a. The following notation: a Mod b corresponds to the remainder of the division of a by b (Mod for "Modulo").

C. Tables Used for Managing RST Objects

As introduced in the previous section, the preferred embodiment of the present invention relies on different types of objects for managing RST's. These objects are recorded in different repositories, so that they can be accessed and updated by the different methods which are part of the preferred embodiment of the present invention. Such repositories are referred to as tables:

> the EF Table or EFT for short,
> the EP Table or EPT for short,
> the ST Table or STT for short,
> The ST Descriptor Table or STDT for short.
> The ST Instanciator Table or STIT for short.
> The RE Table or RET for short.
> The RST Table or RSTT for short.
> The RST Manager Table or RSTMT for short.
> The RST Descriptor Table or RSTDT for short.
> The RSTI Table or RSTIT for short.
> The RSTI Descriptor Table or RSTIDT for short.

The EFT, EPT, STT, STDT, STIT, RET, RSTT, RSTDT, RSTIT, and RSTIDT tables are saved as part of the spreadsheet disk file on the mass storage 107, whereas the RSTMT table is temporarily saved on the main memory 102 and the RSTEIT table is saved on spreadsheet export-import files.

C1. EF Table

Figure 7A:
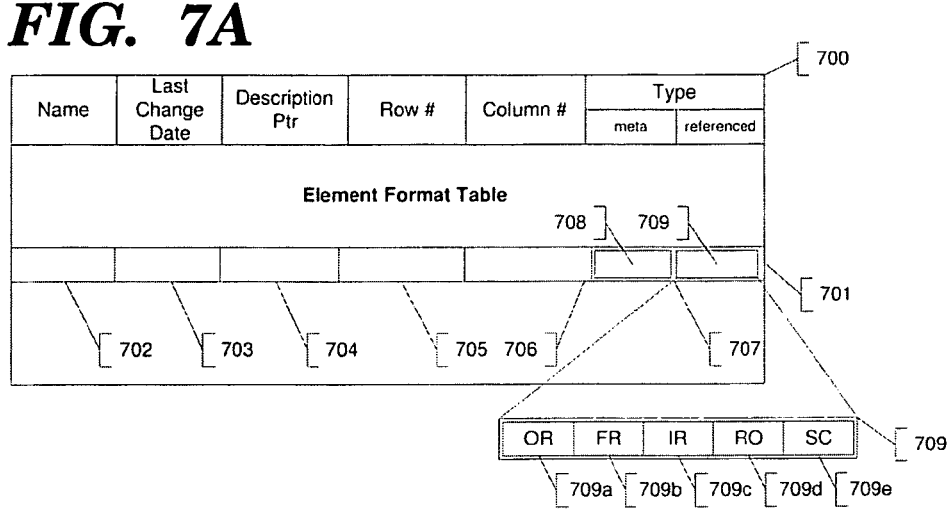
FIGS. 7A, 7B, 7C, 7D, 7E respectively illustrate the structure of the EF Table (EFT), of the EP Table (EPT), of the ST Table (STT), of a ST Descriptor Table (STDT), of the STI Table (STIT), according to the preferred embodiment of the present invention.

Referring now to FIG. 7A, the EFT Table 700 corresponds to a logical simple structure made of several records 701, each of them corresponding to an EF or to a MEF, according to the present invention. Each record includes six fields:

> The "Name" 702 field is used for recording a character string which uniquely identifies the EF or the MEF described by the current record 701.
> The "Last Change Date" 703 field is used for recording the date of the last update of the EF or the MEF described by the current record 701.
> The "Description Ptr" 704 field is a reference pointing to the memory location where is recorded an illustrative range of cells depicting the EF or MEF described by the current record 701. This memory location can either be on the Mass storage 107, or on the main memory 102, or on other conventional memory repository means, without departing from the spirit of the present invention.
> The "Row #" 705 field is used for recording the number of rows present in the EF or in the MEF described by the current record 701. This field is relevant for 3D ST's where element or MEF's correspond to 2D structures. In the preferred embodiment of the present invention where 2D ST's are assumed, this field is always filled with the value 1.
> The "Column #" 706 field is used for recording the number of columns present in the EF or in the MEF described by the current record 701.
> The "Type" 707 field is used for recording different attributes associated to the EF or to the MEF described by the current record 701: this is the "META" attribute 708 specifying if the current record 701 describes an EF or a MEF (with respective values "NO" and "YES"), and the "REFERENCED" attribute 709 specifying through dedicated subfields (709a, 709b, 709c, 709d and 709e) the relationships with other objects. These subfields are described as part of the description of the "REFERENCED" attribute 2240. Conventional techniques can be used for encoding these different attributes in this "Type" field, such as executing bit-wise XOR operations with predefined bit patterns, but any other conventional means could be used instead without departing from the spirit of the invention.

C2. EP Table

Figure 7B:
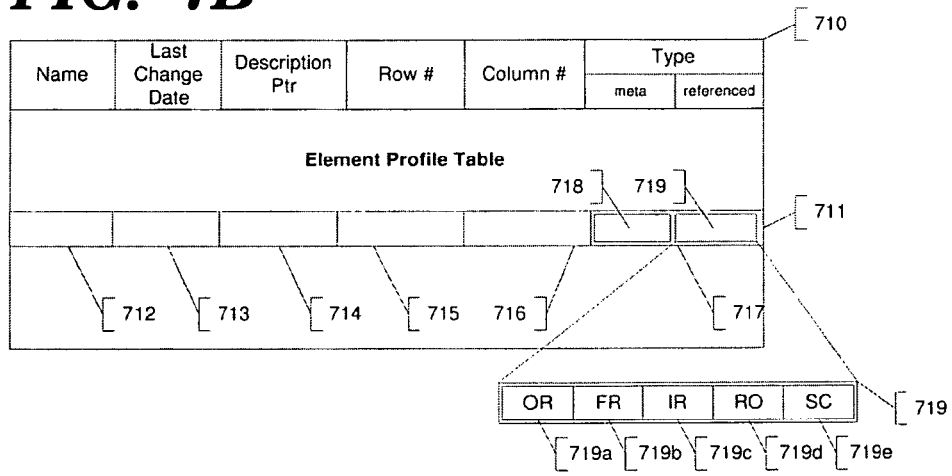

Referring now to FIG. 7B, the EPT Table 710 corresponds to a logical simple structure made of several records 711, each of them corresponding to an EP or to a MEP, according to the present invention. Each record includes six fields:

The "Name" 712 field is used for recording a character string which uniquely identifies the EP or the MEP described by the current record 711.

The "Last Change Date" 713 field is used for recording the date of the last update of the EP or the MEP described by the current record 711.

The "Description Ptr" 714 field is a reference pointing to the memory location where an illustrative range of cells depicting the EP or MEP described by the current record 711 is recorded. This memory location can either be on the Mass storage 107, or on the main memory 102, or on other conventional memory repository means, without departing from the spirit of the present invention.

The "Row #" 715 field is used for recording the number of rows present in the EP or in the MEP described by the current record 711. This field is relevant for 3D ST's where element or MEP's correspond to 2D structures. In the preferred embodiment of the present invention where 2D ST's are assumed, this field is always filled with the value 1.

The "Column #" 716 field is used for recording the number of columns present in the EP or in the MEP described by the current record 711.

The "Type" 717 field is used for recording different attributes associated to the EP or to the MEP described by the current record 711: this is the "META" attribute 718 specifying if the current record 701 describes an EP or a MEP (with respective values "NO" and "YES"), and the "REFERENCED" attribute 719 specifying through dedicated subfields (719a, 719b, 719c, 719d and 719e) the relationships with other objects. These subfields are described as part of the description of the "REFERENCED" attribute 2240. Conventional techniques can be used for encoding these different attributes in this "Type" field, such as executing bit-wise XOR operations with predefined bit patterns, but any other conventional means could be used instead without departing from the spirit of the invention.

C3. ST Table

Figure 7C:
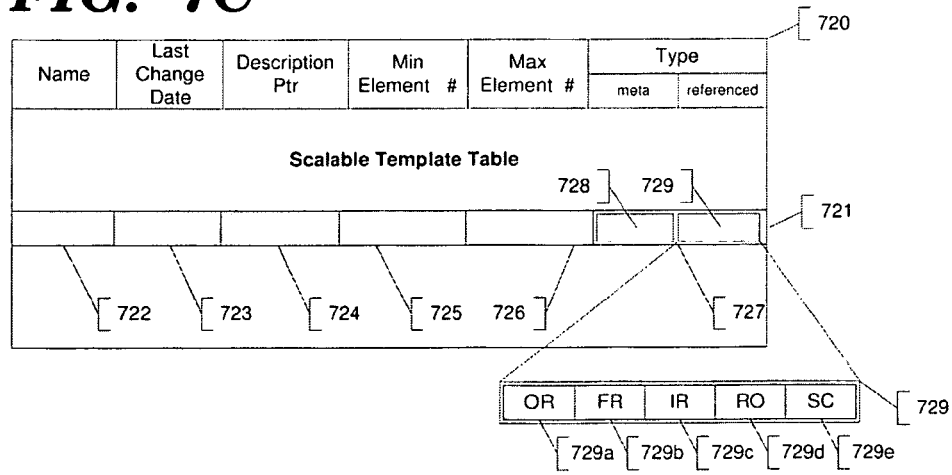

Referring now to FIG. 7C, the STT Table 720 corresponds to a logical simple structure made of several records 721, each of them corresponding to a ST, according to the present invention. Each record includes six fields:

The "Name" 722 field is used for recording a character string which uniquely identifies the ST described by the current record 721.

The "Last Change Date" 723 field is used for recording the date of the last update of the ST described by the current record 721.

The "Description Ptr" 724 field is a reference pointing to the memory location where a description of the ST described by the current record 721 is recorded. This memory location can either be on the mass storage 107, or on the main memory 102, or on other conventional memory repository means, without departing from the spirit of the present invention. This description is structured according to the STDT table 760 illustrated in FIG. 7D, that is as an ordered list of couples of names, each couple being made by the name of an element or MEF and by the name of an element or MEP.

The "Min Element #" 725 field is used to record the minimum number of elements found in each STI abiding by the ST described by the current record 721.

The "Max Element #" 726 field is used to record the maximum number of elements found in each STI abiding by the ST described by the current record 721.

The "Type" 727 field is used for recording different attributes associated to the ST described by the current record 721: this is the "META" attribute 728 which always take the value "NO", and the "REFERENCED" attribute 729 specifying through dedicated subfields (729a, 729b, 729c, 729d and 729e) the relationships with other objects. These subfields are described as part of the description of the "REFERENCED" attribute 2240. Conventional techniques can be used for encoding these different attributes in this "Type" field, such as executing bit-wise XOR operations with predefined bit patterns, but any other conventional means could be used instead without departing from the spirit of the invention.

C4. ST Descriptor Table

Figure 7D:
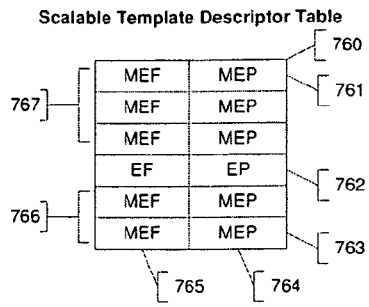

Referring now to FIG. 7D, the STDT Table 760 corresponds to a logical simple structure made of several couples of element or MEF 765 and of element or MEP 764. This structure is organized into three sub-sets:

The optional ST "Header" part 767, made of a variable number (possibly null) of couples like the top couple 761. Each of these couples is constituted by a MEF (column 765) and by a MEP (column 764).

The mandatory "Body" part 762 made of a single couple constituted by an EF (column 765) and by an EP (column 764).

The optional ST "Footer"part 766, made of a variable number (possibly null) of couples like the bottom couple 763. Each of these couples is constituted by a MEF (column 765) and by a MEP (column 764).

C5. ST Instanciator Table

Figure 7E:
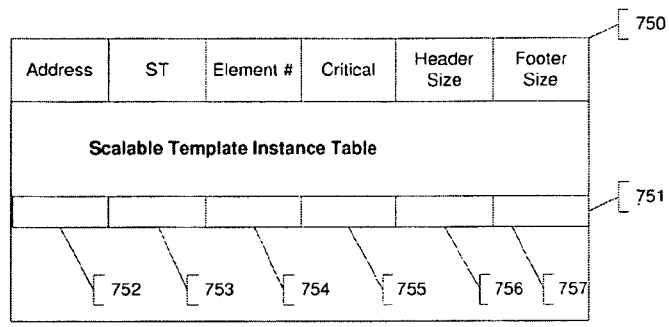

Referring now to FIG. 7E, the STIT Table 750 corresponds to a logical simple structure made of several records 751, each of them corresponding to a STI, according to the preferred embodiment of the present invention. Each record includes six fields:

The "Address" 752 field is used for locating the STI described by the current record 751: its value corresponds to the conventional character string used to record the address of any range of cells.

The "ST" 753 field is used for recording the name of the ST abided by the STI described by the current record 751.

The "Element #" 754 field is used for recording the number of elements within the STI described by the current record 751.

The "Critical" 755 field is used for recording if the STI described by the current record 751 is considered as critical. Its content can take the values "YES" or "NO".

The "Header Size" 756 field is used for recording the number of meta-elements constituting the Header part of the STI described by the current record 751.

The "Footer Size" 757 field is used for recording the number of meta-elements constituting the Footer part of the STI described by the current record 751.

C6. RE Table

Referring now to FIG. 19A, the RET Table 2210 corresponds to a logical simple structure made of several records 2211, each of them corresponding to a RE or to a RME, according to the present invention. Each record includes six fields:

The "Name" 2212 field is used for recording a character string which uniquely identifies the RE or the RME described by the current record 2211.

The "Last Change Date" 2213 field is used for recording the date of the last update of the RE or of the RME described by the current record 2211.

The "Description Ptr" 2214 field is a reference pointing to the memory location where is recorded an illustrative range of cells depicting the RE or the RME described by the current record 2211. This memory location can either be on the Mass storage 107, or on the main memory 102, or on other conventional memory repository means, without departing from the spirit of the present invention.

The "Row #" 2215 field is used for recording the number of rows present in the RE or in the RME described by the current record 2211. This field is relevant for 3D RST's where RE's or RME's correspond to 2D structures. In the preferred embodiment of the present invention where 2D RST's are assumed, this field is always filled with the value 1.

The "Column #" 2216 field is used for recording the number of columns present in the RE or in the RME described by the current record 2211.

The "Type" 2217 field is used for recording different attributes associated to the RE or to the RME described by the current record 2211: this is the "META" attribute 2218 specifying if the current record 2211 describes a RE or a RME (with respective values "NO" and "YES"), and the "REFERENCED" attribute 2219 specifying through dedicated subfields (2219a, 2219b, 2219c, 2219d and 2219e) the referenciation relationships with other objects. These subfields are described as part of the description of the "REFERENCED" attribute 2240. Conventional techniques can be used for encoding these different attributes in this "Type" field, such as executing bit-wise XOR operations with predefined bit patterns, but any other conventional means could be used instead without departing from the spirit of the invention.

C7. RST Table

Referring now to FIG. 19B, the RSTT Table 2220 corresponds to a logical simple structure made of several records 2221, each of them corresponding to a RST, according to the present invention. Each record includes six fields:

The "Name" 2222 field is used for recording a character string which uniquely identifies the RST described by the current record 2221.

The "Last Change Date" 2223 field is used for recording the date of the last update of the RST described by the current record 2221.

The "Description Ptr" 2224 field is a reference pointing to the memory location where a description of the RST described by the current record 2221 is recorded. This memory location can either be on the mass storage 107, or on the main memory 102, or on other conventional memory repository means, without departing from the spirit of the present invention. This description is structured according to the RSTDT table 2250 illustrated in FIG. 19D, that is as an ordered list of RME or RE names.

The "Min Element #" 2225 field is used for recording the minimum number of RE's found in every RSTI abiding by the RST described by the current record 2221.

The "Max Element #" 2226 field is used for recording the maximum number of RE's found in every RSTI abiding by the RST described by the current record 2221.

The "Type" 2227 field is used for recording different attributes associated to the RST described by the current record 2221: this is the "META" attribute 2228 which always take the value "NO", and the "REFERENCED" attribute 2229 specifying through dedicated subfields (2229a, 2229b, 2229c, 2229d and 2229e) the relationships with other objects. These subfields are described as part of the description of the "REFERENCED" attribute 2240. Conventional techniques can be used for encoding these different attributes in this "Type" field, such as executing bit-wise XOR operations with predefined bit patterns, but any other conventional means could be used instead without departing from the spirit of the invention.

C8. RST Manager Table.

Referring now to FIG. 19C, the RSTMT Table 2230 corresponds to a logical simple structure made of several records 2231, each of them corresponding to an object managed by the RST manager, according to the preferred embodiment of the present invention. Each record includes seven fields:

The "Name" 2232 field is used for recording a character string which uniquely identifies the object described by the current record 2231.

The "Last Change Date" 2233 field is used for recording the date of the last update of the object described by the current record 2231.

The "Description Ptr" 2234 field is a reference pointing to the memory location where is recorded a description of the object described by the current record 2231. This memory location can either be on the Mass storage 107, or on the main memory 102, or on other conventional memory repository means, without departing from the spirit of the present invention.

The "Info Field 1" 2235 field is used for recording a first piece of information associated to the object described by the current record 2231.

The "Info Field 2" 2236 field is used for recording a second piece of information associated to the object described by the current record 2231.

The "Type" 2237 field is used for recording different attributes associated to the object described by the current record 2231, such as:

the attribute "META" 2239 previously described for the similar "Type" fields 707, 717, 727, 777, 2217, and 2227, and also two other attributes:

the attribute "REFERENCED" 2240 which is constituted by 5 (five) subfields, according to the FIG. 19C illustrating an example of RSTMT table 2230:

The "OWN REFERENCE" (or OR for short) subfield 2240a. This subfield is a unique prime number assigned when the object described by the record 2231 is created. This prime number is released only when the object described by the record 2231 is deleted.

The "FILIATION REFERENCE" (or FR for short) subfield 2240*b*. This subfield is evaluated according to the following formula, where the F set corresponds to the set of objects constituting the object described by the record 2231:

$$FR = \Pi_{i \in F} OR_i \times LCM(\{FR_i\})_{i \in F}$$

The above formula allows to dynamically link the object described by the record 2231 with the objects constituting it, because any change in the value of one of the factors $OR_i$ or $FR_i$ will be automatically reflected into FR. If the F set is empty (for instance when the object described by the record 2231 is an EP, or a MEP, or an EF, or a MEF), then the FR subfield defaults to the value 1 (one).

The "INSTANCE REFERENCE" (or IR for short) subfield 2240*c*. This subfield is initiated to the value 1 (one) when the object described by the record 2231 is created. Afterwards this subfield is multiplied by 2 (two) each time a new instance abiding by this object is created, and is divided by 2 (two) each time an existing instance abiding by this object is deleted.

The "REFERENCED OBJECT" (or RO for short) subfield 2240*d*. This subfield is a Boolean variable specifying if the object described by the record 2231 participates to the definition of another object. For instance an EF, or a MEF, or an EP, or a MEP can participate to the definition of a ST. Similarly a ST can participate to the definition of a RE which can itself participate to the definition of a RST. This subfield is evaluated according to the following formula, where the P set corresponds to the set of objects the type of which follows the type of the object described by the record 2231, in the hierarchy of RST objects:

$$RO = \text{``YES''} \text{ if } LCM(\{FR_i\})_{i \in P} \text{ Mod } OR = 0;$$

$$RO = \text{``NO''} \text{ otherwise}.$$

The above formula allows to dynamically link the object described by the record 2231 with the objects belonging to the P set, because any change in the value of one of the factors $FR_i$ will be automatically reflected into RO. If the object described by the record 2231 is an EF, or a MEF, or an EP, or a MEP, then the P set corresponds to the set of ST's. If the object described by the record 2231 is a ST, then the P set corresponds to the set or RE's. If the object described by the record 2231 is a RE, then the P set corresponds to the set or RST's. If the object described by the record 2231 is a RST, then the P set is empty (the top of the hierarchy being reached), so that the RO subfield defaults to the value "NO".

The "SELECTED CHILDREN" (or SC for short) subfield 2240*e*. This subfield is a Boolean variable specifying if the object described by the record 2231 participates to the definition of a selected object. This subfield is evaluated according to the following formula, where the S set corresponds to the set of selected objects (having the "SELECTED" attribute 2242 equal to the value "YES"):

$$SC = \text{``YES''} \text{ if } LCM(\{FR_i\})_{i \in S} \text{ Mod } OR = 0 \text{ \#}_{OR}\text{\# object} \in S;$$

$$SC = \text{``NO''} \text{ otherwise}.$$

The above formula allows to dynamically link the object described by the record 2231 with the selected objects (belonging to the S set), because any change in the value of one of the factors $FR_i$ or in the S set will be automatically reflected into SC.

The other "REFERENCED" attributes 709, 719, 729, 780, 2219, and 2229, as defined within the tables EFT 700, EPT 710, STT 720, RSTEIT 770, RET 2210, and RSTT 2220, are based on the same set of five subfields.

the "SELECTED" attribute 2242 reflecting whether the associated object has been or not selected by the spreadsheet user within the RST Manager Dialog Box 2300, (with respective values "YES" and "NO"), and also the "NATURE" attribute 2241 reflecting whether the object is a (M)EF, or a (M)EP, or a ST, or a R(M)E, or a RST (with respective values "FORMAT", or "PROFILE" or "TEMPLATE" or "RECELEMENT" or "RECTEMPLATE").

Conventional techniques can be used for encoding these different attributes in this "Type" field 2237, such as executing bit-wise XOR operations with predefined bit patterns, but any other conventional means could be used instead without departing from the spirit of the invention.

The "Index" 2238 field is used for sorting the RSTMT table, as performed by the RST Manager method.

C9. RST Descriptor Table

Referring now to FIG. 19D, the RSTDT Table 2250 corresponds to a logical simple structure made of several names of RE's or RME's 2254. This structure is organized into three sub-sets:

The optional RST "Header" part 2256, made of a variable number (possibly null) of RME names like the top name 2251.

The mandatory "Body" part 2252 made of a single RE name.

The optional RST "Footer" part 2255, made of a variable number (possibly null) of RME names like the bottom name 2253.

C10. RSTI Table

Referring now to FIG. 19E, the RSTIT Table 2260 corresponds to a logical simple structure made of several records 2261, each of them corresponding to a RSTI, according to the preferred embodiment of the present invention. Each record includes six fields:

The "Address" 2262 field is used for locating the RSTI described by the current record 2261: its value corresponds to the conventional character string used to record the address of any range of cells.

The "ST" 2263 field is used for recording the name of the RST abided by the RSTI described by the current record 2261.

The "Element #" 2264 field is used for recording the number of RE's within the RSTI described by the current record 2261.

The "Critical" 2265 field is used for recording if the RSTI described by the current record 2261 is considered as critical. Its content can take the values "YES" or "NO".

The "Header Size" 2266 field is used for recording the number of RME's constituting the Header part of the RSTI described by the current record 2261.

The "Footer Size" 2267 field is used for recording the number of RME's constituting the Footer part of the RSTI described by the current record 2261.

C11. RSTI Descriptor Table

Figure 19F:
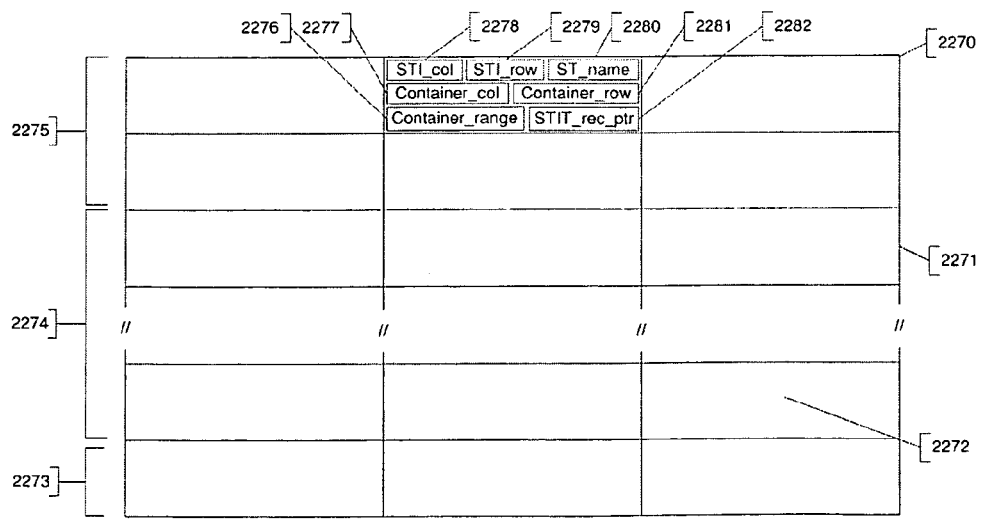

Referring now to FIG. 19F, the RSTIDT Table 2270 corresponds to a logical simple structure made of several records 2271, each of them made of several cells 2272, each of them corresponding to a STI member of the RSTI, according to the preferred embodiment of the present invention. The RSTIT table 2270 is mapped to the structure of the associated RSTI with a top header part 2275 (possibly empty) constituted by one or several records 2271, with a middle body part 2274 constituted by one or several records 2271, and with a bottom footer part 2273 (possibly empty) constituted by one or several records 2271. Each record 2271 comprises one or a plurality of individual cells 2272, the number of which corresponding to the number of STI's per RE. Each record 2272 includes seven fields characterizing a STI member of the RSTI:

The "container_range" 2276 field is used for recording the address of the container range hosting the STI described by the record 2272. By referring to the FIG. 17A, this field records the address of the container 2014 (intersection of the container row 2012 and of the container column 2005) if the record 2272 describes the STI 2013.

The "container_col" 2277 field is used for recording the number of columns of the container range hosting the STI described by the record 2272. By referring to the FIG. 17A, this field records the column number 2028 if the record 2272 describes the STI 2013.

The "STI_col" 2278 field is used for recording the number of columns of the STI described by the record 2272. By referring to the FIG. 17A, this field records the column number 2026 if the record 2272 describes the STI 2013.

The "STI_row" 2279 field is used for recording the number of rows of the STI described by the record 2272. By referring to the FIG. 17A, this field records the row number 2027 if the record 2272 describes the STI 2013.

The "ST_name" 2280 field is used to record the name of the ST abided by the STI described by the record 2272.

The "container_row" 2281 field is used for recording the number of rows of the container range hosting the STI described by the record 2272. By refering to the FIG. 17A, this field records the row number 2029 if the record 2272 describes the STI 2013.

The "STIT_rec_ptr" 2282 field is used for pointing, within the STIT table 750, to the record 751 describing the STI described by the record 2272.

C12. Relationships Between Tables

Figure 7F:
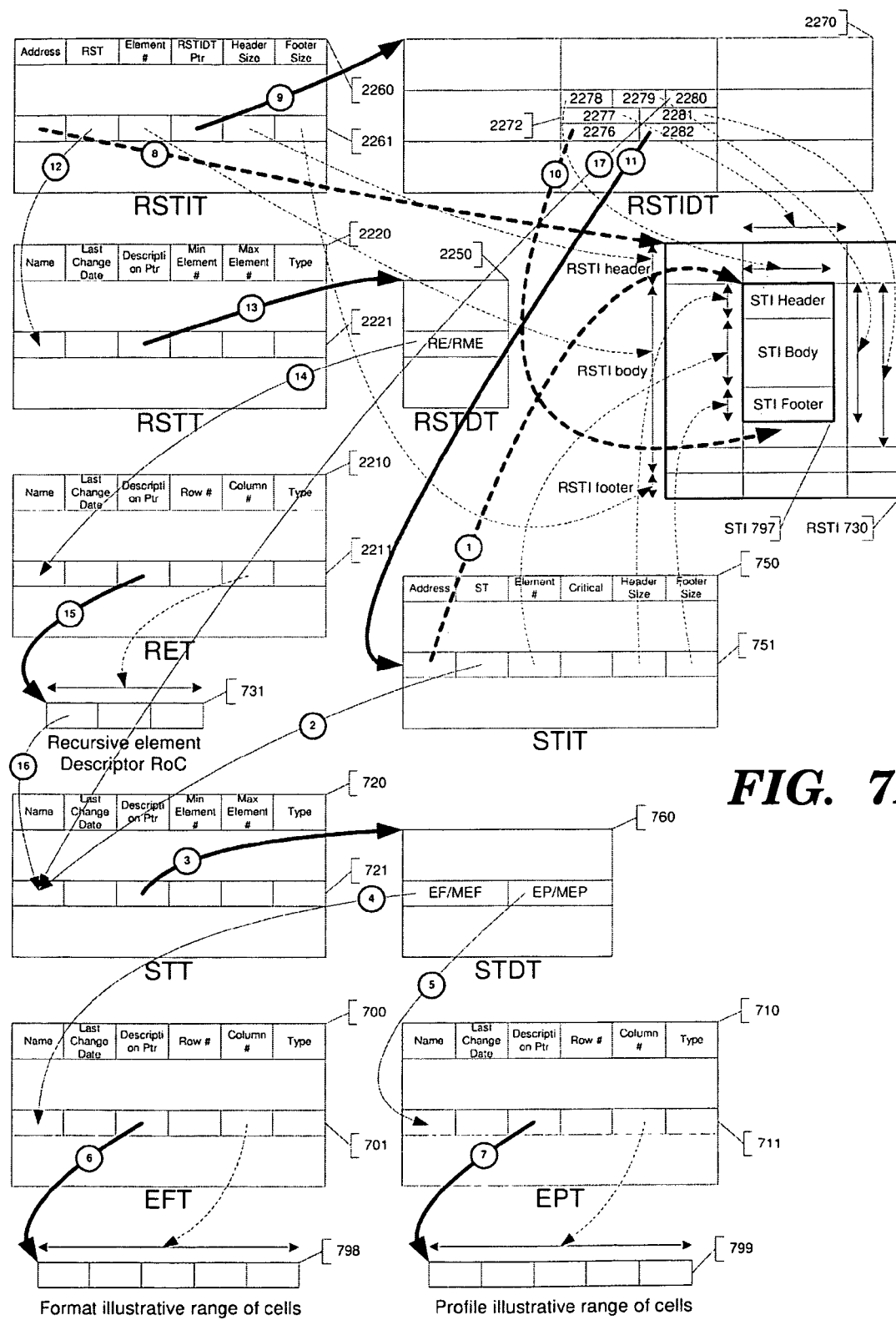
FIG. 7F gives a graphical illustration of the relationships established between the tables EFT, EPT, STT, STDT, STIT, RET, RSTT, RSTDT, RSTIT and RSTIDT according to the preferred embodiment of the present invention.

Referring now to FIG. 7F, some previously introduced tables RSTIT 2260, RSTIDT 2270, RSTT 2220, RSTDT 2250, RET 2210, STIT 750, STT 720, STDT 760, EFT 700 and EPT 710 are presented altogether to illustrate the relationships established between these tables and with either a RSTI RSTI 730 or a STI STI 797. Within this diagram, a solid bold arrow illustrates a pointer based relationship towards a table or a record, a dashed bold arrow illustrates an address based relationship towards a range of cells, a solid unbold arrow illustrates a name based relationship towards an object, and a dashed unbold arrow illustrates a size based relationship towards an object. In the FIG. 7F, the pointer based, address based and named relationships are identified by an index represented within a circle, according to the following sequence:

Starting with a STI STI 797 made of the three parts "STI Header", "STI Body" and "STI Footer", a first address based relationship ① is established between this STI STI 797 and a record 751 of the STIT table 750.

A second name based relationship ② is then established between this record 751 and a record 721 of the STT table 720. This record 721 corresponds to the ST abided by the STI 797.

A third pointer based relationship ③ is established between this record 721 and a STDT table 760 which describes the structure of the ST. Each record of the STDT table 760 corresponds to a pair of an element or MEF name and of an element or MEP name.

A fourth name based relationship ④ is established between the element or MEF name and a record 701 of the EFT table 700.

A fifth name based relationship ⑤ is established between the element or MEP name and a record 711 of the EPT table 710.

A sixth pointer based relationship ⑥ is established between the record 701 and an illustrative range of cells 798 specifying the format attributes.

A seventh pointer based relationship ⑦ is established between the record 711 and an illustrative range of cells 799 specifying the profile content.

Starting now with a RSTI 730 made of the three parts "RSTI Header", "RSTI Body" and "RSTI Footer", an eighth address based relationship ⑧ is established between this RSTI 730 and a record 2261 of the RSTIT table 2260.

A ninth pointer based relationship ⑨ is established between this record 2261 and a RSTIDT table 2270 which describes the structure of the RSTI 730. Each cell 2272 of the RSTIDT table 2270 comprise several fields 2276, 2277, 2278, 2279, 2280, 2281 and 2282 related to a given STI (like STI 797) member of the RSTI 730.

A tenth address based relationship ⑩ is thus established between the 2276 field of the cell 2272 of the RSTIDT table 2270, and the container range comprising the STI STI 797.

An eleventh pointer based relationship ⑪ is also established between the 2282 field of the cell 2272 of the RSTIDT table 2270, and the record 751 of the STIT table 750 corresponding to the STI STI 797.

A twelfth name based relationship ⑫ is then established between the record 2261 and a record 2221 of the RSTT table 2220. This record 2221 corresponds to the RST abided by the RSTI 730.

A thirteenth pointer based relationship ⑬ is established between this record 2221 and a RSTDT table 2250 which describes the structure of the RST. Each record of the RSTDT table 2250 corresponds to a RE or RME.

A fourteenth name based relationship ⑭ is established between the RE or RME name and a record 2211 of the RET table 2210.

A fifteenth pointer based relationship ⑮ is established between the record 2211 and a RE descriptor range of cells 731 containing the names of ST's.

A sixteenth name based relationship ⑯ is established between the RE descriptor range of cells 731 and a record 721 of the STT table 720.

A similar seventeenth name based relationship ⑰ is established between the cell 2272 of the RSTIDT table 2270 and a record 721 of the STT table 720.

D. Scenarios

In contrast to just-described conventional tools, the preferred embodiment of the present invention provides a more powerful, user-friendly and interactive approach for defining and managing ST's, in a form of a collection of methods.

In a preferred embodiment, the present invention is used within a scenario which articulates as a sequence of operations:

1. First Operation: Creation of a STI or of a RSTI

Figure 2:
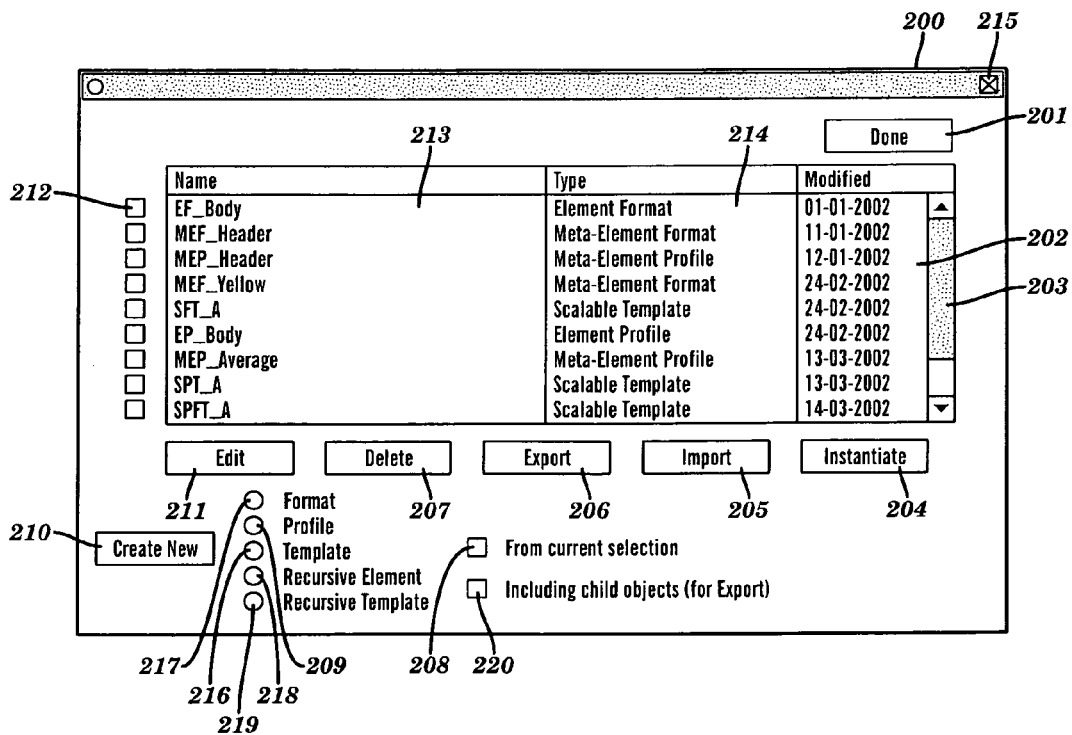
FIG. 2 shows a preferred spreadsheet user interface, according to the preferred embodiment of the present invention, for managing RST's.

The first operation occurs when the spreadsheet user decides, based on some criteria not detailed here, to either create a STI abiding by the structure of a ST or to create a RSTI abiding by the structure of a RST. In a preferred embodiment of the present invention, this operation comprises the following steps:

a. RST Manager: The spreadsheet user invokes first an original specific command called "RST Manager" thanks to conventional means available in spreadsheet environment, such as but not limited to the pointing device 105 or the keyboard 104, in order to visualize through a dedicated user interface any existing EF or MEF or EP or MEP or RE or RME or ST or RST. This RST manager offers different alternatives for further managing these entities. This can be illustrated with the user interface described with the FIG. 2, showing the RST Manager Dialog Box 200, as displayed on the display device 106. Within this RST Manager Dialog Box 200, the user can visualize already defined objects (EF's, MEF's, EP's, MEP's, RE's, RME's, ST's and RST's) in the "list boxes" 213, 214 and 202 where are respectively specified the names of the objects, the types of the objects and their last date of update. If a large number of objects have been defined, then the user can navigate among them by clicking with the pointing device 105 either upwards on downwards on the scroll bar 203, so that the objects shown within the list boxes 213, 214 and 202 move back and forth between the top object and the bottom object. In a preferred embodiment of the present invention, the objects have been sorted by date of last update, but any other sorting scheme could be also used without departing from the spirit of the invention. Several actions may then be taken by the user.

The user can use the pointing device 105 to click on a check box on the left side of the RST Manager Dialog Box 200 like the check box 212, in order to either select or deselect the object whose name is displayed within the list box 213 just on the right of the clicked check box. One or multiple objects can be selected or deselected. List scrolling is of course reflected on the check boxes. Once a selection is performed, the user can use the pointing device 105 to click on the "Delete" push-button 207, if he/she intends to remove all the selected objects from the list boxes 213, 214 and 202. If there is no other object (either ST or STI or RE or RME or RST or RSTI) referring to at least one of these objects, then they are immediately deleted, so that they do no longer appear on the list boxes 213, 214 and 202. If there exists at least one other ST or STI or RE or RME or RST or RSTI referring to at least one of the selected objects, then a conventional dialog box is displayed on the display device 106 to first alert the user about this situation and second to invite him to either cancel the deletion operation or to confirm it. If the user decision is to cancel the operation, then no action is taken, otherwise the selected objects are immediately deleted, so that they do no longer appear on the list boxes 213, 214 and 202. Alternatively the user can use the pointing device 105 to click on the "Edit" push-button 211 if he/she wants to edit the selected object which is assumed to be unique.

If no object or multiple objects have been previously selected, as shown within the RST Manager Dialog Box 200 by the presence of no or multiple check marks (visible or not) within the check boxes located on the left side, like the check box 212, then a warning message is displayed on the display device 106 to the user through conventional means such as pop-up windows, status bar messages, or any other similar conventional means which can be used instead without departing from the spirit of the invention.

If a single object was previously selected, as shown by the presence of a single check mark (visible or not) within a check box located on the left side, like the check box 212, then the RST Manager Dialog Box 200 is first closed and afterwards the nature of this single selected object is taken into account to determine the new dialog box to be opened.

Figure 3:
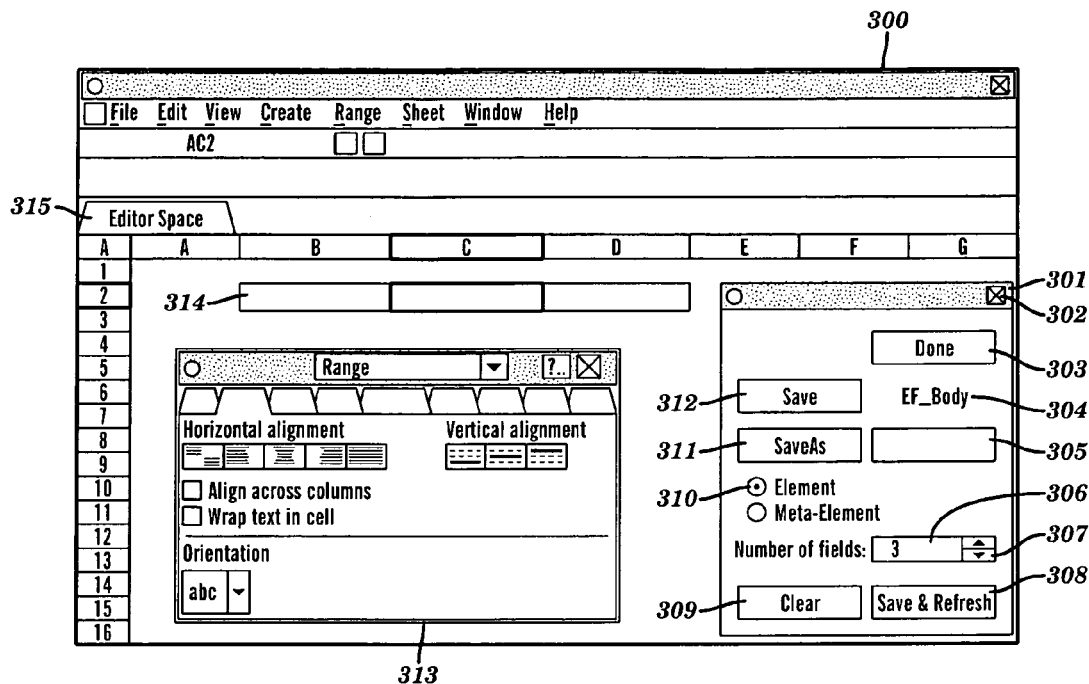
FIG. 3 shows a preferred spreadsheet user interface, according to the preferred embodiment of the present invention, for editing EF's.

If the selected object was an EF or a MEF, then the EF Editor command is issued, so that the EF Editor method takes control by first displaying on the display device 106 the EF Editor Dialog Box 301, as illustrated in FIG. 3. The following steps of this scenario case are detailed in a subsequent section.

Figure 4:
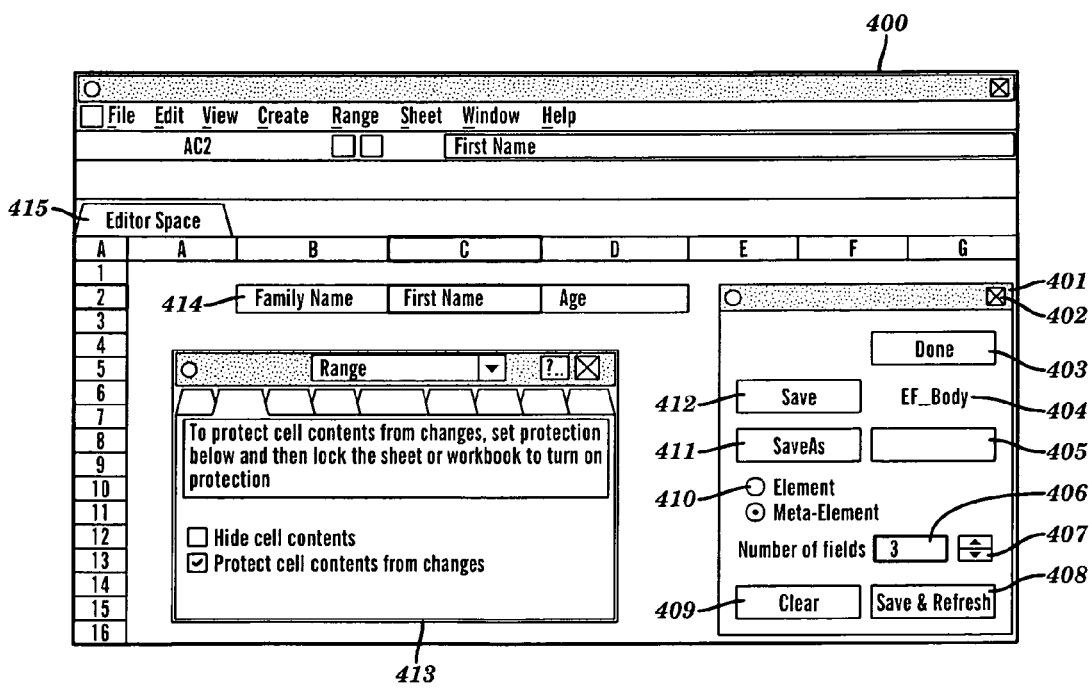
FIG. 4 shows a preferred spreadsheet user interface, according to the preferred embodiment of the present invention, for editing EP's.

If the selected object was an EP or a MEP, then the EP Editor command is issued, so that the EP Editor method takes control by first displaying on the display device 106 the EP Editor Dialog Box 401, as illustrated in FIG. 4. The following steps of this scenario case are detailed in a subsequent section.

Figure 20A:
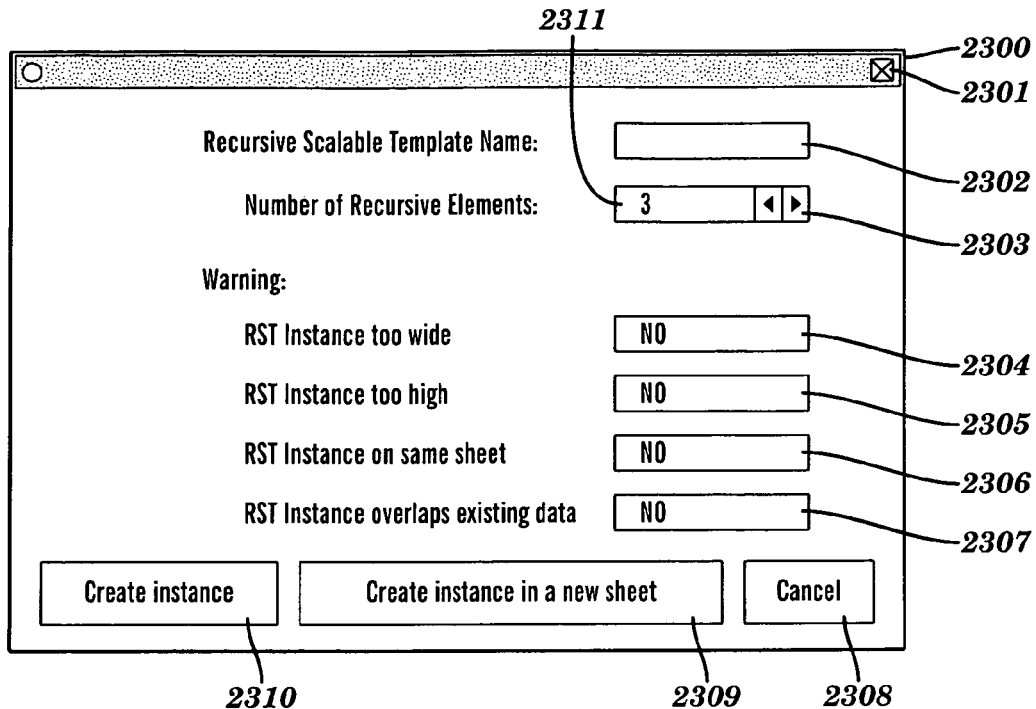
FIG. 20A shows a preferred spreadsheet user interface, according to the preferred embodiment of the present invention, for creating RSTI's.
Figure 20B:
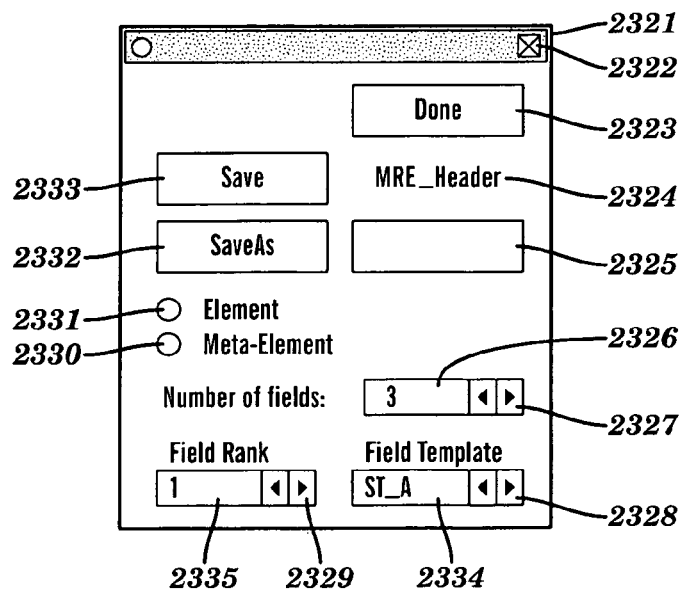
FIG. 20B shows a preferred spreadsheet user interface, according to the preferred embodiment of the present invention, for editing RE's.

If the selected object was a RE or a RME, then the RE Editor command is issued, so that the RE Editor method takes control by first displaying on the display device 106 the RE Editor Dialog Box 2321, as shown in FIG. 20B. The following steps of this scenario case are detailed in a subsequent section.

Figure 5:
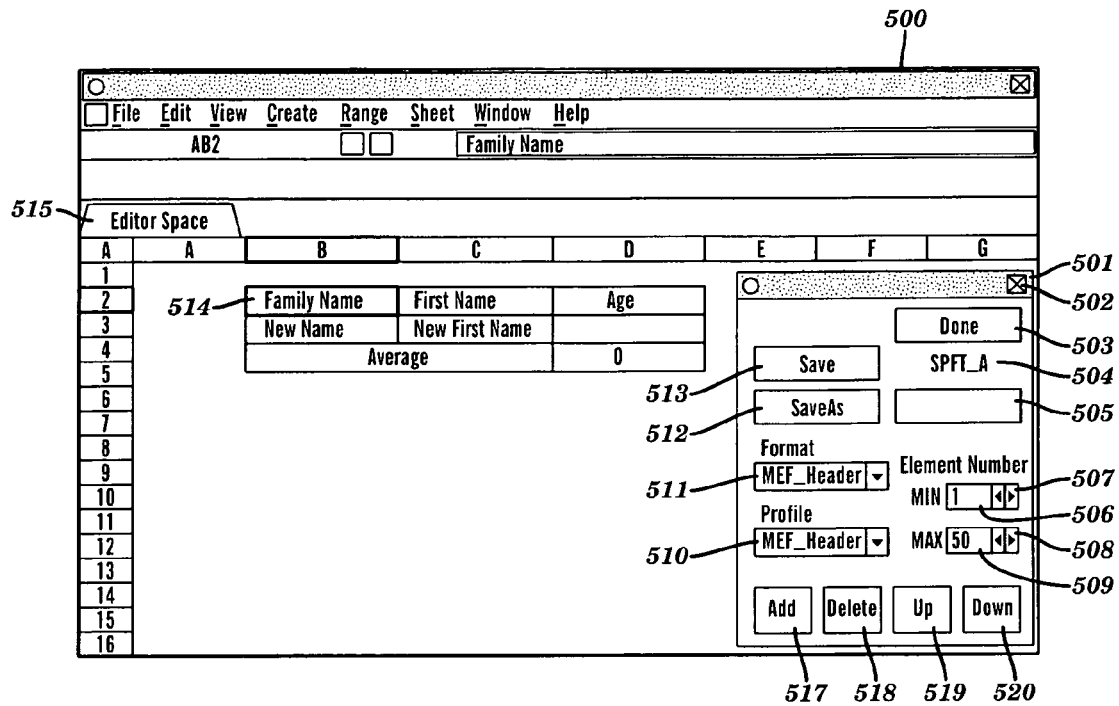
FIG. 5 shows a preferred spreadsheet user interface, according to the preferred embodiment of the present invention, for editing ST's.

If the selected object was a ST, then the ST Editor command is issued, so that the ST Editor method takes control by first displaying on the display device 106 the ST Editor Dialog Box 501, as illustrated in FIG. 5. The following steps of this scenario case are detailed in a subsequent section.

Figure 6:
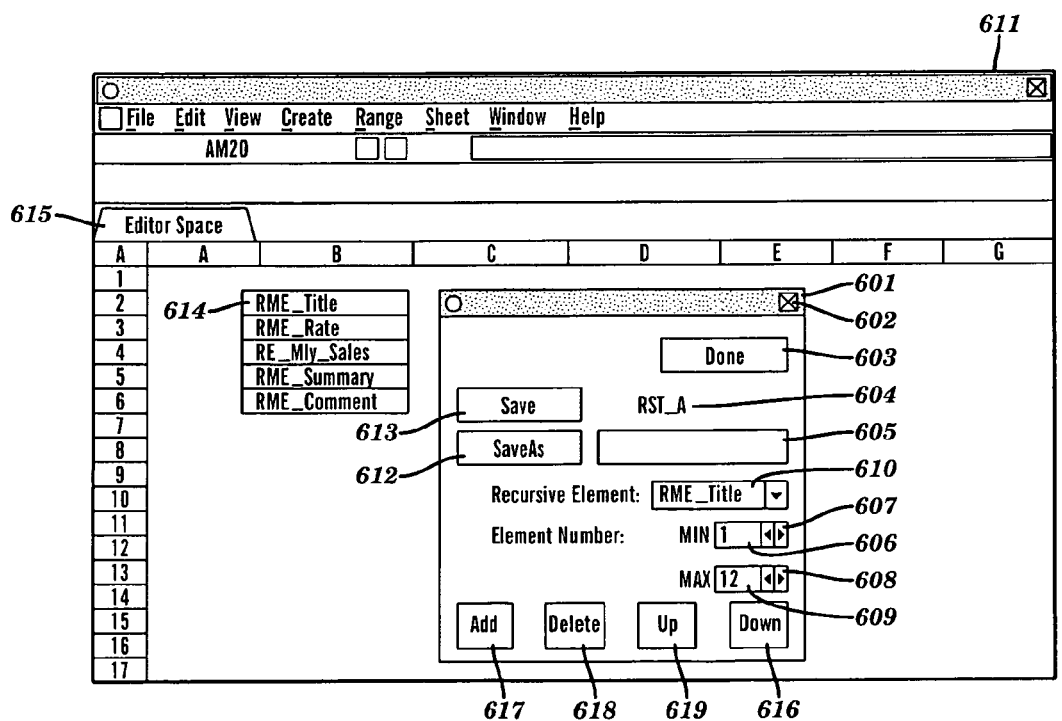
FIG. 6 shows a preferred spreadsheet user interface, according to the preferred embodiment of the present invention, for editing RST's.

If the selected object was a RST, then the RST Editor command is issued, so that the RST Editor method takes control by first displaying on the display device 106 the RST Editor Dialog Box 601, as illustrated in FIG. 6. The following steps of this scenario case are detailed in a subsequent section.

Alternatively the user can use the pointing device 105 to click on the "Instanciate" push-button 204 if he/she wants to generate either a STI or a RSTI which abides by the selected object which is assumed to be unique and to be respectively a ST or a RST.

If no object or multiple objects have been previously selected, as shown within the RST Manager Dialog Box 200 by the presence of no or multiple check marks (visible or not) within the check boxes located on the left side, like the check box 212, then a warning message is displayed on the display device 106 to the user through conventional means such as pop-up windows, status bar messages, or any other similar conventional means which can be used instead without departing from the spirit of the invention.

If a single object was previously selected, as shown by the presence of a single check mark (visible or not)

within a check box located on the left side, like the check box 212, then the method checks if this object is a ST or a RST.

If it is not the case, then a warning message is displayed on the display device 106 to the user through conventional means such as pop-up windows, status bar messages, or any other similar conventional means which can be used instead without departing from the spirit of the invention.

Figure 13A:
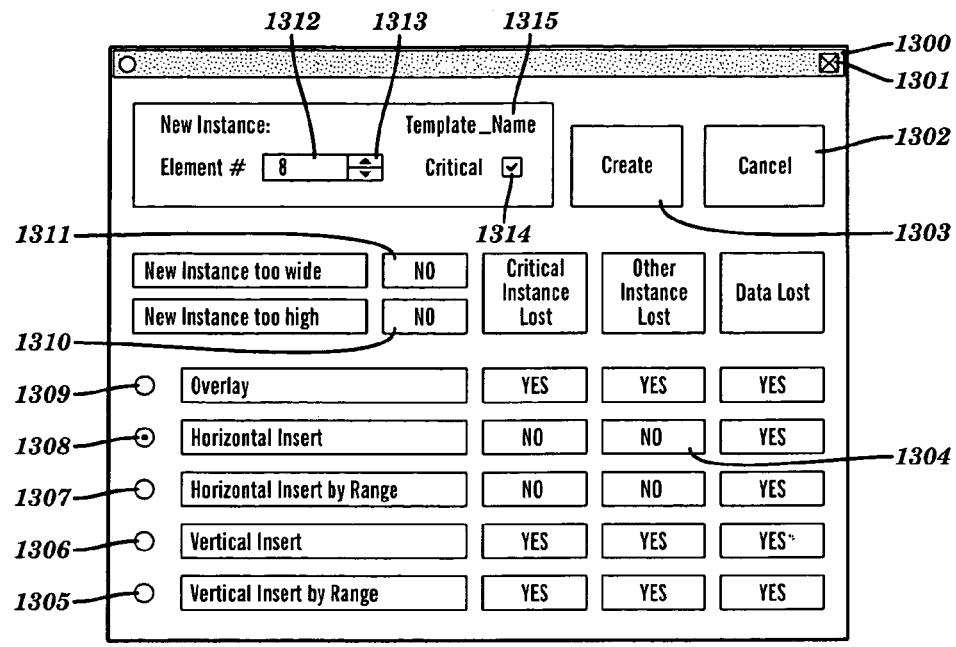
FIG. 13A shows a preferred spreadsheet user interface, according to the preferred embodiment of the present invention, for creating STI's.
Figure 13B:
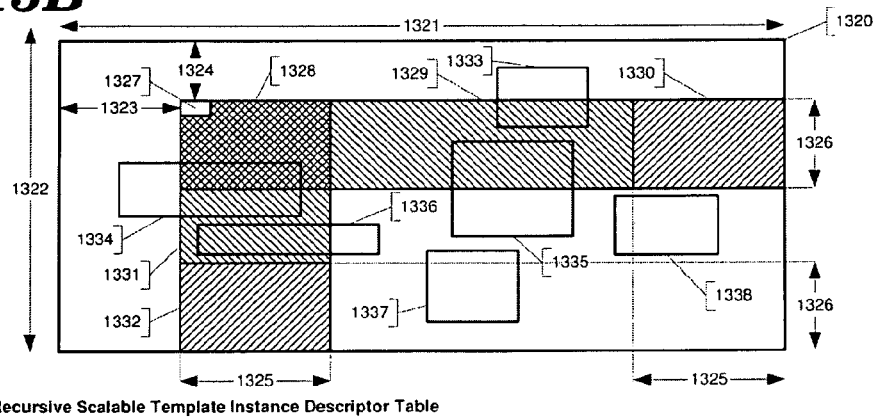
FIG. 13B illustrates the ST instanciation, according to a preferred embodiment of the present invention.

If a single ST (respectively RST) object was previously selected, then the RST Manager Dialog Box 200 is first closed and afterwards the ST Instanciator (resp. RST Instanciator) command is issued, so that the ST instanciator (resp. RST Instanciator) method takes control by first displaying on the display device 106 the ST Instanciator Dialog Box 1300 (resp. RST Instanciator Dialog Box 2300), as shown in FIG. 13A (resp. 20A). The following steps of this scenario case are detailed in subsequent sections.

Alternatively the user can use the pointing device 105 to click on the "Export" push-button 206 if he/she wants to export a non-empty set of objects from the current spreadsheet file to another spreadsheet file. If the check box "Including child objects (for Export)" 220 is filled with a check mark, then all the child objects of the selected objects will also benefit from the export operation, even if these child objects are not selected through the check boxes located on the left side, like the check box 212.

If no object has been previously selected, as shown within the RST Manager Dialog Box 200 by the absence of any check mark (visible or not) within the check boxes located on the left side, like the check box 212, then a warning message is displayed on the display device 106 to the user through conventional means such as pop-up windows, status bar messages, or any other similar conventional means which can be used instead without departing from the spirit of the invention.

If one or multiple objects were previously selected, as shown by the presence of at least one check mark (visible or not) within a check box located on the left side, like the check box 212, then the RST Manager Dialog Box 200 is first closed and afterwards a specific RST Export Manager command is issued, so that a dedicated method, not described in the present invention, takes control to handle the export operation.

Alternatively the user can use the pointing device 105 to click on the "Import" push-button 205 if he/she wants to import one or several objects from another spreadsheet file to the current spreadsheet file. The RST Manager Dialog Box 200 is first closed and afterwards a specific RST Import Manager command is issued, so that a dedicated method, not described in the present invention, takes control to handle the import operation.

Alternatively the user can use the pointing device 105 to click on one of the five option-buttons 217 "Format", 209 "Profile", 216 "Template", 218 "RE", 219 "Recursive Template", on the bottom left side of the RST Manager Dialog Box 200, if he/she wants to specify which type of new object may be created afterwards. As five option-buttons are available on the RST Manager Dialog Box 200, the user has the choice to specify either a EF, or a EP or a RE or a ST or a RST as the type of the new object to be created afterwards.

Alternatively the user can use the pointing device 105 to click on the check-box 208 entitled "From current selection", if he/she wants to specify if the next object to be created afterwards will be derived or not from the range of cells currently selected in the spreadsheet file.

Alternatively the user can use the pointing device 105 to click on the "Create New" push-button 210 if he/she wants to create a new object whose type has been previously specified thanks to the three option-buttons like the "Profile" option-button 209, or the "Format" option-button 217, or the "Template" option-button 216, or The "RE" option-button 218, or The "Recursive Template" option-button 219.

If none of these five option-buttons shows a previous user choice, as shown within the RST Manager Dialog Box 200 by the absence of a point within one of these five option-buttons 209, 216, 217, 218 and 219, then a warning message is displayed on the display device 106 to the user through conventional means such as pop-up windows, status bar messages, or any other similar conventional means which can be used instead without departing from the spirit of the invention.

If one of these five option-buttons 209, 216, 217, 218 and 219 shows a previous user choice, then the RST Manager Dialog Box 200 is first closed and afterwards the single selected option-button is taken into account to determine the new dialog box to be opened.

If the "Format" option-button 217 shows a selection, then the EF Editor command is issued, so that the EF Editor method takes control by first displaying on the display device 106 the EF Editor Dialog Box 301, as shown in FIG. 3. The following steps of this scenario case are detailed in a subsequent section.

If the "Profile" option-button 209 shows a selection, then the EP Editor command is issued, so that the EP Editor method takes control by first displaying on the display device 106 the EP Editor Dialog Box 401, as shown in FIG. 4. The following steps of this scenario case are detailed in a subsequent section.

If the "Template" option-button 216 shows a selection, then the ST Editor command is issued, so that the ST Editor method takes control by first displaying on the display device 106 the ST Editor Dialog Box 501, as illustrated in FIG. 5. The following steps of this scenario case are detailed in a subsequent section.

If the "RE" option-button 218 shows a selection, then the RE Editor command is issued, so that the RE Editor method takes control by first displaying on the display device 106 the RE Editor Dialog Box 2321, as illustrated in FIG. 20B. The following steps of this scenario case are detailed in a subsequent section.

If the "Recursive Template" option-button 219 shows a selection, then the RST Editor command is issued, so that the RST Editor method takes control by first displaying on the display device 106 the RST Editor Dialog Box 601, as illustrated in FIG. 6. The following steps of this scenario case are detailed in a subsequent section.

Finally the user can use the pointing device 105 to click on the "Done" push-button 201 or on the closing-window push-button 215 if he/she wants to quit the RST Manager method. The resulting effect is to close the RST Manager Dialog Box 200 on the display device 106.

b. EF Editor: According to the previous scenario illustrating the RST Manager method, the spreadsheet user may then invoke an original specific command called "EF Editor" thanks to conventional means available in spreadsheet environment, such as but not limited to the pointing device 105 or the keyboard 104, in order to either create a new EF; or to create a new MEF; or to update an existing EF; or to update an existing MEF. The corresponding scenario is described in international patent application PCT/EP 02/09483 (IBM's reference FR9 2001 0029) entitled "System and method in an electronic spreadsheet for exporting-importing the content of input cells from a scalable template instance to another" by Aureglia et al.

c. EP Editor: According to the previous scenario illustrating the RST Manager method, the spreadsheet user may then invoke an original specific command called "EP Editor" thanks to conventional means available in spreadsheet environment, such as but not limited to the pointing device 105 or the keyboard 104, in order to either create a new EP or to create a new MEP or to update an existing EP or to update an existing MEP.

The corresponding scenario is described in international patent application PCT/EP 02/09483 (IBM's reference FR9 2001 0029) entitled "System and method in an electronic spreadsheet for exporting-importing the content of input cells from a scalable template instance to another" by Aureglia et al.

d. RE Editor: According to the previous scenario illustrating the RST Manager method, the spreadsheet user may then invoke an original specific command called "RE Editor" thanks to conventional means available in spreadsheet environment, such as but not limited to the pointing device 105 or the keyboard 104, in order to either create a new RE or to create a new RME or to update an existing RE or to update an existing RME.

This can be illustrated with the user interface described with the FIG. 20B, showing the RE Editor Dialog Box 2321, as displayed on the display device 106 within the GUI window of the electronic spreadsheet office application.

When the RE Editor Dialog Box 2321 is displayed on the display device 106, it contains some pieces of information.

First the nature of the edited object is shown by a pair of option-buttons 2330 and 2331 which specifies if it is either a RE or a RME. The spreadsheet user can click with the pointing device 105 on one of these two option-buttons 2330 and 2331 to swap between a RE definition and a RME definition.

Second the number of fields within the edited object is specified in the text-box 2326. When a new RE or RME is created (the spreadsheet user having previously clicked with the pointing device 105 on the option-button 218 to put a point on it and on the push-button 210, all contained within the RST Manager Dialog Box 200, as illustrated by FIG. 2), the value shown by the text box 2326 corresponds to a default value set to 3 in a preferred embodiment of the present invention. When an existing RE or RME is edited, the value shown by the text box 2326 corresponds to the number of fields previously defined for this object. In all cases, the spreadsheet user can change the value shown in the text box 2326 by clicking with the pointing device 105 on the spin-button 2327, either on the ascending or on the descending side, so that the value can get increased or decreased (within predefined boundaries).

Third the name of the edited RE or RME is displayed on the label box 2324. When an existing RE or RME is edited, the name shown by the label box 2324 corresponds to the name previously assigned to this object. When a new RE or RME is created, then the name displayed on the label box 2324 corresponds to a default value which, in a preferred embodiment of the present invention, takes the form "New XX" where XX is a counter ensuring the uniqueness of the assigned name.

Fourth the ST's constituting the edited RE or RME are jointly specified by the text boxes 2335 and 2334. The text box 2335 specifies a field rank, which by convention takes the value 1 for the leftmost field of the edited RE or RME, and takes the same value as the one displayed in the text box 2326 for the rightmost field of the edited RE or RME. The text box 2334 specifies the name of the ST for the field whose rank is specified by the text box 2335.

The RE Editor Dialog Box 2321 contains several graphical objects which allow the spreadsheet user to take some actions.

First the spreadsheet user can assign a new name to the currently edited RE or RME. For this purpose he/she will first use conventional means such as the keyboard 104 to specify within the text box 2325 the new name to be given to the edited RE or RME. Then he/she will use the pointing device 105 to click on the "Save As" push-button 2332. If the specified name entered within the text box 2325 was already assigned to an existing object or was not a valid name, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for acknowledgment. Then the text box 2325 is cleared without further action. If the specified name entered within the text box 2325 was not yet assigned to an existing object and was a valid name, then the text box 2325 is cleared and the edited object is saved on the spreadsheet file under the new name which is in turn displayed within the label box 2324.

Second the spreadsheet user can save on the spreadsheet file the current definition of the edited object by clicking with the pointing device 105 on the "Save" push-button 2333. This event results in checking if the updated RE or RME is already referenced by an existing RST. If it is not the case, then the updated definition of the RE or RME is saved on the spreadsheet file. If it is the case, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for either canceling the operation or for pursuing it. In the first case the updated RE or RME definition is not saved while it is saved on the spreadsheet file in the second case.

Third the spreadsheet user can change the definition of the ST's constituting the edited RE or RME. For this purpose he/she will first navigate within the fields of the edited object by clicking with the pointing device 105 on the spin-button 2329 to either decrement or increment the rank of the field, as displayed in the text box 2335, and whose ST name is displayed in the text box 2334. The value taken by the field rank is kept within an interval lower bounded by the value 1 (one) and upper bounded by the value of the text box 2326. Then the spreadsheet user can update the name of the ST for the field whose rank is displayed in the text box 2335 by clicking with the pointing device 105 on the spin-button 2328 to select an available ST name.

Finally the user can use the pointing device 105 to click on the "Done" push-button 2323 or on the closing-window push-button 2322 if he/she wants to quit the RE Editor method. The resulting effect is to close the RE Editor Dialog Box 2321 on the display device 106.

e. ST Editor: According to the previous scenario illustrating the RST Manager method, the spreadsheet user may then invoke an original specific command called "ST Editor" thanks to conventional means available in spreadsheet environment, such as but not limited to the pointing device 105 or the keyboard 104, in order to either create a new ST or to update an existing ST. The corresponding scenario is described in international patent application PCT/EP 02/09483 (IBM's reference FR9 2001 0029) entitled "System and method in an electronic spreadsheet for exporting-importing the content of input cells from a scalable template instance to another" by Aureglia et al.

f. RST Editor: According to the previous scenario illustrating the RST Manager method, the spreadsheet user may then invoke an original specific command called "RST Editor" thanks to conventional means available in spreadsheet environment, such as but not limited to the pointing device 105 or the keyboard 104, in order to either create a new RST or to update an existing RST. This can be illustrated with the user interface described with the FIG. 6, showing the RST Editor Dialog Box 601, as displayed on the display device 106 within the GUI window 611 of the electronic spreadsheet office application. When the RST Editor Dialog Box 601 is displayed on the display device 106, the current sheet becomes a dedicated sheet entitled "Editor Space" 615 in a preferred embodiment of the present invention. Within the "Editor Space" 615 sheet, the RST to be edited appears as a range of cells 614 in the top left angle, with the top left cell at address B2. Although the edited RST corresponds to a regular range of cells 614 within a sheet, conventional tools available in electronic spreadsheet environments cannot be used to update this range of cells 614. The spreadsheet user will only be able to navigate within the range of cells 614 illustrating the RST, and to either insert or delete rows within the range of cells 614 illustrating the RST, by using dedicated means which are part of the RST Editor Dialog Box 601. Row insertion or deletion in the "Editor Space" sheet 615 will be disabled. Moreover the "Editor Space" sheet 615 is write-protected to prevent the user to inadvertently modify the settings of the RE's or RME's defined as part of the RST illustrated by the range of cells 614. When the RST Editor Dialog Box 601 is displayed on the display device 106, it contains some pieces of information which either relate to the whole RST, as illustrated by the range of cells 614, or which relate to the RE or RME pointed by the cell currently selected within this same range of cells 614.

First the RE or RME pointed by the cell currently selected is shown by the "RE" combo box 610. By clicking with the pointing device 105 on the arrow located on the right side of this "RE" combo box 610, the spreadsheet user can display and navigate within the list of defined RE's and RME's, then select a RE or RME of his/her choice and his/her choice appearing on the row where is located the currently selected cell within the range of cells 614. If the spreadsheet user changes the selected row within the range of cells 614, by clicking with the pointing device 105 on the "Up" push-button 619, or on the "Down" push-button 616, then the name displayed within the combo box 610 is updated to specify the name of the RE or RME corresponding to the new selected row. If the spreadsheet user wishes to insert a new RME either in the header or in the footer part of the RST, he/she has just to click with the pointing device 105 on the "Add" push-button 617 to insert a new row within the range of cells 614, at the desired place above the last position of the currently selected cell. Then the range of cells 614 is updated with a new row being displayed on the window 611. Then the RST Editor Dialog Box 601 is updated by showing within the combo boxes 610 the name assigned by default to the introduced RME. If the spreadsheet user wishes to remove a RME either from the header part or from the footer part of the RST, he/she has just to click with the pointing device 105 on the "Delete" push-button 618 to remove the corresponding row within the range of cells 614, at the desired place. Then the currently selected cell within the range of cells 614 becomes the one belonging to the row representing the unique RE defined within the RST, and the RST Editor Dialog Box 601 is updated by showing within the combo box 610 the name of the unique RE defined within the RST.

Second the minimum number of RE's allowed within a RSTI abiding by the edited RST is specified in the "MIN" text-box 606. Similarly the maximum number of RE's allowed within a RSTI abiding by the edited RST is specified in the "MAX" text-box 609. When a new RST is created (the spreadsheet user having previously clicked with the pointing device 105 on the option-button 219 to put a point on it and on the push-button 210, all contained within the RST Manager Dialog Box 200, as illustrated by FIG. 2), the value shown by the "MIN" text box 606 corresponds to a default value set to 1 in a preferred embodiment of the present invention, and the value shown by the "MAX" text box 609 corresponds to a default value set to 16 in a preferred embodiment of the present invention. When an existing RST is edited, the values shown by the text boxes 606 and 609 correspond respectively to the minimum and maximum number of RE's allowed in any RSTI abiding by the currently edited RST, as previously defined by the spreadsheet user. In all cases, the spreadsheet user can change the values shown in the text box "MIN" 606 or in the text box "MAX" 609 by clicking with the pointing device 105 respectively on the spin-button 607 or on the spin-button 608, either on the ascending or on the descending side, so that the values can get increased or decreased (within predefined boundaries), while ensuring that the value specified in the "MIN" text box 606 remains less than or equal to the value specified in the "MAX" text box 609. Should any existing RSTI abiding by the updated RST have a number of elements falling outside the new "MIN"-"MAX" interval, then this RSTI will not be impacted by the RST update, but any future addition or removal of RE's will be done according to the new definition of the "MIN"-"MAX" interval.

Third the name of the edited RST is displayed on the label box 604. When an existing RST is edited, the name shown by the label box 604 corresponds to the name previously assigned to this object. When a new RST is created, then the name displayed on the label box 604 corresponds to a default value which, in a preferred embodiment of the present invention, takes the form "New XX" where XX is a counter ensuring the uniqueness of the assigned name.

The RST Editor Dialog Box 601 comprises several graphical objects which allow the spreadsheet user to take some actions.

First the spreadsheet user can assign a new name to the currently edited RST, if this RST is currently constituted by RE's and RME's having all the same number of fields. Indeed in this case the "Save As" push-button 612 is enabled, so that any click on it with the pointing device 105 is recognized as a valid event. The spreadsheet user will first use conventional means such as the keyboard 104 to specify within the text box 605 the new name to be given to the edited RST. Then he/she will use the pointing device 105 to click on the "Save As" push-button 612. If the specified name entered within the text box 605 was already assigned to an existing object or is not a valid name, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts her/him for acknowledgment. Then the text box 605 is cleared without further action. If the specified name entered within the text box 605 was not yet assigned to an existing object and is a valid name, then the text box 605 is cleared and the edited RST is saved on the spreadsheet file under the new name which is in turn displayed within the label box 604.

Second the spreadsheet user can save on the spreadsheet file the current definition of the edited RST, if this RST is currently constituted by RE's and RME's having all the same number of fields. Indeed in this case the "Save" push-button 613 is enabled, so that any click on it with the pointing device 105 is recognized as a valid event. This event results in checking if the updated RST is already referenced by an existing RSTI. If it is not the case, then the updated definition of the RST is saved on the spreadsheet file. If it is the case, then a warning message is displayed on the display device 106 to the user through conventional means such as pop-up windows, status bar messages, or any other similar conventional means which can be used instead without departing from the spirit of the invention. This warning message informs the spreadsheet user about this situation and then prompts him for either canceling the operation or for pursuing it. In the first case the updated RST definition is not saved while it is saved on the spreadsheet file in the second case.

Finally the user can use the pointing device 105 to click on the "Done" push-button 603 or on the closing-window push-button 602 if he/she wants to quit the RST Editor method. The resulting effect is to close the RST Editor Dialog Box 601 on the display device 106 and to revert to the sheet which was active when the RST Editor command was first invoked.

g. ST Instanciator: According to the previous scenario illustrating the RST Manager method, the spreadsheet user may then invoke an original specific command called "ST Instanciator" thanks to conventional means available in spreadsheet environment, such as but not limited to the pointing device 105 or the keyboard 104, in order to create a STI abiding by a selected ST and located according to the currently selected cell. The corresponding scenario is described in international patent application PCT/EP 02/09483 (IBM's reference FR9 2001 0029) entitled "System and method in an electronic spreadsheet for exporting-importing the content of input cells from a scalable template instance to another" by Aureglia et al.

h. RST Instanciator: According to the previous scenario illustrating the RST Manager method, the spreadsheet user may then invoke an original specific command called "RST Instanciator" thanks to conventional means available in spreadsheet environment, such as but not limited to the pointing device 105 or the keyboard 104, in order to create a RSTI abiding by a selected RST and located according to the currently selected cell. This can be illustrated with the user interface described with the FIG. 20A, showing the RST Instanciator Dialog Box 2300, as displayed on the display device 106. When the RST Instanciator Dialog Box 2300 is displayed on the display device 106, the current sheet remains still active, so that the spreadsheet user can visualise the data present on it. The RST Instanciator Dialog Box 2300 contains some pieces of information which relate to the instanciation operation.

First the name of the RST that abides by the RSTI to be created, is displayed in a label box 2302.

Second the number of RE's to be present at RSTI creation time is shown in a text box 2311. This number takes a default value equal to the minimum number of RE's, as specified in the definition of the RST that abides by the RSTI to be created. If the spreadsheet user wished to create a RSTI with another number of RE's, then he/she will have to click with the pointing device 105 on the upper or lower side of the spin-button 2303 to either increase or decrease the number of RE's. This number of RE's will vary within a range delimited by the minimum and maximum number of RE's, as specified within the definition of the RST (fields "Min Element #" 2225 and "Max Element #" 2226 within a record 2221 of the RSTT table 2220 whose "Name" field 2222 matches the name displayed in the label box 2302) and is displayed, after possible update, in the text box 2311.

Third the push-button "Cancel" 2308 or the closing-window push-button 2301 allow to close the RST Instanciation Dialog Box 2300 without further action. By clicking with the pointing device 105 on one of these two push-buttons 2301 and 2308, the RST Instanciation Dialog Box 2300 is closed and the RST instanciation operation is aborted.

Fourth the push-button "Create Instance" 2310, when first enabled and second clicked with the pointing device 105 by the spreadsheet user, is the trigger launching the operation of RST instanciation. This push-button "Create Instance" 2310 is enabled (meaning that the method recognises the click event with the pointing device 105 on this push-button "Create Instance" 2310) when the instanciation operation is possible. The fact that this RST instanciation is possible or not depends on different factors: the position of the currently selected cell within the current sheet of the electronic spreadsheet, the size of the RSTI to be created, the presence of any existing STI belonging to the same sheet as the currently selected cell. The possibility to create or not a new RSTI with the size specified in the text box 2303, abiding by a RST whose name is specified by the label box 2302, with the top left corner located on the currently selected cell, is reflected by several label boxes, taking the values "YES" or "NO", which are part of the RST Instanciation Dialog Box 2300: the label box 2304 which reflects if the new RSTI is or not too wide, the label box 2305 which reflects if the new RSTI is or not too high, the label box 2306 which reflects if any existing STI is already defined on the sheet comprising the currently selected cell, and the lable box 2307 which reflects if the creation of the new RSTI may lead to loose any existing data present in one or several spreadsheet cells. As soon as the value "YES" is taken by the label box 2304, or by the label box 2305, or by the label box 2306, then the RSTI creation is considered as impossible, so that the "Create Instance" push-button 2310 get disabled. If the value "No" is displayed in these three label boxes, then the instanciation operation is possible, so that the "Create Instance" push-button 2310 get enabled. When clicked with the pointing device 105 by the spreadsheet user, the instanciation operation is performed, and then the RST Instanciation Dialog Box 2300 is closed.

Fifth the push-button "Create instance in a new sheet" 2309, when first enabled and second clicked with the pointing device 105 by the spreadsheet user, is an alternative trigger launching the operation of RST instanciation, but in a sheet which is created as part of this instanciation operation. In a preferred embodiment of the present invention, the new sheet is created after the sheet comprising the currently selected cell. Any other sheet position could be used instead, without departing from the spirit of the current invention. This push-button "Create instance in a new sheet" 2309 is enabled (meaning that the method recognizes the click event with the pointing device 105 on this push-button "Create instance in a new sheet" 2309) when the instanciation operation is possible in a new sheet. The fact that this RST instanciation is possible or not in a new sheet depends on the size of the RSTI to be created. The possibility to create or not a new RSTI in a new sheet with the size specified in the text box 2303, abiding by a RST whose name is specified by the label box 2302, is reflected by several label boxes, taking the values "YES" or "NO", which are part of the RST Instanciation Dialog Box 2300: the label box 2304 which reflects if the new RSTI is or not too wide, and the label box 2305 which reflects if the new RSTI is or not too high. As soon as the value "YES" is taken by the label box 2304, or by the label box 2305, then the RSTI creation is considered as impossible in a new sheet, so that the "Create instance in a new sheet" push-button 2309 get disabled. If the value "NO" is displayed in these two label boxes, then the instanciation operation is possible in a new sheet, so that the "Create instance in a new sheet" push-button 2309 get enabled. When clicked with the pointing device 105 by the spreadsheet user, the instanciation operation is performed in a new sheet, and then the RST Instanciation Dialog Box 2300 is closed.

2. Second Operation: Removal of Elements from a Defined STI

The fourth operation occurs when the spreadsheet user decides, based on his or her own criteria not detailed here, either to remove some elements from a defined STI, or to clear the content of some elements within a defined STI, or to delete a whole defined STI, or even to delete some spreadsheet cells or columns or rows from the current sheet. The corresponding scenario is described in international patent application PCT/EP 02/09483 (IBM's reference FR9 2001 0029) entitled "System and method in an electronic spreadsheet for exporting-importing the content of input cells from a scalable template instance to another" by Aureglia et al.

3. Third Operation: Removal of Elements from a Defined RSTI

The fifth operation occurs when the spreadsheet user decides, based on his or her own criteria not detailed here, either to delete a whole defined RSTI, or to remove some RE's from a defined RSTI, or to delete selected elements within a STI comprised within a RSTI, or to clear the content of all elements within a selected STI comprised within a RSTI, or to clear the content of selected elements within a STI comprised within a RSTI, or to clear the content of selected elements comprised within the currently selected range of cells, or even to delete some spreadsheet cells or columns or rows from the current sheet.

In a preferred embodiment of the present invention, this operation comprises the following steps:

a. The spreadsheet user first selects a range of cells of his/her choice by using conventional means, such as but not limited to the pointing device 105 or the keyboard 104.

b. RSTI Deletion Manager

Then the spreadsheet user invokes thanks to conventional means available in spreadsheet environment, such as (but not limited to)

dedicated push-buttons, keyboard entry short cuts, menu or sub-menu entries, an original specific command called "RSTI Deletion Manager" which enriches the conventional means for deleting cells or rows or columns within a spreadsheet. In a preferred embodiment of the present invention, the "RSTI Deletion Manager" command is invoked by using the same set of means as the one available in conventional electronic spreadsheets for clearing the content of a single cell or of a range of cells or for removing cells or rows or columns within a sheet, such as but not limited to keying the "Delete" key on the keyboard 104, or clicking with the pointing device 105 on a "Delete" sub-menu entry of the "Range" menu entry, or keying the "Ctrl-" key on the keyboard 104.

When the command is invoked, a test is first performed to determine if the currently selected cell belongs or not to a sheet which comprises a defined RSTI.

If it is not the case, then the command passes control to the STI Deletion Manager command, in order to take care of the presence of any STI that may be impacted by the deletion operation.

If it is the case, then a second test is performed to determine if the currently selected cell is comprised within the RSTI present on the current sheet.

If it is not the case, then the conventional deletion procedures available in the electronic spreadsheet environment are invoked, after having disabled any deletion mode which would corrupt the RSTI present on the current sheet. For instance, if the currently selected cell belongs to a row (respectively column) which is occupied by the RSTI present on the current sheet, then the row (respectively column) deletion mode is disabled.

Figure 16A:
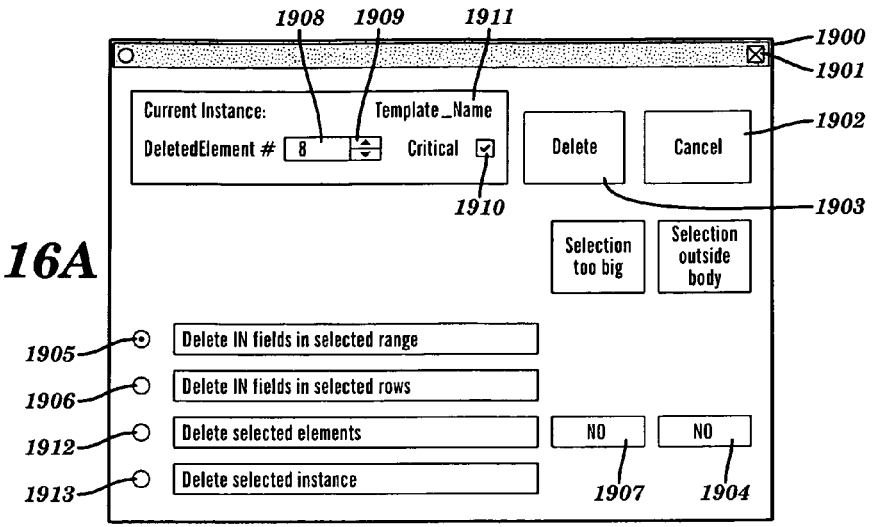
FIGS. 16A, and 16B show each a preferred spreadsheet user interface, according to the preferred embodiment of the present invention, for managing deletion in STI's.
Figure 16B:
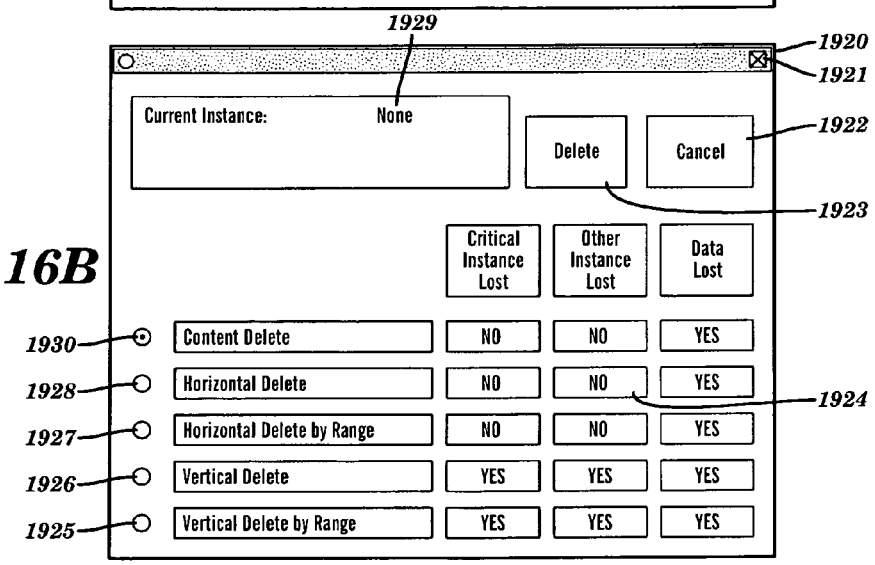
Figure 16C:
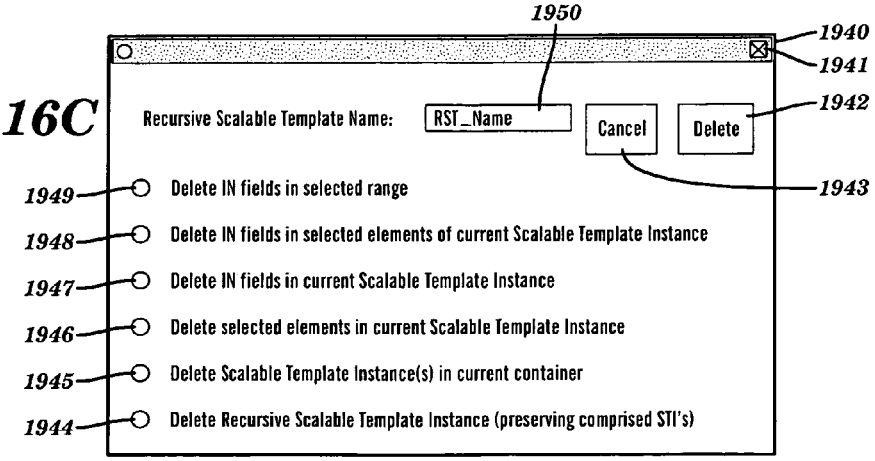
FIG. 16C shows a preferred spreadsheet user interface, according to the preferred embodiment of the present invention, for managing deletion in RSTI's.

If it is the case, then the deletion operation continues by displaying on the display device 106 the RSTI Deletion Manager Dialog Box 1940, as illustrated by FIG. 16C, which contains some pieces of information which relate to the deletion operation. In the following, the RSTI contained on the same sheet as the currently selected cell will be referred to as the current RSTI or cRSTI for short.

First the name of the RST that the cRSTI abides by, is displayed in a label box 1950. Second the different available modes of the deletion are specified through a set of option buttons:

The option button "delete IN fields in selected range" 1949 allows, when enabled, to clear the content of the IN fields comprised within the currently selected range of cells. This option button "delete IN fields in selected range" 1949 is enabled if and only if the currently selected range of cells is comprised within the boundaries of a STI defined as part of the cRSTI. By referring to FIG. 17A which illustrates a possible cRSTI structure, the option button "delete IN fields in selected range" 1949 is enabled when the currently selected range of cells corresponds to the ranges of cells 2018, or 2019, or 2020, or 2021, and is disabled when the currently selected range of cells corresponds to the ranges of cells 2022, or 2023, or 2024, or 2025.

The option button "delete IN fields in selected elements of current STI" 1948 allows, when enabled, to clear the content of the IN fields comprised within the currently selected elements of the STI to which the currently selected cells belongs. This option button "delete IN fields in selected elements of current STI" 1948 is enabled if and only if the currently selected range of cells is comprised within the boundaries of a STI defined as part of the cRSTI. By referring to FIG. 17A which illustrates a possible cRSTI structure, the option button "delete IN fields in selected elements of current STI" 1948 is enabled when the currently selected range of cells corresponds to the ranges of cells 2018, or 2019, or 2020, or 2021, and is disabled when the currently selected range of cells corresponds to the ranges of cells 2022, or 2023, or 2024, or 2025.

The option button "delete IN fields in current STI" 1947 allows, when enabled, to clear the content of all the IN fields comprised within the STI to which the currently selected cells belongs. This option button "delete IN fields in current STI" 1947 is enabled if and only if the currently selected cell is comprised within the boundaries of a STI defined as part of the cRSTI. By referring to FIG. 17A which illustrates a possible cRSTI structure, the option button "delete IN fields in current STI" 1947 is enabled when the currently selected cell corresponds to the ranges of cells 2018, or 2019, or 2020, or 2021, or 2023, or 2025, and is disabled when the currently selected cell corresponds to the ranges of cells 2022, or 2024.

The option button "delete selected elements in current STI" 1946 allows, when enabled, to delete the selected elements of the STI to which the currently selected range of cells belongs. This option button "delete selected elements in current STI" 1946 is enabled if and only if the currently selected range of cells is comprised within the body part of a STI defined as part of the cRSTI. By referring to FIG. 17A which illustrates a possible cRSTI structure, the option button "delete selected elements in current STI" 1946 is enabled when the currently selected range of cells corresponds to the ranges of cells 2018, or 2019, and is disabled when the currently selected range of cells corresponds to the range of cells 2020, or 2021, or 2022, or 2023, or 2024, or 2025.

The option button "delete STI(s) in current container" 1945 allows, when enabled, to delete the one or plurality of STI(s) belonging to the container row to which the currently selected cells belongs. This option button "delete STI(s) in current contained 1945 is enabled if and only if the currently selected cell is comprised within the body part of cRSTI. By referring to FIG. 17A which illustrates a possible cRSTI structure, the option button "delete STI(s) in current container" 1945 is enabled when the currently selected cell corresponds to the ranges of cells 2018, or 2019, or 2022, or 2023, and is disabled when the currently selected cell corresponds to the ranges of cells 2020, or 2021, or 2024, or 2025.

The option button "delete RSTI (preserving comprised STI's)" 1944 allows to dequalify the range of cells cRSTI so that it becomes a set of STI's, but no longer treated as a RSTI. This option button "delete RSTI (preserving comprised STI's)" 1944 is always enabled, and is the default deletion mode when the RSTI Deletion Manager Dialog Box 1940 is first displayed.

If the spreadsheet user wishes to change the default mode of deletion which is "delete RSTI (preserving comprised STI's)" or a previously changed mode of deletion, then he/she uses the pointing device 105 to click on one of the six option buttons, if enabled:

"delete RSTI (preserving comprised STI's)" 1944, or

"delete STI(s) in current container" 1945, or

"delete selected elements in current STI" 1946, or

"delete IN fields in current STI" 1947, or

"delete IN fields in selected elements of current STI" 1948, or

"delete IN fields in selected range" 1949, which will display alone a black point specifying the new selected mode of deletion. Any attempt to click with the pointing device 105 on a disabled option button will have no effect.

Third the push-button "Cancel" 1943 or the closing-window push-button 1941 allow to close the RST Deletion Manager Dialog Box 1940 without further action. By clicking with the pointing device 105 on one of these two push-buttons 1941 and 1942, the RST Deletion Manager Dialog Box 1940 is closed and the RSTI deletion operation is aborted.

Fourth the push-button "Delete" 1942, when clicked with the pointing device 105 by the spreadsheet user, is the trigger launching the operation of RSTI deletion. This push-button "Delete" 1942 is always enabled (meaning that the method recognises the click event with the pointing device on this push-button "Delete" 1942) as the deletion operation is always possible (at least with the default mode corresponding to the option button "delete RSTI (preserving comprised STI's)" 1944. The deletion operation is performed according to the deletion mode selected by the spreadsheet user. This can be illustrated with the diagram of FIG. 17A where the cRSTI corresponds to the range of cells 2001.

If the deletion mode corresponds to the option button "delete RSTI (preserving comprised STI's)" 1944, and the currently selected range of cells corresponds to the range of cells 2024, then the deletion operation consists in dequalifying the range of cells 2001 as a RSTI. Nevertheless the collection of STI's which were forming the cRSTI are still qualified as STI's and can thus benefit from the associated tools.

If the deletion mode corresponds to the option button "delete STI(s) in current container" 1945, and the currently selected range of cells corresponds to the range of cells 2022, then the deletion operation consists in removing from the cRSTI the row container 2010, so that the cRSTI will contain afterwards only 2 RE's mapped to the container rows 2009 and 2008 (while the RME's 2012, 2011, and 2007 are untouched).

If the deletion mode corresponds to the option button "delete selected elements in current STI" 1946, and the currently selected range of cells corresponds to the range of cells 2019, then the deletion operation consists in removing from the STI 2032 the elements occupying the same rows as the currently selected range of cells 2019.

If the deletion mode corresponds to the option button "delete IN fields in current STI" 1947, and the currently selected range of cells corresponds to the range of cells 2021, then the deletion operation consists in clearing all the IN fields belonging to the STI 2031.

If the deletion mode corresponds to the option button "delete IN fields in selected elements of current STI" 1948, and the currently selected range of cells corresponds to the range of cells 2018, then the deletion operation consists in clearing all the IN fields belonging to the elements of the STI 2034 occupying the same rows as the currently selected range of cells 2018.

If the deletion mode corresponds to the option button "delete IN fields in selected range" 1949, and the currently selected range of cells corresponds to the range of cells 2020, then the deletion operation consists in clearing the IN fields of the STI 2030 belonging to the currently selected range of cells 2020.

Figure 8:
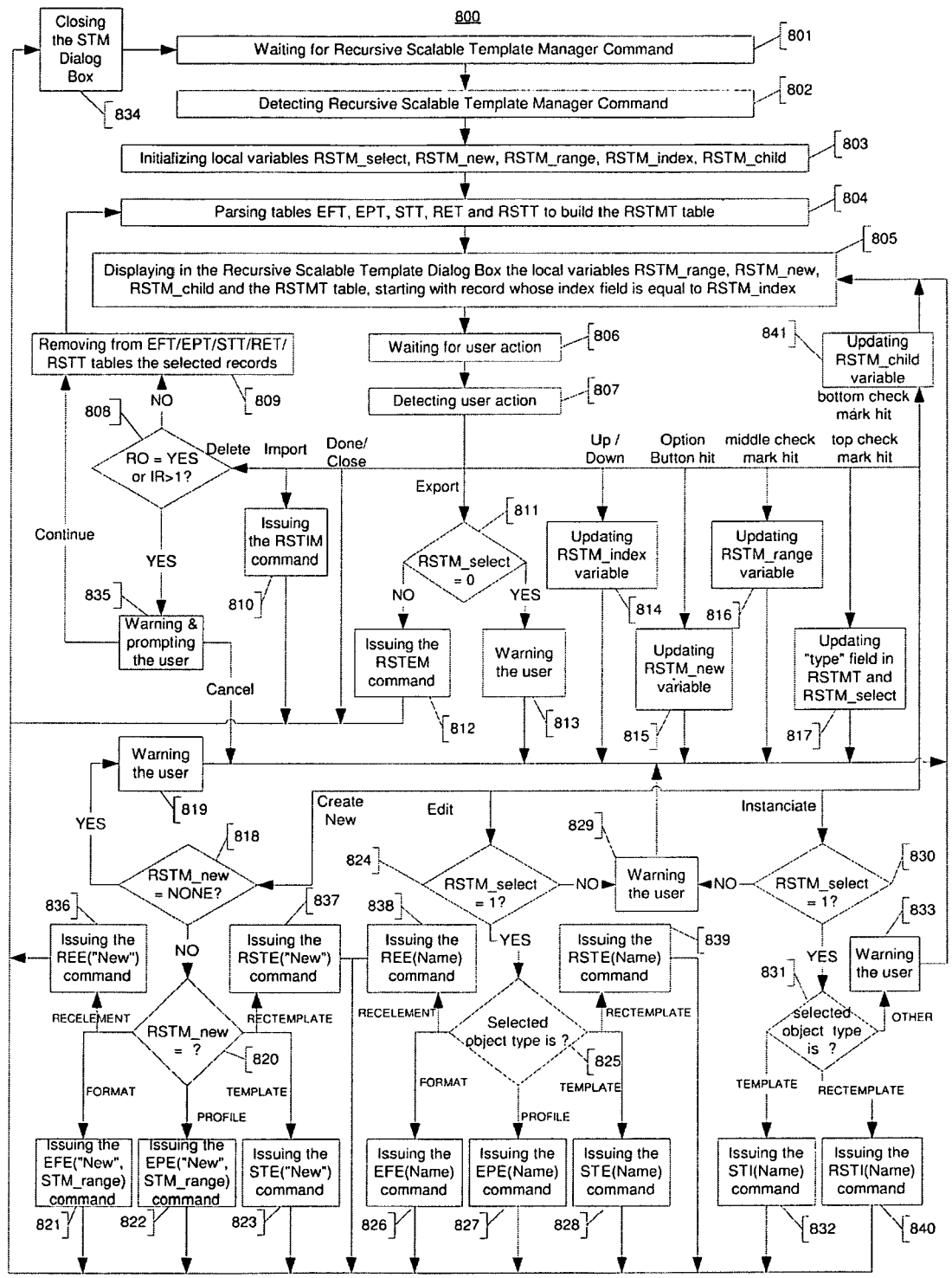
FIG. 8 is a flow chart illustrating a preferred method for managing RST objects according to a preferred embodiment of the present invention.

Once the deletion operation is complete, the RSTI Deletion Manager Dialog Box 1940 is closed, ending the command "RSTI Deletion Manager", E. Methods E1. RST Manager Method The method for managing EF's, MEF's, EP's, MEP's, ST's, RE's and RST's used in the preferred embodiment of the present invention is summarized in flowchart 800 of FIG. 8. This method can be seen as the processing of the RST Manager command.

At step 801, the method is in its default state, waiting for an event to initiate the process.

At step 802, the RST Manager command is detected, as a result of a user action. This action can be for instance:

a specific combination of key on the keyboard 104, or the click of the pointing device 105 on a specific button, or any other similar means not further specified here.

At step 803, some local variables are initialized:

the local variable RSTM_select is set to the value 0 (zero), the local variable RSTM_new is set to the value "NONE", the local variable RSTM_range is set to the value "NO", and the local variable RSTM_index is set to the value 1 (one), and The local variable RSTM_child is set to the value "NO".

At step 804, the five tables EFT 700, EPT 710, STT 720, RET 2210 and RSTT 2220 are parsed to derive the table RSTMT 2230. For each respective record 701, or 711, or 721, or 2211, or 2221 found in one of these five tables, is created a new record 2231 within the RSTMT table 2230.

Referring now to FIGS. 7A, 7B, 7C, 19A, 19B and 19C, this construction is done by copying in sequence all the fields defined in the record 701 ("Name" field 702, "Last Change Date" field 703, "Description Ptr" field 704, "Row #" field 705, "Column #" field 706 and "Type" field 707), or in the record 711 ("Name" field 712, "Last Change Date" field 713, "Description Ptr" field 714, "Row #" field 715, "Column #" field 716 and "Type" field 717), or in the record 721 ("Name" field 722, "Last Change Date" field 723, "Description Ptr" field 724, "Min Element #" field 725, "Max Element #" field 726 and "Type" field 727), or in the record 2211 ("Name" field 2212, "Last Change Date" field 2213, "Description Ptr" field 2214, "Row #" field 2215, "Column #" field 2216 and "Type" field 2217), or in the record 2221 ("Name" field 2222, "Last Change Date" field 2223, "Description Ptr" field 2224, "Min Element #" field 2225, "Max Element #" field 2226 and "Type" field 2227) onto the corresponding fields of the record 2231 ("Name" field 2232, "Last Change Date" field 2233, "Description Ptr" field 2234, "Info Field 1" field 2235, "Info Field 2" field 2236 and "Type" field 2237), then by initializing in the "Type" field 2237 the "SELECTED" attribute 2242 to "NO" and the "NATURE" attribute 2241 to the values "FORMAT", or "PROFILE" or "TEMPLATE" or "RECELEMENT" or "RECTEMPLATE" if the record 2231 has been respectively copied from a record 701, or 711, or 721, or 2211, or 2221 and then by initializing the last field "Index" 2238 with the value of a counter which increments for each new record and which starts with the value 1 (one).

At step 805, the RST Manager Dialog Box 200 is displayed on the display device 106.

The "Name" information appearing on the top of the list box 213 corresponds to the "Name" field 2232 of the record 2231 in the RSTMT table 2230 whose "Index" field 2238 is equal to the local variable RSTM_index. Underneath "Name" information's within this list box 213 correspond to the "Name" field 2232 of the following records 2231 of the RSTMT table 2230.

The "Type" information appearing on the top of the list box 214 is derived from the "Type" field 2237 (attributes "NATURE" 2241 and "META" 2239) of the record 2231 in the RSTMT table 2230 whose "Index" field 2238 is equal to the local variable RSTM_index. Underneath "Type" information's within this list box 213 are derived from the "Type" field 2237 (attributes "NATURE" 2241 and "META" 2239) of the following records 2231 of the RSTMT table 2230.

The "Modified" information appearing on the top of the list box 202 corresponds to the "Last Change Date" field 2233 of the record 2231 in the RSTMT table 2230 whose "Index" field 2238 is equal to the local variable RSTM_index. Underneath "Modified" information's within this list box 213 correspond to the "Last Change Date" field 2233 of the following records 2231 of the RSTMT table 2230.

The check box 212 is filled with a check mark if the "Type" field 2237 of the record 2231 in the RSTMT table 2230 whose "Index" field 2238 is equal to the local variable RSTM_index has the "SELECTED" attribute 2242 equal to "YES". Underneath check boxes on the left of the list box 213 are also derived from the "Type" field 2237 ("SELECTED" attribute 2242) of the following records 2231 of the RSTMT table 2230.

The option button "Format" 217 displays a black point if and only if the local variable RSTM_new is equal to "FORMAT". The option button "Profile" 209 displays a black point if and only if the local variable RSTM_new is equal to "PROFILE". The option button "Template" 216 displays a black point if and only if the local variable RSTM_new is equal to "TEMPLATE". The option button "RE" 218 displays a black point if and only if the local variable RSTM_new is equal to "RECELEMENT". The option button "Recursive Template" 219 displays a black point if and only if the local variable RSTM_new is equal to "RECTEMPLATE".

The check box "From current selection" 208 displays a check mark if and only if the local variable RSTM_range is equal to "YES".

The check box "Including child objects (for Export)" 220 displays a check mark if and only if the local variable RSTM_child is equal to "YES".

At step 806, the method is waiting for any user action on the RST Manager Dialog Box 200. Such user action is typically resulting from a click with the pointing device 105, but take other similar forms such as, but not limited to a specific combination of key on the keyboard 104, or any other similar means not further specified here.

At step 807, a user action on the RST Manager Dialog Box 200 is detected.

If the user action is a click on the push-button "Delete" 207, then control is given to step 808;

if the user action is a click on the push-button "Import" 205, then control is given to step 810;

if the user action is a click on the push-button "Done" 201 or on the closing-window push-button 215, then control is given to step 834;

if the user action is a click on the push-button "Export" 206, then control is given to step 811;

if the user action is a click on the scrolling bar 203, either on the up direction or on the down direction, then control is given to step 814;

if the user action is a click on the option buttons "Format" 217, or "Profile" 209, or "Template" 216, or "RE" 218, or "Recursive Template" 219, then control is given to step 815;

if the user action is a click on the check box "From current selection" 208, then control is given to step 816;

if the user action is a click on the check box "Including child objects (for Export)" 220, then control is given to step 841;

if the user action is a click on a top check box like the check box 212, then control is given to step 817;

if the user action is a click on the push-button "Instanciate" 204, then control is given to step 830;

if the user action is a click on the push-button "Edit" 211, then control is given to step 824 and;

if the user action is a click on the push-button "Create New" 210, then control is given to step 818.

At step 808, a test is performed on each of the records 2231 of the RSTMT table 2230 whose "Type" field 2237 has the "SELECTED" attribute 2242 with the subfield "REFERENCED OBJECT" (RO) 2240d equal to "YES" or with the subfield "INSTANCE REFERENCE" (IR) 2240c larger than 1 (one) (this test determines if there exist some objects referring to one of the selected objects, or if there exist some instance abiding by one of the selected objects).

If it is the case, then control is given to step 835 (meaning that at least one record 2231 of the RSTMT table 2230 previously selected was referenced by a ST, or by a STI, or by a RE, or by a RST, or by a RSTI);

otherwise control is given to step 809.

At step 809, each respective record 701, 711, 721, 2211 and 2221 is removed from the EFT table 700, EPT table 710, STT table 720, RET table 2210, and RSTT table 2220, if the corresponding respective "Name" field 702, 712, 722, 2212, and 2222 matches the "Name" field 2232 of a record 2231 of the RSTMT table 2230 whose "Type" field 2237 has the "SELECTED" attribute 2242 equal to "YES", as resulting from the step 817. Then the local variable RSTM_select is reset to the value 0 (zero). Then control is given to the step 804 for rebuilding the RSTMT table 2230.

At step 810, the RST Import Manager command is issued and then control is given to step 834.

At step 811, a test is performed to determine if the local variable RSTM_select is equal to 0 (zero).

If it is the case, then control is given to step 813;

otherwise control is given to step 812.

At step 812, the RST Export Manager command is issued and then control is given to step 834.

At step 813, a warning message notification is issued for informing the user that at least one object must be selected prior clicking on the "Export" push-button 206. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 814, the local variable RSTM_index is either incremented or decremented by 1 (one) according to the direction (up or down) specified by the pointing device 105 on the scrolling bar 203, and as long as it value remains positive and less than or equal to the number of records 2231 defined within the RSTMT table 2230. Then control is given to step 805.

At step 815, the local variable RSTM_new is updated to reflect the option button hit by the user with the pointing device 105.

If the user has clicked on the "Format" option button 217, then the local variable RSTM_new takes the value "FORMAT".

If the user has clicked on the "Profile" option button 209, then the local variable RSTM_new takes the value "PROFILE".

If the user has clicked on the "Template" option button 216, then the local variable RSTM_new takes the value "TEMPLATE".

If the user has clicked on the "RE" option button 218, then the local variable RSTM_new takes the value "RECELEMENT".

If the user has clicked on the "Recursive Template" option button 219, then the local variable RSTM_new takes the value "RECTEMPLATE".

Then control is given to step 805.

At step 816, the local variable RSTM_range is updated, so that its value swaps between "YES" and "NO". In addition, a check mark is respectively added within or removed from the check box 206 if it was previously absent or present in this same check box 206. Then control is given to step 805.

At step 817, the method updates the value of the "Type" field 2237 of the record 2231 within the RSTMT table 2230, whose "Name" field 2232 is found equal to the character string located within the list box 213 immediately on the right of the check box on which the user has just clicked.

If the previous value of this "Type" field 2237 had the "SELECTED" attribute 2242 equal to "YES", then the value update consists in turning this "SELECTED" attribute 2242 to "NO"; reversibly if the previous value of the "SELECTED" attribute 2242 was equal to "NO", then the value update consists in turning this "SELECTED" attribute 2242 to "YES".

In the first case the local variable RSTM_select is decremented by 1, and in the second case the local variable RSTM_select is incremented by 1.

Furthermore in the first case the check mark previously present in the check box on which the user has just clicked is removed from this check box and in the second case a check mark is displayed in the check box on which the user has just clicked. Then control is given to step 805.

At step 818, a test is performed to determine if the local variable RSTM_new is equal to "NONE". If it is the case, then control is given to step 819; otherwise control is given to step 820.

At step 819, a warning message notification is issued for informing the user that at least one option ("Format" option button 217, or "Profile" option button 209, or "Template" option button 216, or "RE" option button 218, or "Recursive Template" option button 219) must be selected prior clicking on the "Create New" push-button 210. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 820, a test is performed to determine the value taken by the local variable RSTM_new.

If found equal to "FORMAT", then control is given to step 821;

If found equal to "PROFILE", then control is given to step 822;

If found equal to "TEMPLATE", then control is given to step 823.

If found equal to "RECELEMENT", then control is given to step 836.

If found equal to "RECTEMPLATE", then control is given to step 837.

At step 821, the EF Editor command is issued with passing two parameters ("NEW"; RSTM_range) and then control is given to step 834.

At step 822, the EP Editor command is issued with passing two parameters ("NEW"; RSTM_range) and then control is given to step 834.

At step 823, the ST Editor command is issued with passing one parameter ("NEW") and then control is given to step 834.

At step 824, a test is performed to determine if the local variable RSTM_select is equal to 1 (one). If it is the case, then control is given to step 825; otherwise control is given to step 829.

At step 825, a test is performed to determine the nature of the selected object, as specified by the "Type" field 2237 "NATURE" attribute 2241 of the corresponding record 2231 of the RSTMT table 2230.

If found equal to "FORMAT", then control is given to step 826;

if found equal to "PROFILE", then control is given to step 827;

if found equal to "TEMPLATE", then control is given to step 828.

if found equal to "RECELEMENT", then control is given to step 838.

if found equal to "RECTEMPLATE", then control is given to step 839.

At step 826, the EP Editor command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 827, the EF Editor command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 828, the ST Editor command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 829, a warning message notification is issued for informing the user that a single object must be selected within the ST Manager Dialog Box (thanks to check boxes like 212) prior clicking on the "Edit" push-button 211 or on the "Instanciate" push-button 204. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 830, a test is performed to determine if the local variable RSTM_select is equal to 1 (one). If it is the case, then control is given to step 831; otherwise control is given to step 829.

At step 831, a test is performed to determine the nature of the selected object, as specified by the "Type" field 2237 "NATURE" attribute 2241 of the corresponding record 2231 of the RSTMT table 2230.

If found equal to "TEMPLATE", then control is given to step 832;

If found equal to "RECTEMPLATE", then control is given to step 840;

otherwise control is given to step 833.

At step 832, the ST Instanciator command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 833, a warning message notification is issued for informing the user that a single ST object or a single RST object must be selected within the RST Manager Dialog Box (thanks to check boxes like 212) prior clicking on the "Instanciate" push-button 204. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 805.

At step 834, the RST Manager Dialog Box 200 is closed so that it disappears from the display device 106 and then control is given back to the initial step 801 for processing any future RST Manager command.

At step 835, a warning message notification is issued for informing the user that at least one selected object to be deleted is referenced by another object. This can typically be done by displaying on the display device 106 a warning message in a pop-up window, or in a status bar area, but any other similar means could be used instead, without departing from the spirit of the invention. Then the user is prompted to either cancel the current "Delete" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an "Cancel" or "Continue" push-button present within a prompting message pop-up window, or any other similar means without departing from the spirit of the invention, control is given to step 805 if the spreadsheet user decision is to cancel the "Delete" operation, or to step 809 if the spreadsheet user decision is to continue the "Delete" operation.

At step 836, the RE Editor command is issued with passing one parameter ("NEW") and then control is given to step 834.

At step 837, the RST Editor command is issued with passing one parameter ("NEW") and then control is given to step 834.

At step 838, the RE Editor command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 839, the RST Editor command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 840, the RST Instanciator command is issued with passing one parameter equal to the "Name" field 2232 of the unique record 2231 of the RSTMT table 2230 whose "Type" field 2237 has the "SELECTED" attribute 2242 equal to "YES", and then control is given to step 834.

At step 841, the value of the local variable RSTM_child is updated by swapping the values "YES" and "NO". Then control is given to step 805.

E2. EF Editor Method

Figure 9:
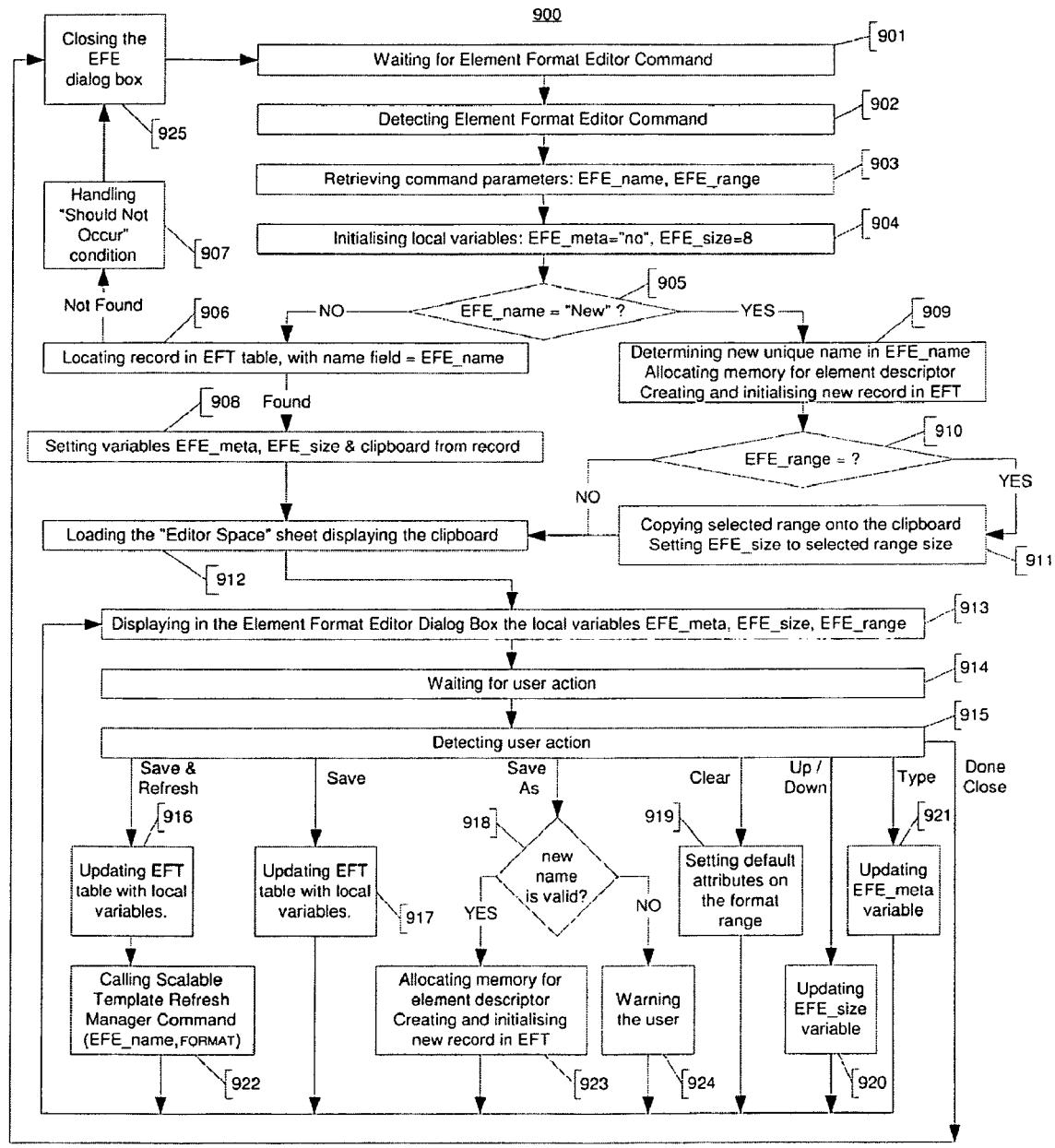
FIG. 9 is a flow chart illustrating a preferred method for editing EF's and MEF's according to a preferred embodiment of the present invention.

The method for creating or updating EF's or MEF's used in the preferred embodiment of the present invention is summarized in flowchart 900 of FIG. 9. This method can be seen as the processing of the EF Editor command.

At step 901, the method is in its default state, waiting for an event to initiate the process.

At step 902, the EF Editor command is detected, as a result of an user action. This action can be for instance:
a specific combination of key on the keyboard 104, or
the click of the pointing device 105 on a specific button, or
any other similar means not further specified here.

At step 903, the parameters of the command are retrieved. They correspond to:
a first mandatory parameter EFE_name which can either take a reserved value "NEW" or another value corresponding to a character string name, as found in the "Name" field 2232 of a record 2231 within the RSTMT table 2230; and
a second optional parameter EFE_range which can take only two predefined values "YES" and "NO". This second optional parameter must be present when the first mandatory parameter value differs from the "NEW".
These two parameters are recorded as local variables.

At step 904, some local variables are initialized: the local variable EFE_meta is set to the value "NO", the local variable EFE_size is set to the value 8 (eight).

At step 905, a test is performed to determine the value taken by the local variable EFE_name. If found equal to "NEW", then control is given to step 909; otherwise control is given to step 906.

At step 906, the EFT table 700 is looked up to locate a record 701 whose "Name" field 702 is found equal to the value taken by the local variable EFE_name. If such a record is found, then control is given to step 908; otherwise control is given to step 907.

At step 907, an exception handler is invoked to treat this "should not occur" condition. Such operation is implementation dependent and can take different forms such as the display on the display device 106 of an error message pop-up window. Then control is given to step 925.

At step 908, the local variable EFE_meta is set to the value "YES" or "NO" according to the value of the "META" attribute 708 within the "Type" field 707 of the record 701 found at step 906, the local variable EFE_size is set to the value found in the "Column #" field 706 of the record 701 found at step 906, and the memory location pointed by the "Description Ptr" field 704 of the record 701 found at step 906 is copied onto the clipboard.

Then control is given to step 912.

At step 909, a new name for the newly created EF or MEF is determined, according to a name string taking in a preferred embodiment of the present invention the form "New XX" where XX corresponds to a counter value ensuring the name uniqueness with respect to all the names previously defined and recorded in the "Name" fields 702, 712, 722, 2212 and 2222 found in the respective records 701, 711, 721, 2211 and 2221 of the respective tables EFT 700, EPT 710, STT 720, RET 2210 and RSST 2220. Any other similar conventional means could be used instead without departing from the spirit of the invention, as long as the uniqueness of the newly created name is ensured.

Then the new name is recorded in the local variable EFE_name. Then memory space is allocated within the main memory 102 to later record the illustrative range of cells for the EF or MEF. This allocated memory is part of the memory space corresponding to the currently opened electronic spreadsheet file.

Then a new record 701 is created in the EFT table 700, and this new record 701 is initialized as follows:

the "Name" field 702 is set to the value of the local variable EFE_name;

the "Last Change Date" field 703 is set to the system time reference, as known by the central processor 101;

the "Description Ptr" field 704 is set to the memory location which has just been allocated;

the "Row #" field 705 is set to the value 1 (as in the preferred embodiment of the present invention the ST's are managed in a 2D environment; this field would carry the number of defined rows for the created EF or MEF in a 3D environment);

the "Column #" field 706 is set to the value of the local variable EFE_size; and the "Type" field 707 is set as follows: the attribute "META" 708 is set equal to the value of the local variable EFE_meta, and the attribute "REFERENCED" 709 is initialized as follows:

The "OWN REFERENCE" (OR) subfield 709a is initialized with a prime number not yet assigned to any other OR subfield 709a, or 719a, or 729a, or 780a, or 2219a, or 2229a, or 2240a. Various conventional techniques can be used for identifying a prime number, and are not further detailed here.

The "FILIATION REFERENCE" (FR) subfield 709b is initialized with the value 1 (one).

The "INSTANCE REFERENCE" (IR) subfield 709c is initialized with the value 1 (one).

The "REFERENCED OBJECT" (RO) subfield 709d is initialized with the following formula, where the P set corresponds to the set of ST's:

RO="YES" if $LCM(\{FR_i\})_{i \in P}$ Mod OR=0;

RO="NO" otherwise.

The "SELECTED CHILDREN" (SC) subfield 709e is initialized with the following formula, where the S set corresponds to the set of selected objects (having the "SELECTED" attribute 2242 equal to the value "YES" in the RSTMT table 2230):

SC="YES" if $LCM(\{FR_i\})_{i \in S}$ Mod OR=0 #OR# EFE_name$\in$S,

SC="NO" otherwise.

Then control is given to step 910.

At step 910, a test is performed to determine the value taken by the local variable EFE_range. If found equal to "YES", then control is given to step 911; otherwise control is given to step 912.

At step 911, the currently selected range of cells is copied onto the clipboard and the local variable EFE_size is set equal to the number of columns of the selected range.

At step 912, the "Editor Space" sheet 315 is made the current sheet and the content of the clipboard is pasted on this blank sheet at a fixed cell address 314 (address B2 in a preferred embodiment of the present invention, as shown on FIG. 3), so that the user can visualize on the display device 106 an illustration of the EF or MEF.

At step 913, the EF Editor Dialog Box 301 is displayed on the display device 106. The label box 304 is initialized with the value of the local variable EFE_name.

The top (respectively bottom) option button 310 is filled with a black point if the local variable EFE_meta is found equal to "NO" (respectively "YES").

The text box 306 is filled with the value of the local variable EFE_size.

The push-buttons "Save" 312 and "Save & Refresh" 308 are enabled if the local variable EFE_size is found equal to the "Column #" field 706 of the current record 701, or if the attribute "REFERENCED" 709 within the "Type" field 707 of this same record 701 is found with the subfield "REFERENCED OBJECT" 709d (RO) equal to "NO", so that any future click with the pointing device 105 on one of these two push-buttons "Save" 312 and "Save & Refresh" 308 will be recognized as a valid event.

The push-buttons "Save" 312 and "Save & Refresh" 308 are disabled otherwise (local variable EFE_size is not found equal to the "Column #" field 706 of the current record 701, and the attribute "REFERENCED" 709 within the "Type" field 707 of this same record 701 is found with the subfield "REFERENCED OBJECT" 709d (RO) equal to "YES"), so that any future click with the pointing device 105 on one of these two push-buttons "Save" 312 and "Save & Refresh" 308 will not be recognized as an event.

At step 914, the method is waiting for any user action on the EF Editor Dialog Box 301. Such user action is typically resulting from a click with the pointing device 105, but take other similar forms such as, but not limited to a specific combination of key on the keyboard 104, or any other similar means not further specified here.

At step 915, a user action on the EF Editor Dialog Box 301 is detected.

If the user action is a click on the push-button "Save & Refresh" 308, then control is given to step 916;

if the user action is a click on the push-button "Save" 312, then control is given to step 917;

if the user action is a click on the push-button "Save As" 311, then control is given to step 918;

if the user action is a click on the push-button "Clear" 309, then control is given to step 919;

if the user action is a click on the spin button 307, then control is given to step 920;

if the user action is a click on one of the two option buttons 310, then control is given to step 921;

if the user action is a click on the push-button "Done" 303, or on the closing-window push-button 302, then control is given to step 925.

At step 916, the EFT table 700 is updated and saved as part of the electronic spreadsheet file by refreshing the record 701 whose "Name" field 702 is equal to the local variable EFE_name. For this purpose, the "Last Change Date" field 703 is set to the system time reference, as known by the central processor 101;

the "Column #" field 706 is set to the value of the local variable EFE_size; and the "Type" field 707 is set as follows: the attribute "META" 708 is set equal to the value of the local variable EFE_meta.

In addition the range of cells 314 illustrating on the "Editor Space" sheet 315 the current definition of the EF or MEF is copied onto the memory location pointed by the "Description Ptr" field 704. Then control is given to step 922.

At step 917, the EFT table 700 is updated and saved as part of the electronic spreadsheet file by refreshing the record 701 whose "Name" field 702 is equal to the local variable EFE_name. For this purpose, the "Last Change Date" field 703 is set to the system time reference, as known by the central processor 101;

the "Column #" field 706 is set to the value of the local variable EFE_size; and the "Type" field 707 is set as follows: the attribute "META" 708 is set equal to the value of the local variable EFE_meta.

In addition the range of cells 314 illustrating on the "Editor Space" sheet 315 the current definition of the EF or MEF is copied onto the memory location pointed by the "Description Ptr" field 704. Then control is given to step 913.

At step 918, a test is performed on the value found in the text box 305 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, 722, 2212 and 2222. If validity and uniqueness are proven, then control is given to step 923; otherwise control is given to step 924.

At step 919, the default attributes currently defined in the spreadsheet environment are applied to the "Editor Space" sheet 315, so that the displayed illustration of the EF or MEF receives these same default attributes. Then control is given to the step 913.

At step 920, the local variable EFE_size is either incremented or decremented by 1 (one) according to the direction (up or down) specified by the pointing device 105 on the spin button 307, and as long as it value remains positive and less than or equal to an upper limit set equal to 254 in a preferred embodiment of the present invention. Then control is given to step 913.

At step 921, the local variable EFE_meta is updated, so that its value becomes "YES" (respectively "NO") if the bottom (respectively top) option button 310 has been clicked on. Then control is given to step 913.

At step 922, the ST Refresh Manager command is issued with the following parameters: EFE_name, "FORMAT" and then control is given to step 913.

At step 923, memory space is allocated within the main memory 102 to later record the illustrative range of cells for the EF or MEF. This allocated memory is part of the memory space corresponding to the currently opened electronic spreadsheet file. Then a new record 701 is created in the EFT table 700 which is saved as part of the electronic spreadsheet file, and this new record 701 is initialized as follows:

the "Name" field 702 is set to the value found in the text box 305 and validated at step 918; this field 702 becoming then the new value of the EFE_name local variable;

the "Last Change Date" field 703 is set to the system time reference, as known by the central processor 101;

the "Description Ptr" field 704 is set to the memory location which has just been allocated;

the "Row #" field 705 is set to the value 1 (as in the preferred embodiment of the present invention the ST's are managed in a 2D environment; this field would carry the number of defined rows for the created EF or MEF in a 3D environment);

the "Column #" field 706 is set to the value of the local variable EFE_size; and the "Type" field 707 is set as follows: the attribute "META" 708 is set equal to the value of the local variable EFE_meta, and the attribute "REFERENCED" 709 is initialized as follows:

The "OWN REFERENCE" (OR) subfield 709*a* is initialized with a prime number not yet assigned to any other OR subfield 709*a*, or 719*a*, or 729*a*, or 780*a*, or 2219*a*, or 2229*a*, or 2240*a*. Various conventional techniques can be used for identifying a prime number, and are not further detained here.

The "FILIATION REFERENCE" (FR) subfield 709*b* is initialized with the value 1 (one).

The "INSTANCE REFERENCE" (IR) subfield 709*c* is initialized with the value 1 (one).

The "REFERENCED OBJECT" (RO) subfield 709*d* is initialized with the following formula, where the P set corresponds to the set of ST's:

$RO=\text{"YES"}$ if $LCM(\{FR_i\})_{i \in P} \bmod OR = 0$;

$RO=\text{"NO"}$ otherwise.

The "SELECTED CHILDREN" (SC) subfield 709*e* is initialized with the following formula, where the S set corresponds to the set of selected objects (having the "SELECTED" attribute 2242 equal to the value "YES" in the RSTMT table 2230):

SC="YES" if LCM({FR$_i$})$_{i \in S}$ Mod OR=0 #$_{OR}$# $EFE\_name \in S$;

SC="NO" otherwise.

Then control is given to step 913.

At step 924, a warning message notification is issued for informing the user that a valid and unique name must be specified in the text box 305 prior to clicking on the "Save As" push-button 311. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 913.

At step 925, the EF Editor Dialog Box 501 is closed so that it disappears from the display device 106, then the "Editor Space" sheet 515 is removed from the displayed window so that it is replaced by the original sheet present at EF Editor invocation time. Finally control is given back to the initial step 901 for processing any future EF Editor command.

E3. EP Editor Method

Figure 10:
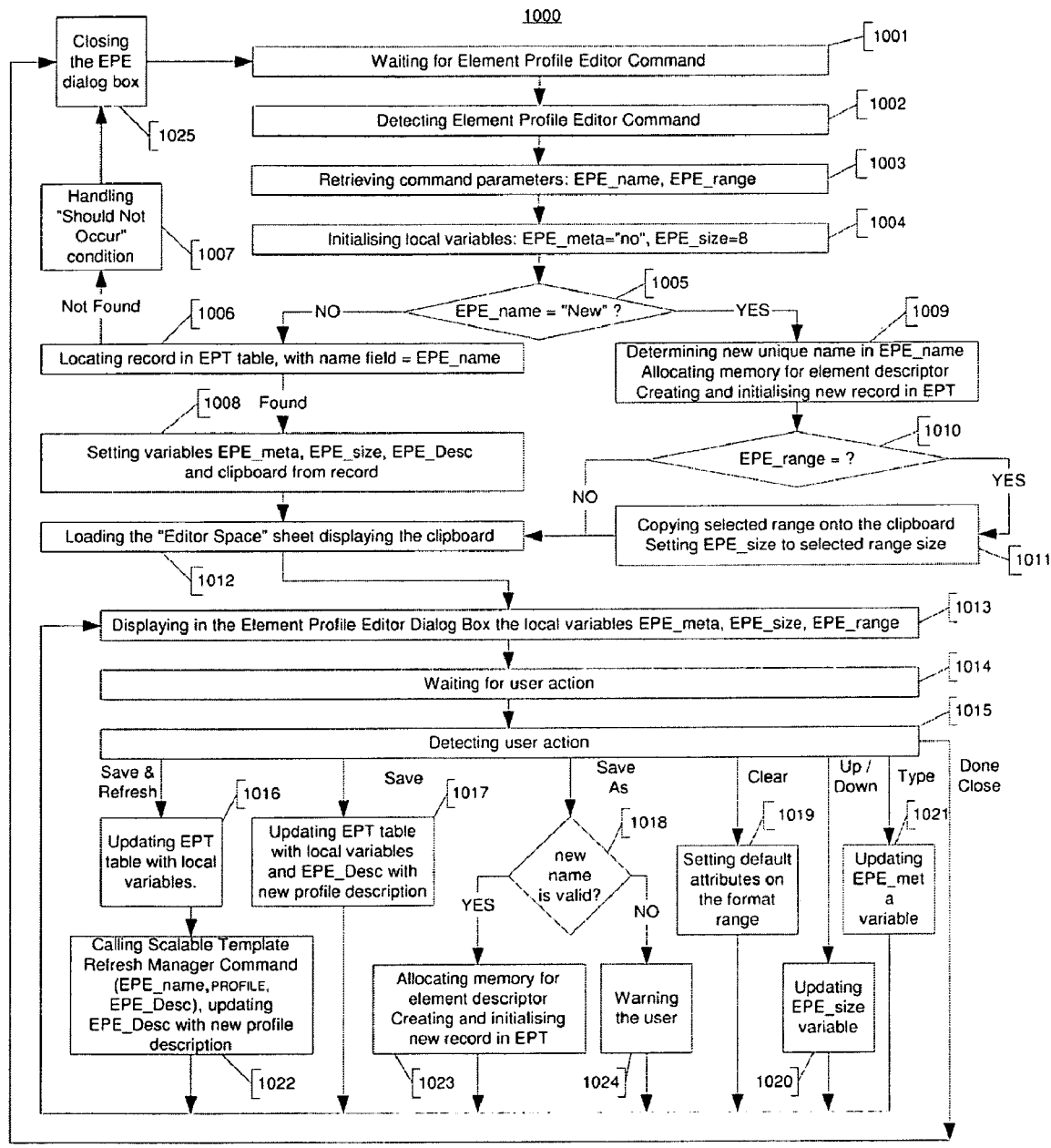
FIG. 10 is a flow chart illustrating a preferred method for editing EP's and MEP's according to a preferred embodiment of the present invention.

The method for creating or updating EP's or MEP's used in the preferred embodiment of the present invention is summarized in flowchart 1000 of FIG. 10. This method can be seen as the processing of the EP Editor command.

At step 1001, the method is in its default state, waiting for an event to initiate the process.

At step 1002, the EP Editor command is detected, as a result of an user action. This action can be for instance:
a specific combination of key on the keyboard 104, or
the click of the pointing device 105 on a specific button, or
any other similar means not further specified here.

At step 1003, the parameters of the command are retrieved. They correspond to:
a first mandatory parameter EPE_name which can either take a reserved value "NEW" or another value corresponding to a character string name, as found in the "Name" field 2232 of a record 2231 within the RSTMT table 2230; and
a second optional parameter EPE_range which can take only two predefined values "YES" and "NO". This second optional parameter must be present when the first mandatory parameter value differs from the "NEW".

These two parameters are recorded as local variables.

At step 1004, some local variables are initialized: the local variable EPE_meta is set to the value "NO", the local variable EPE_size is set to the value 8 (eight).

At step 1005, a test is performed to determine the value taken by the local variable EPE_name. If found equal to "NEW", then control is given to step 1009; otherwise control is given to step 1006.

At step 1006, the EPT table 710 is looked up to locate a record 711 whose "Name" field 712 is found equal to the value taken by the local variable EPE_name. If such a record is found, then control is given to step 1008; otherwise control is given to step 1007.

At step 1007, an exception handler is invoked to treat this "should not occur" condition. Such operation is implementation dependent and can take different forms such as the display on the display device 106 of an error message pop-up window. Then control is given to step 1025.

At step 1008,
the local variable EPE_meta is set to the value "YES" or "NO" according to the value of the "META" attribute 718 within the "Type" field 717 of the record 711 found at step 1006,
the local variable EPE_size is set to the value found in the "Column #" field 716 of the record 711 found at step 1006, and
the memory location pointed by the "Description Ptr" field 714 of the record 711 found at step 1006 is copied onto the clipboard and within the local variable EPE_Desc.

Then control is given to step 1012.

At step 1009, a new name for the newly created EP or MEP is determined, according to a name string taking in a preferred embodiment of the present invention the form "New XX" where XX corresponds to a counter value ensuring the name uniqueness with respect to all the names previously defined and recorded in the "Name" fields 702, 712, 722, 2212 and 2222 found in the respective records 701, 711, 721, 2211 and 2221 of the respective tables EFT 700, EPT 710, STT 720, RET 2210 and RSST 2220. Any other similar conventional means could be used instead without departing from the spirit of the invention, as long as the uniqueness of the newly created name is ensured.

Then the new name is recorded in the local variable EPE_name.

Then memory space is allocated within the main memory 102 to later record the illustrative range of cells for the EP or MEP. This allocated memory is part of the memory space corresponding to the currently opened electronic spreadsheet file. Then a new record 711 is created in the EPT table 710, and this new record 711 is initialized as follows:
the "Name" field 712 is set to the value of the local variable EPE_name;
the "Last Change Date" field 713 is set to the system time reference, as known by the central processor 101;
the "Description Ptr" field 714 is set to the memory location which has just been allocated;
the "Row #" field 715 is set to the value 1 (as in the preferred embodiment of the present invention the ST's are managed in a 2D environment; this field would carry the number of defined rows for the created EP or MEP in a 3D environment);
the "Column #" field 716 is set to the value of the local variable EPE_size; and
the "Type" field 717 is set as follows: the attribute "META" 718 is set equal to the value of the local variable EPE_meta, and the attribute "REFERENCED" 719 is initialized as follows:
The "OWN REFERENCE" (OR) subfield 719*a* is initialized with a prime number not yet assigned to any other OR subfield 709*a*, or 719*a*, or 729*a*, or 780*a*, or 2219*a*, or 2229*a*, or 2240*a*. Various conventional techniques can be used for identifying a prime number, and are not further detained here.
The "FILIATION REFERENCE" (FR) subfield 719*b* is initialized with the value 1 (one).
The "INSTANCE REFERENCE" (IR) subfield 719*c* is initialized with the value 1 (one).

The "REFERENCED OBJECT" (RO) subfield 719d is initialized with the following formula, where the P set corresponds to the set of ST's:

RO="YES" if LCM($\{FR_i\}$)$_{i \in P}$ Mod OR=0;

RO="NO" otherwise.

The "SELECTED CHILDREN" (SC) subfield 719e is initialized with the following formula, where the S set corresponds to the set of selected objects (having the "SELECTED" attribute 2242 equal to the value "YES" in the RSTMT table 2230):

SC="YES" if LCM($\{FR_i\}$)$_{i \in S}$ Mod OR=0 #OR# EPE_name$\in S$;

SC="NO" otherwise.

Then control is given to step 1010.

At step 1010, a test is performed to determine the value taken by the local variable EPE_range. If found equal to "YES", then control is given to step 1011; otherwise control is given to step 1012.

At step 1011, the currently selected range of cells is copied onto the clipboard and the local variable EPE_size is set equal to the number of columns of the selected range.

At step 1012, the "Editor Space" sheet 315 is made the current sheet and the content of the clipboard is pasted on this blank sheet at a fixed cell address 314 (address B2 in a preferred embodiment of the present invention, as shown on FIG. 3), so that the user can visualize on the display device 106 an illustration of the EP or MEP.

At step 1013, the EP Editor Dialog Box 401 is displayed on the display device 106.

The label box 404 is initialized with the value of the local variable EPE_name. The top (respectively bottom) option button 410 is filled with a black point if the local variable EPE_meta is found equal to "NO" (respectively "YES").

The text box 406 is filled with the value of the local variable EPE_size.

The push-buttons "Save" 412 and "Save & Refresh" 408 are enabled if the local variable EPE_size is found equal to the "Column #" field 716 of the current record 711, or if the attribute "REFERENCED" 719 within the "Type" field 717 of this same record 711 is found with the subfield "REFERENCED OBJECT" 719d (RO) equal to "NO", so that any future click with the pointing device 105 on one of these two push-buttons "Save" 412 and "Save & Refresh" 408 will be recognized as a valid event.

The push-buttons "Save" 412 and "Save & Refresh" 408 are disabled otherwise (local variable EPE_size is not found equal to the "Column #" field 716 of the current record 711, and the attribute "REFERENCED" 719 within the "Type" field 717 of this same record 711 is found with the subfield "REFERENCED OBJECT" 719d (RO) equal to "YES"), so that any future click with the pointing device 105 on one of these two push-buttons "Save" 412 and "Save & Refresh" 408 will not be recognized as an event.

At step 1014, the method is waiting for any user action on the EP Editor Dialog Box 401. Such user action is typically resulting from a click with the pointing device 105, but take other similar forms such as, but not limited to a specific combination of key on the keyboard 104, or any other similar means not further specified here.

At step 1015, a user action on the EP Editor Dialog Box 401 is detected.

If the user action is a click on the push-button "Save & Refresh" 408, then control is given to step 1016;

if the user action is a click on the push-button "Save" 412, then control is given to step 1017;

if the user action is a click on the push-button "Save As" 411, then control is given to step 1018;

if the user action is a click on the push-button "Clear" 409, then control is given to step 1019;

if the user action is a click on the spin button 407, then control is given to step 1020;

if the user action is a click on one of the two option buttons 410, then control is given to step 1021;

if the user action is a click on the push-button "Done" 403, or on the closing-window push-button 402, then control is given to step 1025.

At step 1016, the EPT table 710 is updated and saved as part of the electronic spreadsheet file by refreshing the record 711 whose "Name" field 712 is equal to the local variable EPE_name. For this purpose, the "Last Change Date" field 713 is set to the system time reference, as known by the central processor 101;

the "Column #" field 716 is set to the value of the local variable EPE_size; and the "Type" field 717 is set as follows: the attribute "META" 718 is set equal to the value of the local variable EPE_meta.

In addition the range of cells 414 illustrating on the "Editor Space" sheet 415 the current definition of the EP or MEP is copied onto the memory location pointed by the "Description Ptr" field 714. Then control is given to step 1022.

At step 1017, the EPT table 710 is updated and saved as part of the electronic spreadsheet file by refreshing the record 711 whose "Name" field 712 is equal to the local variable EPE_name. For this purpose, the "Last Change Date" field 713 is set to the system time reference, as known by the central processor 101;

the "Column #" field 716 is set to the value of the local variable EPE_size; and the "Type" field 717 is set as follows: the attribute "META" 718 is set equal to the value of the local variable EPE_meta.

In addition the range of cells 414 illustrating on the "Editor Space" sheet 415 the current definition of the EP or MEP is copied onto the memory location pointed by the "Description Ptr" field 714.

Then the local variable EPE_desc is updated with the current EP or MEP description, as recorded in the memory location pointed by the "Description Ptr" field 714, and control is given to step 1013.

At step 1018, a test is performed on the value found in the text box 405 to determine if this value corresponds to a valid new name. The corresponding criteria are implementation dependent and may take different forms without departing from the spirit of the invention, as long as the new proposed name is a unique character string against all the already defined names recorded in the "Name" fields 702, 712, 722, 2212 and 2222. It validity and uniqueness are proven, then control is given to step 1023; otherwise control is given to step 1024.

At step 1019, the default attributes currently defined in the spreadsheet environment are applied to the "Editor Space" sheet 415, so that the displayed illustration of the EP or MEP receives these same default attributes. Then control is given to the step 1013.

At step 1020, the local variable EPE_size is either incremented or decremented by 1 (one) according to the direction (up or down) specified by the pointing device 105 on the spin button 407, and as long as it value remains positive and less than or equal to an upper limit set equal to 254 in a preferred embodiment of the present invention. Then control is given to step 1013.

At step 1021, the local variable EPE_meta is updated, so that its value becomes "YES" (respectively "NO") if the bottom (respectively top) option button 410 has been clicked on. Then control is given to step 1013.

At step 1022, the ST Refresh Manager command is issued with the following parameters: EPE_name, "PROFILE", and EPE_desc. Then the local variable EPE_desc is updated with the current EP or MEP description, as recorded in the memory location pointed by the "Description Ptr" field 714 and then control is given to step 1013.

At step 1023, memory space is allocated within the main memory 102 to later record the illustrative range of cells for the EP or MEP. This allocated memory is part of the memory space corresponding to the currently opened electronic spreadsheet file. Then a new record 711 is created in the EPT table 710 which is saved as part of the electronic spreadsheet file, and this new record 711 is initialized as follows:

- the "Name" field 712 is set to the value found in the text box 405 and validated at step 1018; this field 712 becoming then the new value of the EPE_name local variable;
- the "Last Change Date" field 713 is set to the system time reference, as known by the central processor 101;
- the "Description Ptr" field 714 is set to the memory location which has just been allocated;
- the "Row #" field 715 is set to the value 1 (as in the preferred embodiment of the present invention the ST's are managed in a 2D environment; this field would carry the number of defined rows for the created EP or MEP in a 3D environment);
- the "Column #" field 716 is set to the value of the local variable EPE_size;
- the "Type" field 717 is set as follows: the attribute "META" 718 is set equal to the value of the local variable EPE_meta, and the attribute "REFERENCED" 719 is initialized as follows:
  - The "OWN REFERENCE" (OR) subfield 719a is initialized with a prime number not yet assigned to any other OR subfield 709a, or 719a, or 729a, or 780a, or 2219a, or 2229a, or 2240a. Various conventional techniques can be used for identifying a prime number, and are not further detailed here.
  - The "FILIATION REFERENCE" (FR) subfield 719b is initialized with the value 1 (one).
  - The "INSTANCE REFERENCE" (IR) subfield 719c is initialized with the value 1 (one).
  - The "REFERENCED OBJECT" (RO) subfield 719d is initialized with the following formula, where the P set corresponds to the set of ST's:

$RO=\text{"YES"}$ if $LCM(\{FR_i\})_{i \in P}$ Mod $OR=0$;

$RO=\text{"NO"}$ otherwise.

- The "SELECTED CHILDREN" (SC) subfield 719e is initialized with the following formula, where the S set corresponds to the set of selected objects (having the "SELECTED" attribute 2242 equal to the value "YES" in the RSTMT table 2230):

$SC=\text{"YES"}$ if $LCM(\{FR_i\})_{i \in S}$ Mod $OR=0$ #OR# EPE_name$\in S$;

$SC=\text{"NO"}$ otherwise.

Then control is given to step 1013.

At step 1024, a warning message notification is issued for informing the user that a valid and unique name must be specified in the text box 405 prior to clicking on the "Save As" push-button 411. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1013.

At step 1025, the EP Editor Dialog Box 401 is closed so that it disappears from the display device 106, then the "Editor Space" sheet 415 is removed from the display window so that it is replaced by the original sheet present at EP Editor invocation time. Finally control is given back to the initial step 1001 for processing any future EP Editor command.

E4. ST Editor Method

Figure 11:
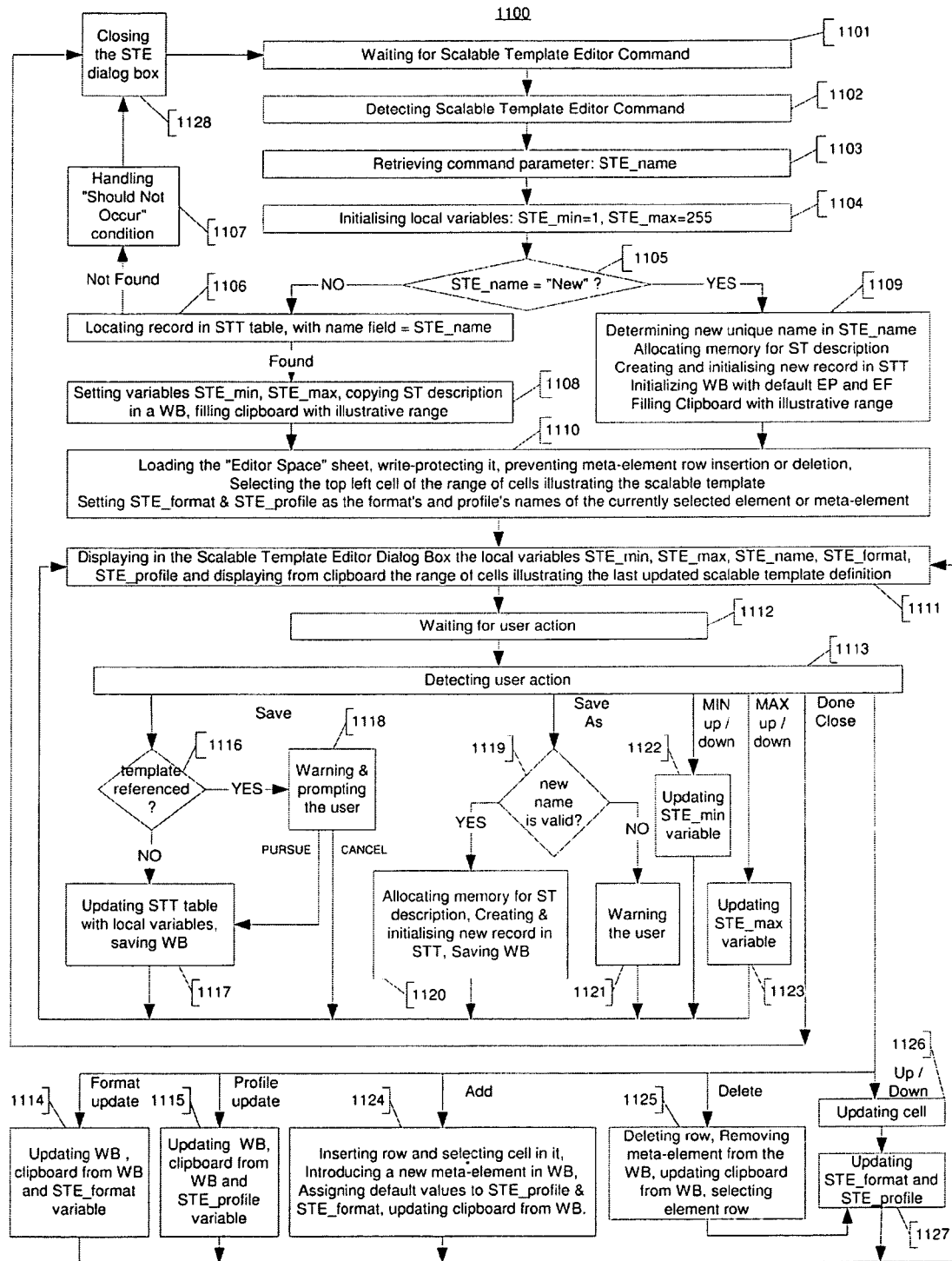
FIG. 11 is a flow chart illustrating a preferred method for editing a ST according to a preferred embodiment of the present invention.

The method for creating or updating ST's used in the preferred embodiment of the present invention is summarized in flowchart 1100 of FIG. 11. This method can be seen as the processing of the ST Editor command.

At step 1101, the method is in its default state, waiting for an event to initiate the process.

At step 1102, the ST Editor command is detected, as a result of an user action. This action can be for instance: a specific combination of key on the keyboard 104, or the click of the pointing device 105 on a specific button, or
any other similar means not further specified here.

At step 1103, the parameter of the command is retrieved. It corresponds to a mandatory parameter STE_name which can either take a reserved value "NEW" or another value corresponding to a character string name, as found in the "Name" field 2232 of a record 2231 within the RSTMT table 2230. This parameter is recorded as a local variable.

At step 1104, some local variables are initialized: the local variable STE_min is set to the default value 1 (one), the local variable STE_max is set to the default value 255.

At step 1105, a test is performed to determine the value taken by the local variable STE_name. If found equal to "NEW", then control is given to step 1109; otherwise control is given to step 1106.

At step 1106, the STT table 720 is looked up to locate a record 721 whose "Name" field 722 is found equal to the value taken by the local variable STE_name. If such a record is found, then control is given to step 1108; otherwise control is given to step 1107.

At step 1107, an exception handler is invoked to treat this "should not occur" condition. Such operation is implementation dependent and can take different forms such as the display on the display device 106 of an error message pop-up window. Then control is given to step 1128.

At step 1108,
- the local variable STE_min is set to the value found in the "Min Element #" field 725 of the record 721 found at step 1106,
- the local variable STE_max is set to the value found in the "Max Element #" field 726 of the record 721 found at step 1106.
- Then the memory location pointed by the "Description Ptr" field 724 of the record 721 found at step 1106 (where is recorded the description of the ST according to the STDT table 760 illustrated in FIG. 7D) is copied in a working buffer which in turns follows the same STDT table 760. This structure is then used to build on the clipboard within the main memory 102 a spreadsheet range of cells illustrating the ST definition copied in the working buffer. This construction is achieved by loading in the clipboard within the main memory 102 an ordered sequence of ranges of cells, each of them successively abiding by the EF (column 765) and the EP (column 764) definition corresponding to each pair of EF and EP names, starting with the first pair 761 up to the last one 763. Then control is given to step 1110.

At step 1109, a new name for the newly created ST is determined, according to a name string taking in a preferred embodiment of the present invention the form "New XX" where XX corresponds to a counter value ensuring the name uniqueness with respect to all the names previously defined and recorded in the "Name" fields 702, 712, 722, 2212 and 2222 found in the respective records 701, 711, 721, 2211 and 2221 of the respective tables EFT 700, EPT 710, STT 720, RET 2210 and RSST 2220. Any other similar conventional means could be used instead without departing from the spirit of the invention, as long as the uniqueness of the newly created name is ensured. Then the new name is recorded in the local variable STE_name. Then memory space is allocated within the main memory 102 to later record the illustrative range of cells for the new ST. This allocated memory is part of the memory space corresponding to the currently opened electronic spreadsheet file and follows the STDT table 760 illustrated in FIG. 7D. Then a new record 721 is created in the STT table 720, and this new record 721 is initialized as follows:
- the "Name" field 722 is set to the value of the local variable STE_name;
- the "Last Change Date" field 723 is set to the system time reference, as known by the central processor 101;
- the "Description Ptr" field 724 is set to the memory location which has just been allocated;
- the "Min Element #" field 725 is set to the value of the local variable STE_min;
- the "Max Element #" field 726 is set to the value of the local variable STE_max; and
- the "Type" field 727 is set as follows: the attribute "META" 728 is set equal to "NO", and the attribute "REFERENCED" 729 is initialized as follows:
  - The "OWN REFERENCE" (OR) subfield 729a is initialized with a prime number not yet assigned to any other OR subfield 709a, or 719a, or 729a, or 780a, or 2219a, or 2229a, or 2240a. Various conventional techniques can be used for identifying a prime number, and are not further detained here.
  - The "FILIATION REFERENCE" (FR) subfield 729b is initialized according to the following formula, where the F set corresponds to the set of EF's, MEF's, EP's and MEP's constituting the new ST, according to the structure recorded in the "Description Ptr" field 724:

$FR = \Pi_{i \in F} OR_i \times LCM(\{FR_i\})_{i \in F}$

- The "INSTANCE REFERENCE" (IR) subfield 729c is initialized with the value 1 (one).
  - The "REFERENCED OBJECT" (RO) subfield 729d is initialized with the following formula, where the P set corresponds to the set of RE's and RME's:

$RO = \text{"YES"}$ if $LCM(\{FR_i\})_{i \in P}$ Mod OR=0;

RO="NO" otherwise.

- The "SELECTED CHILDREN" (SC) subfield 729e is initialized with the following formula, where the S set corresponds to the set of selected objects (having the "SELECTED" attribute 2242 equal to the value "YES" in the RSTMT table 2230):

$SC = \text{"YES"}$ if $LCM(\{FR_i\})_{i \in S}$ Mod OR=0 #OR# STE_name $\in S$, SC="NO" otherwise.

Then a working buffer is allocated in main memory 102 and initialized with a default ST description which corresponds to a single pair 762 of default EF and default EP. This default ST description is then used to build on the clipboard within the main memory 102 a spreadsheet range of cells illustrating the new ST. This construction is achieved as explained at the end of the step 1108. Then control is given to step 1110.

At step 1110, the "Editor Space" sheet 515 is made the current sheet and this sheet is turned to write-protect mode while regular row insertion and deletion are disabled. Then the top left cell of the range of cells 514 is selected. Then the local variable STE_format is filled with the name of the EF or of the MEF corresponding to the row where is located the currently selected cell within the range of cells 514. Finally the local variable STE_profile is filled with the name of the EP or of the MEP corresponding to the row where is located the currently selected cell within the range of cells 514.

At step 1111, the ST Editor Dialog Box 501 is displayed on the display device 106.
- The label box 504 is initialized with the value of the local variable STE_name.
- The text box 506 is filled with the value of the local variable STE_min.
- The text box 509 is filled with the value of the local variable STE_max.
- The combo box 511 is filled with the value of the local variable STE_format.
- The combo box 510 is filled with the value of the local variable STE_profile.
- Then the range of cells 514 is updated according to the description recorded in the memory clipboard: the content of the clipboard is pasted on this blank sheet at a fixed cell address 514 (address B2 in a preferred embodiment of the present invention, as shown on FIG. 5), so that the user can visualize on the display device 106, within the window 500 an illustration of the ST. Then a test is performed to check if all the EF's, EP's, MEF's and MEP's contributing to the ST definition illustrated by the range of cells 514, have the same number of fields. If it is the case, then the two push-buttons "Save" 513 and "Save As" 512 are enabled, so that the click with the pointing device 105 on one of these two push-buttons is recognized as a valid event. Otherwise the two push-buttons "Save" 513 and "Save As" 512 are disabled, so that the click with the pointing device 105 on one of these two push-buttons is not recognized as a valid event.

At step 1112, the method is waiting for any user action on the ST Editor Dialog Box 501. Such user action is typically resulting from a click with the pointing device 105, but take other similar forms such as, but not limited to a specific combination of key on the keyboard 104, or any other similar means not further specified here.

At step 1113, a user action on the ST Editor Dialog Box 501 is detected.

If the user action is a click on the push-button "Save" 513, then control is given to step 1116;

if the user action is a click on the push-button "Save As" 512, then control is given to step 1119;

if the user action is a click on the push-button "Add" 517, then control is given to step 1124;

if the user action is a click on the push-button "Delete" 518, then control is given to step 1125;

if the user action is a click on the push-button "Up" 519 or on the push-button "Down" 520, then control is given to step 1126;

if the user action is an update of the combo box 511, then control is given to step 1114;

if the user action is an update of the combo box 510, then control is given to step 1115;

if the user action is a click on the spin button 507, then control is given to step 1122;

if the user action is a click on the spin button 508, then control is given to step 1123;

if the user action is a click on the push-button "Done" 503, or on the closing-window push-button 502, then control is given to step 1128.

At step 1114, the ST description is updated in the working buffer by replacing by the EF or MEF name found in the text box 511 the previous EF or MEF specification corresponding to the element or meta-element illustrated by the currently selected cell within the range of cells 514. Then the local variable STE_format is also set equal to the name found in the text box 511. Then control is given to step 1111.

At step 1115, the ST description is updated in the working buffer by replacing by the EP or MEP name found in the text box 510 the previous EP or MEP specification corresponding to the element or meta-element illustrated by the currently selected cell within the range of cells 514. Then the local variable STE_profile is also set equal to the name found in the text box 510. Then control is given to step 1111.

At step 1116, a test is performed to check if the currently edited ST is already referenced by an existing RE or RME or is already instanciated as a STI. For this purpose is considered the "REFERENCED" attribute 729 within the "Type" field 727 of the record 721 within the STT table 720 whose "Name" field 722 is equal to the local variable STE_name. If the value of the "REFERENCED OBJECT" (RO) subfield 729d is equal to "NO" and if the value of the "INSTANCE REFERENCE" (IR) subfield 729c is equal to 1 (one), then control is given to step 1117; otherwise control is given to step 1118.

At step 1117, the STT table 720 is updated by refreshing the record 721 whose "Name" field 722 is equal to the local variable STE_name. For this purpose, the "Last Change Date" field 723 is set to the system time reference, as known by the central processor 101;

the "Min Element #" field 725 is set to the value of the local variable STE_min;

the "Max Element #" field 726 is set to the value of the local variable STE_max.

The current description of the ST, as illustrated by the range of cells 514, as recorded in the working buffer, and following the STDT table 760 is copied onto the memory location pointed by the "Description Ptr" field 724.

The "Type" field 727 is updated as the "FILIATION REFERENCE" (FR) subfield 729b of the "REFERENCED" attribute 729 is automatically updated thanks to its definition formula depending on the set of EF's, MEF's, EP's and MEP's belonging to the STDT table 760 pointed by the "Description Ptr" field 724.

For each EF name or MEF name found in the column 765 of this STDT table 760, the EFT table 700 is automatically updated within the corresponding records 701 whose "Name" field 702 matches this element or MEF name, as the subfield "REFERENCED OBJECT" (RO) 709d (within the "REFERENCED" attribute 709) is recalculated according to its definition formula.

For each EP name or MEP name found in the column 764 of this STDT table 760, the EPT table 710 is automatically updated within the corresponding records 711 whose "Name" field 712 matches this element or MEP name, as the subfield "REFERENCED OBJECT" (RO) 719d (within the "REFERENCED" attribute 719) is recalculated according to its definition formula.

Then control is given to step 1111.

At step 1118, a warning message notification is issued for informing the user that the edited ST is already referenced by a RE or RME or is already instanciated as an existing STI. This can typically be done by displaying on the display device 106 a warning message in a pop-up window, or in a status bar area, but any other similar means could be used instead, without departing from the spirit of the invention. Then the user is prompted to either cancel the current "Save" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an "Cancel" or "Continue" push-button present within a prompting message pop-up window, or any other similar means without departing from the spirit of the invention, control is given to step 1111 if the spreadsheet user decision is to cancel the operation, or to step 1117 if the spreadsheet user decision is to continue the operation.

At step 1119, a test is performed on the value found in the text box 505 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, 722, 2212 and 2222. If validity and uniqueness are proven, then control is given to step 1120; otherwise control is given to step 1121.

At step 1120, memory space is allocated within the main memory 102 to later record the descriptor of the ST. This allocated memory is part of the memory space corresponding to the currently opened electronic spreadsheet file. Then a new record 721 is created in the STT table 720, and this new record 721 is initialized as follows:

the "Name" field 722 is set to the value found in the text box 505 and validated at step 1119; this field 722 becoming then the new value of the STE_name local variable;

the "Last Change Date" field 723 is set to the system time reference, as known by the central processor 101;

the "Description Ptr" field 724 is set to the memory location which has just been allocated;

the "Min Element #" field 725 is set to the value of the local variable STE_min;

the "Max Element #" field 726 is set to the value of the local variable STE_max;

the current description of the ST, as illustrated by the range of cells 514, as recorded in the working buffer, and following the STDT table 760 is copied onto the memory location pointed by the "Description Ptr" field 724.

the "Type" field 727 is set as follows: the attribute "META" 728 is set equal to "NO", and the attribute "REFERENCED" 729 is initialized as follows:

The "OWN REFERENCE" (OR) subfield 729a is initialized with a prime number not yet assigned to any other OR subfield 709a, or 719a, or 729a, or 780a, or 2219a, or 2229a, or 2240a. Various conventional techniques can be used for identifying a prime number, and are not further detailed here.

The "FILIATION REFERENCE" (FR) subfield 729b is initialized according to the following formula, where the F set corresponds to the set of EF's, MEF's, EP's and MEP's constituting the new ST, according to the structure recorded in the "Description Ptr" field 724:

$$FR = \Pi_{i \in F} OR_i \times LCM(\{FR_i\})_{i \in F}$$

The "INSTANCE REFERENCE" (IR) subfield 729c is initialized with the value 1 (one).

The "REFERENCED OBJECT" (RO) subfield 729d is initialized with the following formula, where the P set corresponds to the set of RE's and RME's:

$$RO = \text{"YES"} \text{ if } LCM(\{FR_i\})_{i \in P} \text{ Mod } OR = 0;$$

$$RO = \text{"NO"} \text{ otherwise.}$$

The "SELECTED CHILDREN" (SC) subfield 729e is initialized with the following formula, where the S set corresponds to the set of selected objects (having the "SELECTED" attribute 2242 equal to the value "YES" in the RSTMT table 2230):

$$SC = \text{"YES"} \text{ if } LCM(\{FR_i\})_{i \in S} \text{ Mod } OR = 0 \, \#_{OR}\# \, STE\_name \in S;$$

$$SC = \text{"NO"} \text{ otherwise.}$$

For each EF name or MEF name found in the column 765 of this STDT table 760, the EFT table 700 is automatically updated within the corresponding records 701 whose "Name" field 702 matches this element or MEF name, as the subfield "REFERENCED OBJECT" (RO) 709d (within the "REFERENCED" attribute 709) is recalculated according to its definition formula.

For each EP name or MEP name found in the column 764 of this STDT table 760, the EPT table 710 is automatically updated within the corresponding records 711 whose "Name" field 712 matches this element or MEP name, as the subfield "REFERENCED OBJECT" (RO) 719d (within the "REFERENCED" attribute 719) is recalculated according to its definition formula.

Then control is given to step 1111.

At step 1121, a warning message notification is issued for informing the user that a valid and unique name must be specified in the text box 505 prior to clicking on the "Save As" push-button 512. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1111.

At step 1122, the local variable STE_min is either incremented or decremented by 1 (one) according to the direction (up or down) specified by the pointing device 105 on the spin button 507, and as long as its value remains positive and less than or equal to both an upper limit set equal to 254 in a preferred embodiment of the present invention and to the value shown in the text box 509. Then control is given to step 1111.

At step 1123, the local variable STE_max is either incremented or decremented by 1 (one) according to the direction (up or down) specified by the pointing device 105 on the spin button 508, and as long as its value remains positive, greater than the value shown in the text box 506 and less than or equal to an upper limit set equal to 254 in a preferred embodiment of the present invention. Then control is given to step 1111.

At step 1124, a new row is inserted in the range of cells 514 illustrating the edited ST, above the row where the last selected cell was previously located.

Then the left most cell located on the new row within the range of cells 514 is selected. Then the ST definition is updated in the working buffer by introducing a new meta-element which is described, like the other ones, by a couple (MEF 765, MEP 764) which defaults to a couple of default MEF and default MEP, which are also respectively assigned to the local variable STE_format and STE_profile. In addition the current description of the ST, as illustrated by the range of cells 514, as recorded in the working buffer, and following the STDT table 760 is copied onto the memory location pointed by the "Description Ptr" field 724. Then control is given to step 1111.

At step 1125, the row containing the selected cell is removed from the range of cells 514. Then the left most cell located within the range of cells 514 on the row representing the element defined within the edited ST is selected. Then the ST definition is updated by removing the deleted meta-element which was described by a couple (MEF, MEP). In addition the current description of the ST, as illustrated by the range of cells 514, as recorded in the working buffer, and following the STDT table 760 is copied onto the memory location pointed by the "Description Ptr" field 724. Then control is given to step 1127.

At step 1126, the current cell within the "Editor Space" sheet 515 is respectively moved up or down if the spreadsheet user has clicked with the pointing device 105 on the "Up" push-button 519, or on the "Down" push-button 520, and also if this movement does not move the current cell away from the range of cells 514 illustrating the ST.

At step 1127, the local variables STE_format and STE_profile are respectively set equal to the name of the EF or MEF and to the name of the EP or MEP corresponding to the element or the meta-element illustrated by the currently selected cell within the range of cells 514. Then control is given to step 1111.

At step 1128, the ST Editor Dialog Box 501 is closed so that it disappears from the display device 106, then the "Editor Space" sheet 515 is removed from the display window so that it is replaced by the original sheet present at EP Editor invocation time. All the means which were temporarily disabled while the "Editor Space" sheet 515 was displayed are now enabled again. Finally control is given back to the initial step 1101 for processing any future ST Editor command.

E5. RST Editor Method

Figure 12:
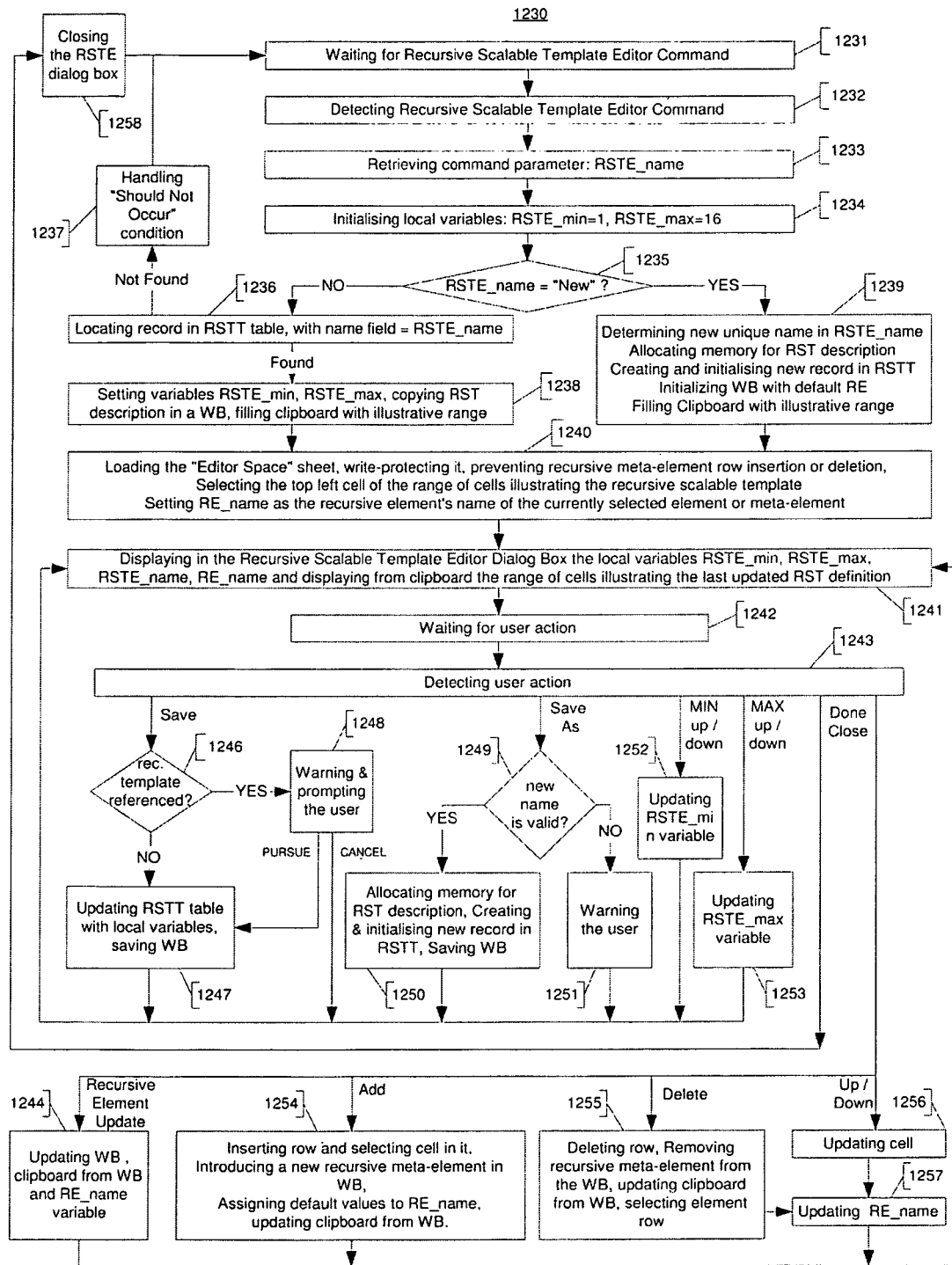
FIG. 12 is a flow chart illustrating a preferred method for editing a RST according to a preferred embodiment of the present invention.

The method for creating or updating RST's used in the preferred embodiment of the present invention is summarized in flowchart 1230 of FIG. 12. This method can be seen as the processing of the RST Editor command.

At step 1231, the method is in its default state, waiting for an event to initiate the process.

At step 1232, the RST Editor command is detected, as a result of an user action. This action can be for instance:
a specific combination of key on the keyboard 104, or
the click of the pointing device 105 on a specific button, or
any other similar means not further specified here.

At step 1233, the parameter of the command is retrieved. It corresponds to a mandatory parameter RSTE_name which can either take a reserved value "NEW" or another value corresponding to a character string name, as found in the "Name" field 2232 of a record 2231 within the RSTMT table 2230. This parameter is recorded as a local variable.

At step 1234, some local variables are initialized: the local variable RSTE_min is set to the default value 1 (one), the local variable RSTE_max is set to the default value 16.

At step 1235, a test is performed to determine the value taken by the local variable RSTE_name. If found equal to "NEW", then control is given to step 1239; otherwise control is given to step 1236.

At step 1236, the RSTT table 2220 is looked up to locate a record 2221 whose "Name" field 2222 is found equal to the value taken by the local variable RSTE_name. If such a record is found, then control is given to step 1238; otherwise control is given to step 1237.

At step 1237, an exception handler is invoked to treat this "should not occur" condition. Such operation is implementation dependent and can take different forms such as the display on the display device 106 of an error message pop-up window. Then control is given to the initial step 1231 for processing any future RST Editor command.

At step 1238,
the local variable RSTE_min is set to the value found in the "Min Element #" field 2225 of the record 2221 found at step 1236, the local variable RSTE_max is set to the value found in the "Max Element #" field 2226 of the record 2221 found at step 1236.

Then the memory location pointed by the "Description Ptr" field 2224 of the record 2221 found at step 1236 (where is recorded the description of the RST according to the RSTDT table 2250 illustrated in FIG. 19D) is copied in a working buffer which in turns follows the same RSTDT table 2250.

This structure is then used to build on the clipboard within the main memory 102 a spreadsheet range of cells illustrating the RST definition copied in the working buffer, each cell successively corresponding to RE or RME names, starting with the first name 2251 up to the last one 2253. Then control is given to step 1240.

At step 1239, a new name for the newly created RST is determined, according to a name string taking in a preferred embodiment of the present invention the form "New XX" where XX corresponds to a counter value ensuring the name uniqueness with respect to all the names previously defined and recorded in the "Name" fields 702, 712, 722, 2212 and 2222 found in the respective records 701, 711, 721, 2211 and 2221 of the respective tables EFT 700, EPT 710, STT 720, RET 2210 and RSST 2220. Any other similar conventional means could be used instead without departing from the spirit of the invention, as long as the uniqueness of the newly created name is ensured. Then the new name is recorded in the local variable RSTE_name. Then memory space is allocated within the main memory 102 to later record the illustrative range of cells for the new RST. This allocated memory is part of the memory space corresponding to the currently opened electronic spreadsheet file and follows the RSTDT table 2250 illustrated in FIG. 19D. Then a new record 2221 is created in the RSTT table 2220, and this new record 2221 is initialized as follows:

the "Name" field 2222 is set to the value of the local variable RSTE_name;

the "Last Change Date" field 2223 is set to the system time reference, as known by the central processor 101;

the "Description Ptr" field 2224 is set to the memory location which has just been allocated;

the "Min Element #" field 2225 is set to the value of the local variable RSTE_min;

the "Max Element #" field 2226 is set to the value of the local variable RSTE_max;

the "Type" field 2227 is set as follows: the attribute "META" 2228 is set equal to "NO", and the attribute "REFERENCED" 2229 is initialized as follows:

The "OWN REFERENCE" (OR) subfield 2229a is initialized with a prime number not yet assigned to any other OR subfield 709a, or 719a, or 729a, or 780a, or 2219a, or 2229a, or 2240a. Various conventional techniques can be used for identifying a prime number, and are not further detailed here.

The "FILIATION REFERENCE" (FR) subfield 2229b is initialized according to the following formula, where the F set corresponds to the set of RE's and RME constituting the new RST, according to the structure recorded in the "Description Ptr" field 2224:

$$FR = \Pi_{i \in F} OR_i \times LCM(\{FR_i\})_{i \in F}$$

The "INSTANCE REFERENCE" (IR) subfield 2229c is initialized with the value 1 (one).

The "REFERENCED OBJECT" (RO) subfield 2229*d* is initialized with the value "NO".

The "SELECTED CHILDREN" (SC) subfield 2229*e* is initialized with the following formula, where the S set corresponds to the set of selected objects (having the "SELECTED" attribute 2242 equal to the value "YES" in the RSTMT table 2230):

SC="YES" if LCM($\{FR_i\}$)$_{i \in S}$ Mod OR=0 #$_{OR}$# RSTE_name$\in$S;

SC="NO" otherwise.

Then a working buffer is allocated in main memory 102 and initialized with a default RST description which corresponds to a RE 2252. This default RST description is then used to build on the clipboard within the main memory 102 a spreadsheet range of cells illustrating the new RST. This construction is achieved as explained at the end of the step 1238. Then control is given to step 1240.

At step 1240, the "Editor Space" sheet 615 is made the current sheet and this sheet is turned to write-protect mode while regular row insertion and deletion are disabled.

Then the top left cell of the range of cells 614 is selected.

Then the local variable RE_name is filled with the name of the RE corresponding to the row where is located the currently selected cell within the range of cells 614.

At step 1241, the RST Editor Dialog Box 601 is displayed on the display device 106. The label box 604 is initialized with the value of the local variable RSTE_name. The text box 606 is filled with the value of the local variable RSTE_min. The text box 609 is filled with the value of the local variable RSTE_max. The combo box 610 is filled with the value of the local variable RE_name.

Then the range of cells 614 is updated according to the description recorded in the memory clipboard: the content of the clipboard is pasted on this blank sheet at a fixed cell address 614 (address B2 in a preferred embodiment of the present invention, as shown on FIG. 6), so that the user can visualize on the display device 106, within the window 611 an illustration of the ST.

Then a test is performed to check if all the RE's and RME's contributing to the RST definition illustrated by the range of cells 614, have the same number of fields. If it is the case, then the two push-buttons "Save" 613 and "Save As" 612 are enabled, so that the click with the pointing device 105 on one of these two push-buttons is recognized as a valid event. Otherwise the two push-buttons "Save" 613 and "Save As" 612 are disabled, so that the click with the pointing device 105 on one of these two push-buttons is not recognized as a valid event.

At step 1242, the method is waiting for any user action on the RST Editor Dialog Box 601. Such user action is typically resulting from a click with the pointing device 105, but take other similar forms such as, but not limited to a specific combination of key on the keyboard 104, or any other similar means not further specified here.

At step 1243, a user action on the RST Editor Dialog Box 601 is detected.

If the user action is a click on the push-button "Save" 613, then control is given to step 1246;

if the user action is a click on the push-button "Save As" 612, then control is given to step 1249;

if the user action is a click on the push-button "Add" 617, then control is given to step 1254;

if the user action is a click on the push-button "Delete" 618, then control is given to step 1255;

if the user action is a click on the push-button "Up" 619 or on the push-button "Down" 616, then control is given to step 1256;

if the user action is an update of the combo box 610, then control is given to step 1244;

if the user action is a click on the spin button 607, then control is given to step 1252;

if the user action is a click on the spin button 608, then control is given to step 1253;

if the user action is a click on the push-button "Done" 603, or on the closing-window push-button 602, then control is given to step 1258.

At step 1244, the ST description is updated in the working buffer by replacing by the RE or RME name found in the combo box 610 the previous RE or RME name corresponding to the RE or RME illustrated by the currently selected cell within the range of cells 614. Then the local variable RE_name is also set equal to the name found in the combo box 610. Then control is given to step 1241.

At step 1246, a test is performed to check if the currently edited RST is already referenced by an existing RSTI. For this purpose is considered the value of the "REFERENCED" attribute 2229 within the "Type" field 2227 of the record 2221 within the RSTT table 2220 whose "Name" field 2222 is equal to the local variable RSTE_name. If the value of the "INSTANCE REFERENCE" (IR) subfield 2229*c* is equal to 1 (one), then control is given to step 1247; otherwise control is given to step 1248.

At step 1247, the RSTT table 2220 is updated by refreshing the record 2221 whose "Name" field 2222 is equal to the local variable RSTE_name. For this purpose, the "Last Change Date" field 2223 is set to the system time reference, as known by the central processor 101;

the "Min Element #" field 2225 is set to the value of the local variable RSTE_min;

the "Max Element #" field 2226 is set to the value of the local variable RSTE_max.

The current description of the RST, as illustrated by the range of cells 614, as recorded in the working buffer, and following the RSTDT table 2250 is copied onto the memory location pointed by the "Description Ptr" field 2224.

The "Type" field 2227 is updated as the "FILIATION REFERENCE" (FR) subfield 2229*b* of the "REFERENCED" attribute 2229 is automatically updated thanks to its definition formula depending on the set of RE's, and RME's belonging to the RSTDT table 2250 pointed by the "Description Ptr" field 2224.

For each RE name or RME name found in the column 2254 of this RSTDT table 2250, the RET table 2210 is automatically updated within the corresponding record 2211 whose "Name" field 2212 matches this RE or RME name, as the subfield "REFERENCED OBJECT" (RO) 2219*d* (within the "REFERENCED" attribute 2219) is recalculated according to its definition formula.

At step 1248, a warning message notification is issued for informing the user that the edited RST is already instanciated as a RSTI. This can typically be done by displaying on the display device 106 a warning message in a pop-up window, or in a status bar area, but any other similar means could be used instead, without departing from the spirit of the invention. Then the user is prompted to either cancel the current "Save" operation, or to pursue it. This can typically be done by displaying on the display device 106 a prompting message in a pop-up window, but any other similar means could be used instead, without departing from the spirit of the invention. Once the user has made his choice through conventional means such as clicking with the pointing device 105 on an "Cancel" or "Continue" push-button present within a prompting message pop-up window, or any other similar means without departing from the spirit of the invention, control is given to step 1241 if the spreadsheet user decision is to cancel the operation, or to step 1247 if the spreadsheet user decision is to continue the operation.

At step 1249, a test is performed on the value found in the text box 605 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, 722, 2212 and 2222. If validity and uniqueness are proven, then control is given to step 1250; otherwise control is given to step 1251.

At step 1250, memory space is allocated within the main memory 102 to later record the descriptor of the RST. This allocated memory is part of the memory space corresponding to the currently opened electronic spreadsheet file. Then a new record 2221 is created in the RSTT table 2220, and this new record 2221 is initialized as follows:

the "Name" field 2222 is set to the value found in the text box 605 and validated at step 1249; this field 2222 becoming then the new value of the RSTE_name local variable;

the "Last Change Date" field 2223 is set to the system time reference, as known by the central processor 101;

the "Description Ptr" field 2224 is set to the memory location which has just been allocated;

the "Min Element #" field 2225 is set to the value of the local variable RSTE_min;

the "Max Element #" field 2226 is set to the value of the local variable RSTE_max; and the "Type" field 2227 is set as follows: the attribute "META" 2228 is set equal to "NO", and the attribute "REFERENCED" 2229 is initialized as follows:

The "OWN REFERENCE" (OR) subfield 2229a is initialized with a prime number not yet assigned to any other OR subfield 709a, or 719a, or 729a, or 780a, or 2219a, or 2229a, or 2240a. Various conventional techniques can be used for identifying a prime number, and are not further detailed here.

The "FILIATION REFERENCE" (FR) subfield 2229b is initialized according to the following formula, where the F set corresponds to the set of RE's and RME constituting the new RST, according to the structure recorded in the "Description Ptr" field 2224:

$FR = \Pi_{i \in F} OR_i \times LCM(\{FR_i\})_{i \in F}$

The "INSTANCE REFERENCE" (IR) subfield 2229c is initialized with the value 1 (one).

The "REFERENCED OBJECT" (RO) subfield 2229d is initialized with the value "NO".

The "SELECTED CHILDREN" (SC) subfield 2229e is initialized with the following formula, where the S set corresponds to the set of selected objects (having the "SELECTED" attribute 2242 equal to the value "YES" in the RSTMT table 2230):

$SC=$"YES" if $LCM(\{FR_i\})_{i \in S}$ Mod OR=0 #OR# RSTE_name$\in S$;

SC="NO" otherwise.

The current description of the RST, as illustrated by the range of cells 614, as recorded in the working buffer, and following the RSTDT table 2250 is copied onto the memory location pointed by the "Description Ptr" field 2224.

For each RE name or RME name found in the column 2254 of this RSTDT table 2250, the RET table 2210 is automatically updated within the corresponding record 2211 whose "Name" field 2212 matches this RE or RME name, as the subfield "REFERENCED OBJECT" (RO) 2229d (within the "REFERENCED" attribute 2219) is recalculated according to its definition formula.

At step 1251, a warning message notification is issued for informing the user that a valid and unique name must be specified in the text box 605 prior to clicking on the "Save As" push-button 612. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1241.

At step 1252, the local variable RSTE_min is either incremented or decremented by 1 (one) according to the direction (up or down) specified by the pointing device 105 on the spin button 607, and as long as its value remains positive and less than or equal to both an upper limit set equal to 254 in a preferred embodiment of the present invention and to the value shown in the text box 609. Then control is given to step 1241.

At step 1253, the local variable RSTE_max is either incremented or decremented by 1 (one) according to the direction (up or down) specified by the pointing device 105 on the spin button 608, and as long as its value remains positive, greater than the value shown in the text box 606 and less than or equal to an upper limit set equal to 254 in a preferred embodiment of the present invention. Then control is given to step 1241.

At step 1254, a new row is inserted in the range of cells 614 illustrating the edited RST, above the row where the last selected cell was previously located.

Then the left most cell located on the new row within the range of cells 614 is selected. Then the RST definition is updated in the working buffer by introducing a new RME which is identified, like the other ones, by a name, which is also assigned to the local variable RE_name. In addition the current description of the RST, as illustrated by the range of cells 614, as recorded in the working buffer, and following the RSTDT table 2250 is copied onto the memory location pointed by the "Description Ptr" field 2224.

Then control is given to step 1241.

At step 1255, the row containing the selected cell is removed from the range of cells 614, so that the next RE or meta-element gets selected. Then the RST definition is updated by removing the deleted RME which was identified by its name. In addition the current description of the RST, as illustrated by the range of cells 614, as recorded in the working buffer, and following the RSTDT table 2250 is copied onto the memory location pointed by the "Description Ptr" field 2224. Then control is given to step 1257.

At step 1256, the current cell within the "Editor Space" sheet 615 is respectively moved up or down if the spreadsheet user has clicked with the pointing device 105 on the "Up" push-button 619, or on the "Down" push-button 616, and also if this movement does not move the current cell away from the range of cells 614 illustrating the RST.

At step 1257, the local variable RE_name is set equal to the name of the RE or RME corresponding to either the RE or the RME identified by the currently selected cell within the range of cells 614. Then control is given to step 1241.

At step 1258, the RST Editor Dialog Box 601 is closed so that it disappears from the display device 106, then the "Editor Space" sheet 615 is removed from the display window so that it is replaced by the original sheet present at RST Editor invocation time. All the means which were temporarily disabled while the "Editor Space" sheet 615 was displayed are now enabled again. Finally control is given back to the initial step 1231 for processing any future RST Editor command.

E6. ST Instanciator Method

The method for creating a STI abiding by a defined ST used in the preferred embodiment of the present invention is summarized in flowchart 1400 of FIG. 14A and FIG. 14B, where the later corresponds to the CreateSTI routine. This method can be seen as the processing of the ST Instanciator command.

At step 1401, the method is in its default state, waiting for an event to initiate the process.

At step 1402, the ST Instanciator command is detected, as a result of a user action. This action can be for instance a specific combination of key on the keyboard 104, or the click of the pointing device 105 on a specific button, or any other similar means not further specified here.

At step 1403, a test is performed to check if the currently selected cell is contained within a sheet where a RSTI is present. This test can be done by parsing the RSTIT table 2260 to identify any record 2261 whose Address field 2262 corresponds to the same sheet as the currently selected cell. If it is the case, then control is given to step 1404; otherwise control is given to step 1405.

At step 1404, a warning message notification is issued for informing the user that a STI cannot be individually created on a sheet where a RSTI already exists. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 1401.

At step 1405, the command parameter ST_name is first retrieved: it corresponds to the name of the ST that the STI to be created will abide by. This parameter ST_name is used to parse the STT table 720 in order to find the record 721 whose "Name" field 722 matches the parameter ST_name. Once this record 721 is found, its fields "Min Element #" 725 and "Max Element #" 726 are respectively memorized as local variables STI_min and STI_max. Then its field "Description Ptr" 724 is used to determine, according to the referenced STDT table 760, the number of meta-elements defined within the ST, and the number of cells defined within each element or meta-element member of the ST. The first number is memorized in a local variable STI_meta, and the second number is memorized in a local variable STI_width 1325 (representing the number of columns of the future STI).

Then another local variable STI_element is initialized with the value taken by STI_min.

Then another local variable STI_critical is initialized with the default value "YES".

Then another local variable STI_sheet_width 1321 is initialized with the total number of columns in the current sheet 1320.

Then another local variable STI_sheet_height 1322 is initialized with the total number of rows in the current sheet 1320.

Then another local variable STI_mode is initialized with the value OVERLAY.

At step 1406, some other local variables are first built or updated. The position of the currently selected cell 1327 is first represented by the local variables STI_offset_width 1323 and STI_offset_height 1324 corresponding respectively to the number of columns and of rows between the top left cell of the current sheet 1320 and the currently selected cell 1327.

Then the number of rows of the future STI is represented by the local variable STI_height 1326, computed as the sum of the local variables STI_meta and STI_element.

Second some working ranges of cells are determined through the evaluation of their addresses.

The range of cells STI_range 1328 corresponding to the future STI is first determined as the range of cells with the currently selected cell 1327 as the top left cell, and with a number of rows and columns respectively equal to STI_height 1326 and STI_width 1325.

Then the range of cells STI_horizontal_flushed_range 1330 is determined as the range of cells sharing the same rows as STI_range 1328, and occupying the STI_width 1325 rightmost columns of the current sheet 1320.

Then the range of cells STI_horizontal_kept_range 1329 is determined as the range of cells sharing the same rows as STI_range 1328, and occupying the columns located between those of STI_range 1328 and STI_horizontal_flushed_range 1330.

Then the range of cells STI_vertical_flushed_range 1332 is determined as the range of cells sharing the same columns as STI_range 1328, and occupying the STI_height 1326 bottom columns of the current sheet 1320.

Then the range of cells STI_vertical_kept_range 1331 is determined as the range of cells sharing the same columns as STI_range 1328, and occupying the rows located between those of STI_range 1328 and STI_vertical_flushed_range 1332.

At step 1407, two sums are performed to check if the future STI will fit within the boundaries of the current sheet 1320.

If the sum of the local variables STI_offset_width 1323 and STI_width 1325 is found greater than the local variable STI_sheet_width 1321, then a local variable STI_too_wide is set to "YES"; otherwise it is set to "NO".

If the sum of the local variables STI_offset_height 1324 and STI_height 1326 is found greater than the local variable STI_sheet_height 1322, then a local variable STI_too_high is set to "YES"; otherwise it is set to "NO".

At step 1408, several tests are performed to evaluate the potential impact of the creation of the future STI, according to the five possible instanciation modes, on any already existing STI or data. These tests require to parse the STIT table 750, and to visit each record 751 to learn the address ("Address" field 752) and the importance ("Critical" field 755) of every already defined STI. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells belongs too to the second range of cells). Different conventional range comparison techniques can be used for evaluating either range partial overlapping or range inclusion, without departing from the spirit of the present invention; they will not be described in the preferred embodiment of the present invention.

First the OVERLAY mode of instanciation is investigated.

If there exists at least one existing STI whose "Critical" field 755 takes the value "YES" and which partially overlaps the range of cells STI_range 1328, then the local test variable STI_overlay_critical takes the value "YES"; otherwise the local test variable STI_overlay_critical takes the value "NO".

If there exists at least one existing STI whose "Critical" field 755 takes the value "NO" and which partially overlaps the range of cells STI_range 1328, then the local test variable STI_overlay_other takes the value "YES"; otherwise the local test variable STI_overlay_other takes the value "NO".

If all the cells within the range of cells STI_range 1328 are empty (containing none data), then the local test variable STI_overlay_data takes the value "NO"; otherwise the local test variable STI_overlay_data takes the value "YES".

Second the HORIZONTAL_INSERT mode of instanciation is investigated.

If there exists at least one existing STI whose "Critical" field 755 takes the value "YES" and which partially overlaps the range of cells made of the entire row where is located the currently selected cell 1327, or which partially overlaps the range of cells constituted by the last bottom STI_height 1326 rows, or which is included in the range of cells constituted by the last bottom STI_height 1326 rows, then the local test variable STI_horizontal_critical takes the value "YES"; otherwise the local test variable STI_horizontal_critical takes the value "NO".

If there exists at least one existing STI whose "Critical" field 755 takes the value "NO" and which partially overlaps the range of cells made of the entire row where is located the currently selected cell 1327, or which partially overlaps the range of cells constituted by the last bottom STI_height 1326 rows, or which is included in the range of cells constituted by the last bottom STI_height 1326 rows, then the local test variable STI_horizontal_other takes the value "YES"; otherwise the local test variable STI_horizontal_other takes the value "NO".

If all the cells within the range of cells constituted by the last bottom STI_height 1326 rows are empty (containing none data), then the local test variable STI_horizontal_data takes the value "NO"; otherwise the local test variable STI_horizontal_data takes the value "YES".

Third the HORIZONTAL_INSERT_BY_RANGE mode of instanciation is investigated.

If there exists at least one existing STI whose "Critical" field 755 takes the value "YES" and which partially overlaps the range of cells constituted by the concatenation of the two ranges of cells STI_range 1328 and STI_vertical_kept_range 1331, or which partially overlaps the range of cells STI_vertical_flushed_range 1332, or which is included in the range of cells STI_vertical_flushed_range 1332, then the local test variable STI_horizontal_range_critical takes the value "YES"; otherwise the local test variable STI_horizontal_range_critical takes the value "NO".

If there exists at least one existing STI whose "Critical" field 755 takes the value "NO" and which partially overlaps the range of cells constituted by the concatenation of the two ranges of cells STI_range 1328 and STI_vertical_kept_range 1331, or which partially overlaps the range of cells STI_vertical_flushed_range 1332, or which is included in the range of cells STI_vertical_flushed_range 1332, then the local test variable STI_horizontal_range_other takes the value "YES"; otherwise the local test variable STI_horizontal_range_other takes the value "NO".

If all the cells within the range of cells STI_vertical_flushed_range 1332 are empty (containing none data), then the local test variable STI_horizontal_range_data takes the value "NO"; otherwise the local test variable STI_horizontal_range_data takes the value "YES".

Fourth the VERTICAL_INSERT mode of instanciation is investigated.

If there exists at least one existing STI whose "Critical" field 755 takes the value "YES" and which partially overlaps the range of cells made of the entire column where is located the currently selected cell 1327, or which partially overlaps the range of cells constituted by the last right STI_width 1325 columns, or which is included in the range of cells constituted by the last right STI_width 1325 columns, then the local test variable STI_vertical_critical takes the value "YES"; otherwise the local test variable STI_vertical_critical takes the value "NO".

If there exists at least one existing STI whose "Critical" field 755 takes the value "NO" and which partially overlaps the range of cells made of the entire column where is located the currently selected cell 1327, or which partially overlaps the range of cells constituted by the last right STI_width 1325 columns, or which is included in the range of cells constituted by the last right STI_width 1325 columns, then the local test variable STI_vertical_other takes the value "YES"; otherwise the local test variable STI_vertical_other takes the value "NO".

If all the cells within the range of cells constituted by the last right STI_width 1325 columns are empty (containing no data), then the local test variable STI_vertical_data takes the value "NO"; otherwise the local test variable STI_vertical_data takes the value "YES".

Fifth the VERTICAL_INSERT_BY_RANGE mode of instanciation is investigated.

If there exists at least one existing STI whose "Critical" field 755 takes the value "YES" and which partially overlaps the range of cells constituted by the concatenation of the two ranges of cells STI_range 1328 and STI_horizontal_kept_range 1329, or which partially overlaps the range of cells STI_horizontal_flushed_range 1330, or which is included in the range of cells STI_horizontal_flushed_range 1330, then the local test variable STI_vertical_range_critical takes the value "YES"; otherwise the local test variable STI_vertical_range_critical takes the value "NO".

If there exists at least one existing STI whose "Critical" field 755 takes the value "NO" and which partially overlaps the range of cells constituted by the concatenation of the two ranges of cells STI_range 1328 and STI_horizontal_kept_range 1329, or which partially overlaps the range of cells STI_horizontal_flushed_range 1330, or which is included in the range of cells STI_horizontal_flushed_range 1330, then the local test variable STI_vertical_range_other takes the value "YES"; otherwise the local test variable STI_vertical_range_other takes the value "NO".

If all the cells within the range of cells STI_horizontal_flushed_range 1330 are empty (containing none data), then the local test variable STI_vertical_range_data takes the value "NO"; otherwise the local test variable STI_vertical_range_data takes the value "YES".

At step 1409, the ST Instanciator Dialog Box 1300 is displayed on the display device 106. The "Critical" check box 1314 displays a check mark if the local variable STI_critical takes the value "YES"; otherwise (value "NO"), the "Critical" check box 1314 is kept with a blank empty display. The label box 1315 is initialized with the value of the local variable ST_name. The text box 1312 is filled with the value of the local variable STI_element. The label box 1311 is filled with the value of the local variable STI_too_wide and the label box 1310 is filled with the value of the local variable STI_too_high. The 15 label boxes 1304 are filled row after row, starting with the top row, from the left to the right, with the values of the following local variables in the following order: STI_overlay_critical, STI_overlay_other, STI_overlay_data, STI_horizontal_critical, STI_horizontal_other, STI_horizontal_data, STI_horizontal_range_critical, STI_horizontal_range_other, STI_horizontal_range_data, STI_vertical_critical, STI_vertical_other, STI_vertical_data, STI_vertical_range_critical, STI_vertical_range_other, STI_vertical_range_data.

Then if the local variable STI_mode takes the respective value OVERLAY, or HORIZONTAL_INSERT, or HORIZONTAL_INSERT_BY_RANGE, or VERTICAL_INSERT, or VERTICAL_INSERT_BY_RANGE, then the option button "Overlay" 1309, or "Horizontal Insert" 1308, or "Horizontal Insert by Range" 1307, or "Vertical Insert" 1306, or "Vertical Insert by Range" 1305 displays alone a black point. Finally the "Create" push-button 1303 is disabled as soon as one of the following local variables takes the value "YES": STI_too_wide, STI_too_high, STI_overlay_critical (only taken into account if the local variable STI_mode is equal to OVERLAY), STI_horizontal_critical (only taken into account if the local variable STI_mode is equal to HORIZONTAL_INSERT), STI_vertical_critical (only taken into account if the local variable STI_mode is equal to VERTICAL_INSERT), STI_horizontal_range_critical (only taken into account if the local variable STI_mode is equal to HORIZONTAL_INSERT_BY_RANGE), STI_vertical_range_critical (only taken into account if the local variable STI_mode is equal to VERTICAL_INSERT_BY_RANGE); otherwise the "Create" push-button 1303 is enabled.

At step 1410, the method is waiting for any user action on the ST Instanciator Dialog Box 1300, or on any change of the currently selected cell. Such user action is typically resulting from a click with the pointing device 105, but take other similar forms such as, but not limited to a specific combination of key on the keyboard 104, or any other similar means not further specified here.

At step 1411, a user action on the ST Instanciator Dialog Box 1300, or a change of the currently selected cell is detected.

If the user action is a click on the "Create" push-button 1303, then control is given to step 1416;

if the user action is a click on the upper part of the spin button 1313, then control is given to step 1415;

if the user action is a click on the lower part of the spin button 1313, then control is given to step 1414;

if the user action is a click on the "Critical" check box 1314, then control is given to step 1413;

if the user action is a click on one of the option buttons 1309, or 1308, or 1307, or 1306, or 1305, then control is given to step 1412;

if the user action is a click on the "Cancel" push-button 1302, or on the closing-window push-button 1301, then control is given to step 1418;

finally if the user action is a change in the position of the currently selected cell, then control is given to step 1406.

At step 1412, the local variable STI_mode takes the value OVERLAY, or HORIZONTAL_INSERT, or HORIZONTAL_INSERT_BY_RANGE, or VERTICAL_INSERT, or VERTICAL_INSERT_BY_RANGE if the spreadsheet user has respectively clicked with the pointing device 105 on the option button 1309, or 1308, or 1307, or 1306, or 1305. Then control is given to step 1406.

At step 1413, the local variable STI_critical is updated in order to swap between the values "YES" and "NO". Then control is given to step 1406.

At step 1414, the local variable STI_element is decremented by 1 (one), as long as its value remains greater than or equal to the value of the local variable STI_min. Then control is given to step 1406.

At step 1415, the local variable STI_element is incremented by 1 (one), as long as its value remains less than or equal to the value of the local variable STI_max. Then control is given to step 1406.

At step 1416, the STIT table 750 is visited to remove from it every record 751 corresponding to a STI corrupted by the introduction of the new instance, as identified during the step 1408 for the insertion mode represented by the local variable STI_mode.

Then the STT table 720 is updated to reflect the removal of each STI. For each removed STI, the INSTANCE REFERENCE (IR) field 729c of the "REFERENCED" attribute 729 of the record 721 whose "Name" field 722 is equal to the "ST" field 753 of the record 751 of the STIT table 750 corresponding to the removed STI, is divided by 2 (two).

At step 1417, the routine CreateSTI is called.

At step 1418, the ST Instanciator Dialog Box 1300 is closed so that it disappears from the display device 106. Finally control is given back to the initial step 1401 for processing any future ST Instanciator command.

Figure 14B:
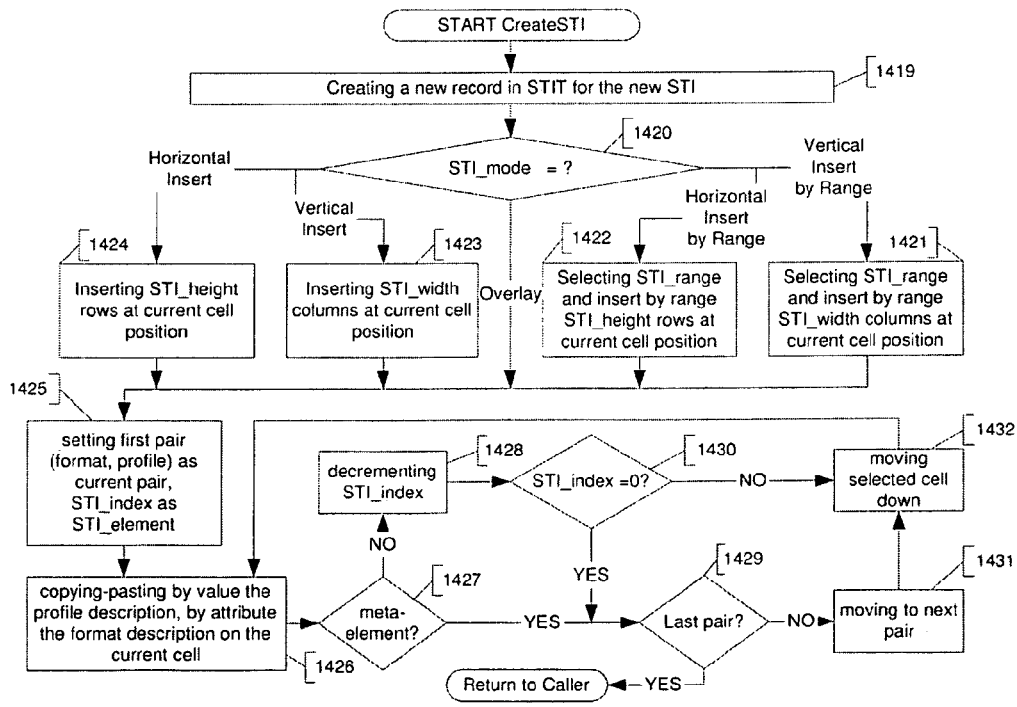
FIG. 14B is a flow chart illustrating a preferred method for creating a STI according to a preferred embodiment of the present invention.
Figure 14A:
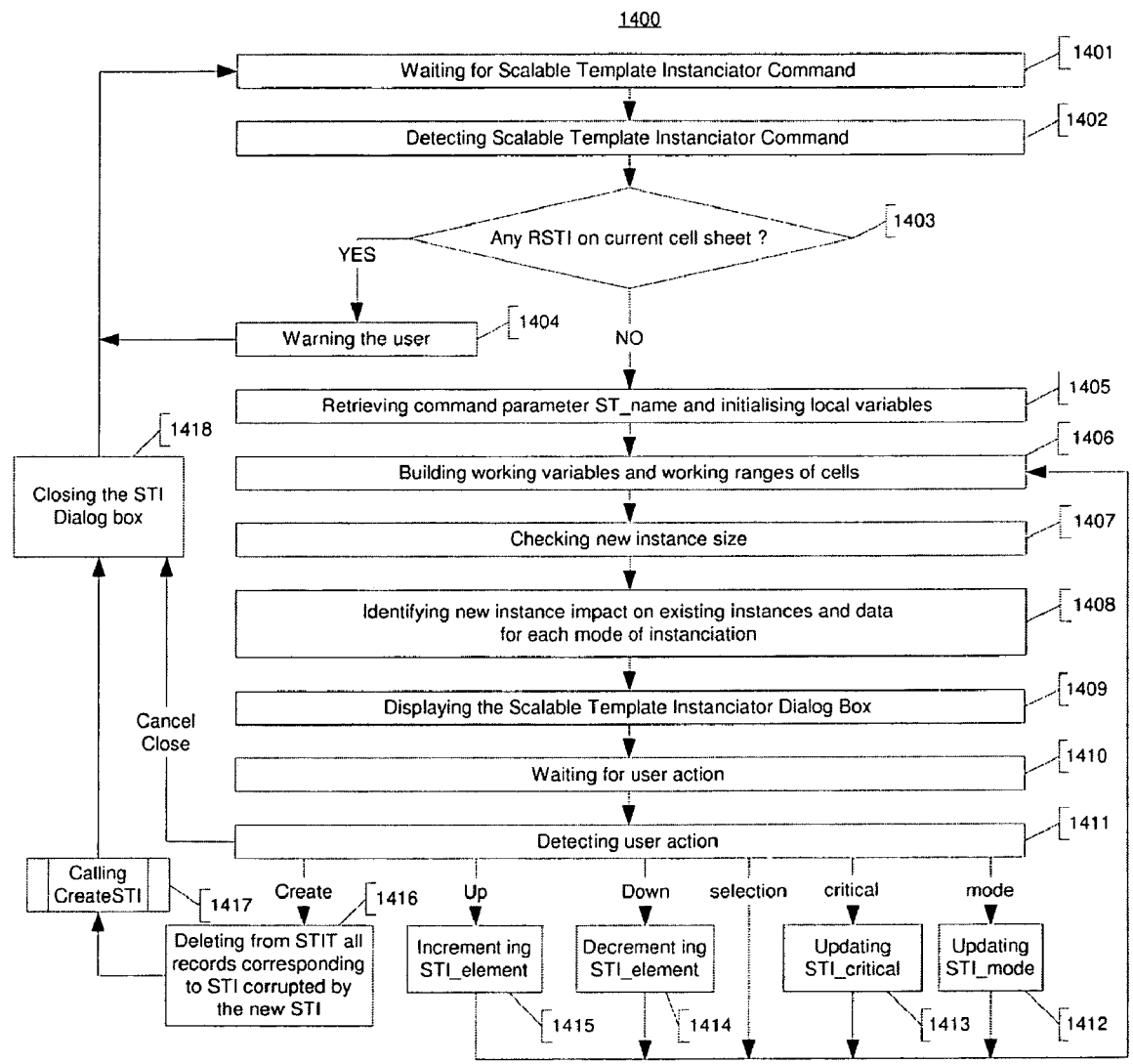
FIG. 14A is a flow chart illustrating a preferred method for instanciating a ST according to a preferred embodiment of the present invention.

The following steps, all part of FIG. 14B, correspond to the execution of the CreateSTI routine, as used in the preferred embodiment of the present invention At step 1419, a new record 751 is introduced in the STIT table 750. Within this record 751, the "Address" field 752 is initialized with the address of the range of cells STI_range 1328, the "ST" field 753 is initialized with the value of the local variable ST_name, the "Element #" field 754 is initialized with the value of the local variable STI_element, the "Critical" field 755 is initialized with the value of the local variable STI_critical, the "Header Size" field 756 is initialized with the number of meta-elements constituting the header part of the new STI (this number being equal to the number of pairs in the header part 767 of the STDT table 760 associated to the ST that the new STI will abide by), and the "Footer Size" field 757 is initialized with the number of meta-elements constituting the footer part of the new STI (this number being equal to the number of pairs in the footer part 766 of the STDT table 760 associated to the ST abided by the new STI). Then the STT table 720 is scanned to identify the record 721 whose "Name" field is found equal to the local variable ST_name. Once found, the "REFERENCED" attribute 729 within the "Type" field 727 of this record 721 is updated by multiplying the "INSTANCE REFERENCE" subfield 729c by 2 (two).

At step 1420 a test is performed to check the value of the local variable ST_mode.

If this value is found equal to OVERLAY then control is given to step 1425,

If this value is found equal to HORIZONTAL_INSERT then control is given to step 1424, If this value is found equal to HORIZONTAL_INSERT_BY_RANGE then control is given to step 1422, If this value is found equal to VERTICAL_INSERT then control is given to step 1423, If this value is found equal to VERTICAL_INSERT_BY_RANGE then control is given to step 1421.

At step 1421, the range of cells STI_range 1328 is selected to become the currently selected range of cells, with the currently selected cell being kept in its former position 1327 and then a regular operation of "column insertion within selected range" is performed. Then control is given to step 1425.

At step 1422, the range of cells STI_range 1328 is selected to become the currently selected range of cells, with the currently selected cell being kept in its former position 1327 and then a regular operation of "row insertion within selected range" is performed. Then control is given to step 1425.

At step 1423, the range of cells STI_range 1328 is selected to become the currently selected range of cells, with the currently selected cell being kept in its former position 1327 and then a regular operation of "column insertion" is performed. Then control is given to step 1425.

At step 1424, the range of cells STI_range 1328 is selected to become the currently selected range of cells, with the currently selected cell being kept in its former position 1327 and then a regular operation of "row insertion" is performed. Then control is given to step 1425.

At step 1425, a local variable STI_index is initialized to the value taken by the local variable STI_element. Then the STT table 720 is parsed to identify the record 721 whose "Name" field 722 matches the value of the local variable ST_name. Within this record 721 is retrieved the "Description Ptr" field 724 allowing to locate in memory the STDT table 760 associated to the ST that the new STI to be created will abide by. Then the first pair 761 of element or MEF name and element or MEP name found within this STDT table 760 is set as the current pair of names: (EF or MEF name, EP or MEP name).

At step 1426, the EPT table 710 is parsed to find the record 711 whose "Name" field 712 is found equal to the EP or MEP name within the current pair. Once this record 711 is found, its "Description Ptr" field 714 is retrieved to locate in memory the range of cells illustrating the EP or MEP. This description of the EP or MEP is copy-pasted by value only onto the currently selected cell, so that the corresponding row within the STI_range receives the EP or MEP initial values. Then the EFT table 700 is parsed to find the record 701 whose "Name" field 702 is found equal to the EF or MEF name within the current pair. Once this record 701 is found, its "Description Ptr" field 704 is retrieved to locate in memory the range of cells illustrating the EF or MEF. This description of the EF or MEF is copy-pasted by attribute only onto the currently selected cell, so that the corresponding row within the STI_range receives the EF or MEF attributes.

At step 1427 a test is performed to check if the current pair (EF or MEF name, EP or MEP name) corresponds to an element or to a meta-element. In the first case, control is given to step 1428, and in the second case control is given to step 1429.

At step 1428, the local variable STI_index is decremented by 1 (one). Then control is given to step 1430.

At step 1429, a test is performed to check if the current pair (EF or MEF name, EP or MEP name) is the last one 763 within the STDT table 760. If it is the case, the execution of the CreateSTI routine completes by returning control to the routine caller, otherwise control is given to step 1431.

At step 1430, a test is performed to check if the local variable STI_index is equal to 0 (zero). If it is the case, then control is given to step 1429, otherwise control is given to step 1432.

At step 1431, the pair of names (EF or MEF name, EP or MEP name) following the current one in the STDT table 760 becomes the current pair of names.

At step 1432, the currently selected cell is moved downwards by one row. Then control is given to step 1426.

E7. STI Deletion Manager Method

Figure 15A:
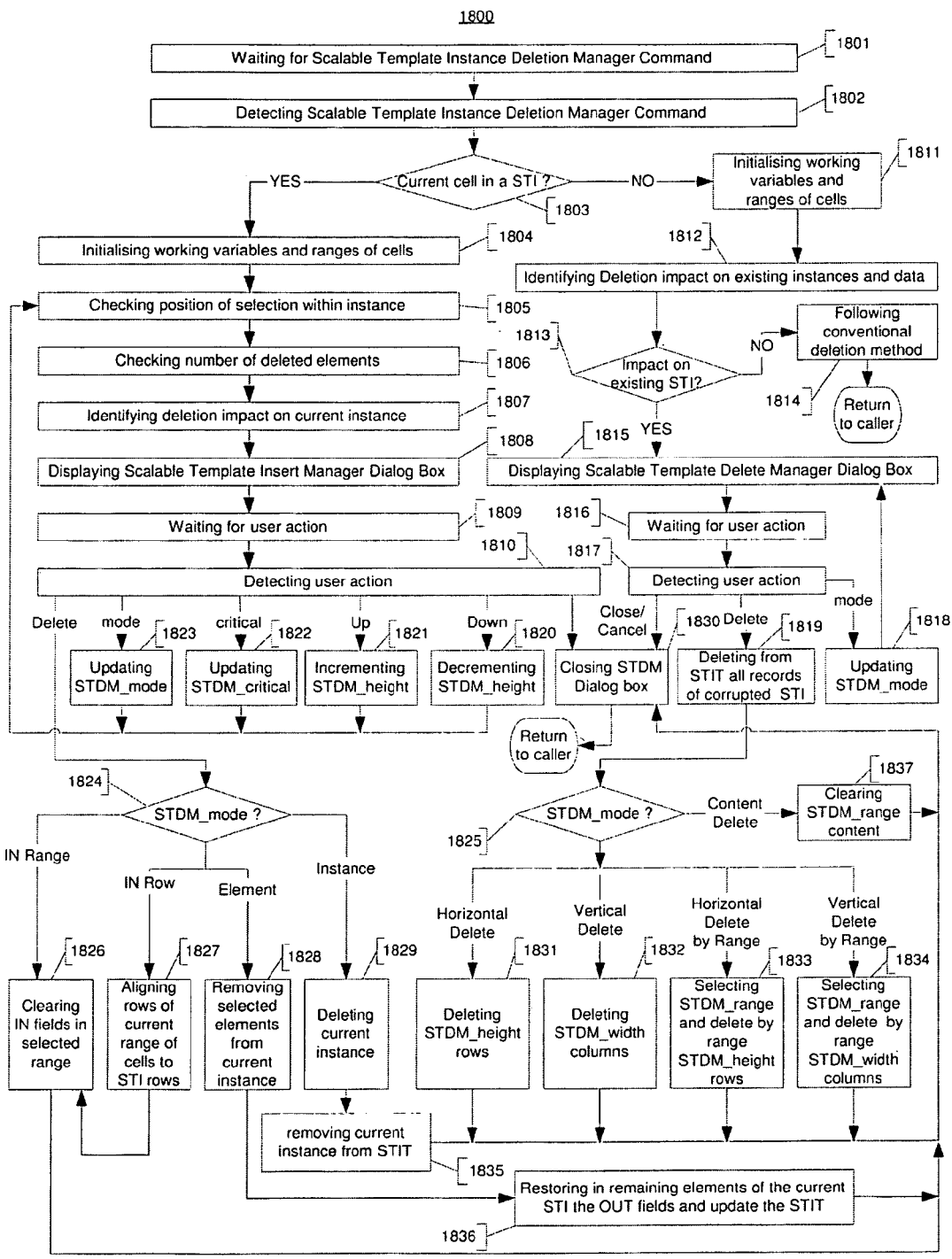
FIG. 15A is a flow chart illustrating a preferred method for managing deletion in STI's according to a preferred embodiment of the present invention.

The method for deleting within a STI either the content of selected cells, or selected elements or even the whole STI used in the preferred embodiment of the present invention is summarized in flowchart 1800 of FIG. 15A. This method can be seen as the processing of the STI Deletion Manager command.

At step 1801, the method is in its default state, waiting for an event to initiate the process.

At step 1802, the STI Deletion Manager command is detected, as a result of a user action. This action can be for instance a specific combination of key on the keyboard 104, or the click of the pointing device 105 on a specific button, or any other similar means not further specified here.

When the STI Deletion Manager command is detected, the current spreadsheet selection corresponds to a range of cells, possibly reduced to a single individual cell, which is known as the currently selected range of cells and which comprises the currently selected cell. If this currently selected cell is not the top left cell within the currently selected range of cells, then the top left cell of the currently selected range of cells becomes the currently selected cell.

At step 1803, a test is performed to check if the currently selected cell is located within an existing STI. This test is performed by parsing the STIT table 750 and visiting in each record 751 the "Address" field 752 to determine if the range of cells address specified in this field does include the address of the individual currently selected cell. If it is the case, then the currently selected cell is contained in a STI named STDM_instance_range and control is given to step 1804; otherwise control is given to step 1811.

At step 1804, the record 751 found at the step 1803 is first retrieved to initialize local variables from its fields describing the STI STDM_instance_range to which belongs the currently selected cell: the local variable ST_name is initialized with the value of the field "ST" 753; the local variable STDM_element is initialized with the value of the "Element #" field 754; the local variable STDM_critical is initialized with the value of the "Critical" field 755; the local variable STDM_header_size is initialized with the value of the "Header Size" field 756; the local variable STDM_footer_size is initialized with the value of the "Footer Size" field 757. Then the local variable ST_name is used to parse the STT table 720 in order to find the record 721 whose "Name" field 722 matches the parameter ST_name. Once this record 721 is found, its field "Min Element #" 725 is memorized as the local variable STDM_min. Then another local variable STDM_mode is initialized with the value DELETE_IN_FIELDS_IN_SELECTED_RANGE. Then the position of the currently selected cell is used to initialize the local variable STDM_offset_height corresponding to the number of rows between the top left cell of the range of cells STDM_instance_range and the currently selected cell. Then the number of rows of the currently selected range of cells STDM_range is represented by the local variable STDM_height.

At step 1805, a series of tests is performed to determine the relative position of the currently selected range of cells with respect to the current STI STDM_instance_range. First a local variable STDM_header_overlap takes the value 1 (one) if the value of the local variable STDM_offset_height is less than the value of the local variable STDM_header_size; otherwise the local variable STDM_header_overlap takes the value 0 (zero). Then a local variable STDM_footer_overlap takes the value 1 (one) if the sum of the values of the local variables STDM_offset_height and STDM_height is found greater than the sum of the values of the local variables STDM_header_size and STDM_element. Then a local variable STDM_body_overlap takes the value of the formula: STDM_header_overlap×STDM_data1+(1-STDM_header_overlap)×STDM_data2, where STDM_data1 takes the value 1 (respectively 0) if the sum of the values of the local variables STDM_offset_height and STDM_height is found greater than (respectively less than or equal to) the value of the local variable STDM_header_size; and where STDM_data2 takes the value 1 (respectively 0) if the value of the local variable STDM_offset_height is found less than (respectively greater than or equal to) the sum of the values of the local variables STDM_header_size and STDM_element.

At step 1806, the number of deleted elements is evaluated to then verify that the remaining number of elements will not be too small, that is below the lower limit STDM_min. This number of deleted elements is recorded in the local variable STDM_delete_element# whose value is given by the following formula:

STDM_body_overlap×(STDM_height−STDM_header_overlap×(STDM_header_size−STDM_offset_height)−STDM_footer_overlap×(STDM_offset_height+STDM_height−STDM_header_size−STDM_element)).

At step 1807, a first local variable STDM_too_small is set to the value "YES" if the sum of the values of the local variables STDM_deleted_element_# and STDM_min is found greater than the value of the local variable STDM_element; otherwise this local variable STDM_too_small takes the value "NO". Then a second local variable STDM_outside_body is set to the value "NO" if both the local variables STDM_header_overlap and STDM_footer_overlap take the value 0 (zero); otherwise this local variable STDM_outside_body is set to the value "YES".

At step 1808, the ST Delete Manager Dialog Box 1900 is displayed on the display device 106. The "Critical" check box 1910 displays a check mark if the local variable STDM_critical takes the value "YES"; otherwise (value "NO"), the "Critical" check box 1910 is kept with a blank empty display. The label box 1911 is initialized with the value of the local variable ST_name. The text box 1908 is filled with the value of the local variable STDM_height. The label box 1907 is filled with the value of the local variable STDM_too_small, and the label box 1904 is filled with the value of the local variable STDM_outside_body. Then if the local variable STDM_mode takes the respective value DELETE_IN_FIELDS_IN_SELECTED_RANGE, or
DELETE_IN_FIELDS_IN_SELECTED_ROWS, or
DELETE_SELECTED_ELEMENTS, or
DELETE_SELECTED_INSTANCE, then the option button 1905, or 1906, or 1912, or 1913 displays alone a black point. Finally the "Delete" push-button 1903 is disabled as soon as one of the following local variables takes the value "YES": STDM_too_high, STDM_outside_body, when the local variable STDM_mode is equal to DELETE_SELECTED_ELEMENTS; otherwise the "Delete" push-button 1903 is enabled.

At step 1809, the method is waiting for any user action on the ST Delete Manager Dialog Box 1900. Such user action is typically resulting from a click with the pointing device 105, but take other similar forms such as, but not limited to a specific combination of key on the keyboard 104, or any other similar means not further specified here.

At step 1810, a user action on the ST Delete Manager Dialog Box 1900 is detected.

If the user action is a click on the "Delete" push-button 1903, then control is given to step 1824;

if the user action is a click on the upper part of the spin button 1909, then control is given to step 1821;

if the user action is a click on the lower part of the spin button 1909, then control is given to step 1820;

if the user action is a click on the "Critical" check box 1910, then control is given to step 1822;

if the user action is a click on one of the option buttons 1906, or 1905, or 1912, or 1913, then control is given to step 1823;

if the user action is a click on the "Cancel" push-button 1902, or on the closing-window push-button 1901, then control is given to step 1830.

At step 1811, the local variable STDM_mode is initialized with the value CONTENT_DELETE. Then the number of rows and of columns of the currently selected range of cells STDM_range is represented respectively by the local variables STDM_height and STDM_width. Then the range of cells STDM_right_range is determined as the range of cells sharing the same rows as STDM_range, and occupying the columns located on the right of the range of cells STDM_range. Then the range of cells STDM_bottom_range is determined as the range of cells sharing the same columns as STDM_range, and occupying the rows located below those of STDM_ range. Then the range of cells STDM_left_range is determined as the range of cells sharing the same rows as STDM _ range, and occupying the columns located on the left of the range of cells STDM_range. Then the range of cells STDM_top_range is determined as the range of cells sharing the same columns as STDM_ range, and occupying the rows located above those of STDM_range.

At step 1812, several tests are performed to evaluate the potential impact of the deletion, according to four possible deletion modes, on any already existing STI or data. These tests require to parse the STIT table 750, and to visit each record 751 to learn the address ("Address" field 752) and the importance ("Critical" field 755) of every already defined STI. These tests evaluate either if two given ranges of cells partially overlap (meaning that there exist in the first range of cells at least one cell belonging to the second range of cells and at least one cell not belonging to the second range of cells) or if a first given range of cells is included within a second given range of cells (meaning that every cell belonging to the first range of cells also belongs to the second range of cells). Different conventional range comparison techniques can be used for evaluating either range partial overlapping or range inclusion, without departing from the spirit of the present invention; they will not be described in the preferred embodiment of the present invention.

First the HORIZONTAL_DELETE mode of deletion is investigated.

If there exists at least one existing STI whose "Critical" field 755 takes the value "YES" and which partially overlaps the range of cells made of the entire rows where is located the currently selected range of cells STDM_range, or which is included in the range of cells made of the entire rows where is located the currently selected range of cells STDM_range, then the local test variable STDM_horizontal_critical takes the value "YES"; otherwise the local test variable STDM_horizontal_critical takes the value "NO".

If there exists at least one existing STI whose "Critical" field 755 takes the value "NO" and which partially overlaps the range of cells made of the entire rows where is located the currently selected range of cells STDM_range, or which is included in the range of cells made of the entire rows where is located the currently selected range of cells STDM_range, then the local test variable STDM_horizontal_other takes the value "YES"; otherwise the local test variable STDM_horizontal_other takes the value "NO".

If all the cells within the range of cells made of the entire rows where is located the currently selected range of cells STDM_range are empty (containing none data), then the local test variable STDM_horizontal_data takes the value "NO"; otherwise the local test variable STDM_horizontal_data takes the value "YES".

Second the HORIZONTAL_DELETE_BY_RANGE mode of deletion is investigated.

If there exists at least one existing STI whose "Critical" field 755 takes the value "YES" and which partially overlaps the range of cells constituted by the concatenation of the two ranges of cells STDM_range and STDM_bottom_range, or which partially overlaps or is included in the range of cells STDM_range, then the local test variable STDM_horizontal_range_critical takes the value "YES"; otherwise the local test variable STDM_horizontal_range_critical takes the value "NO".

If there exists at least one existing STI whose "Critical" field 755 takes the value "NO" and which partially overlaps the range of cells constituted by the concatenation of the two ranges of cells STDM_range and STDM_bottom_range, or which partially overlaps or is included in the range of cells STDM_range, then the local test variable STDM_horizontal_range_other takes the value "YES"; otherwise the local test variable STDM_horizontal_range_other takes the value "NO".

If all the cells within the range of cells STDM_range are empty (containing none data), then the local test variable STDM_horizontal_range_data takes the value "NO"; otherwise the local test variable STDM_horizontal_range_data takes the value "YES".

Third the VERTICAL_DELETE mode of deletion is investigated.

If there exists at least one existing STI whose "Critical" field 755 takes the value "YES" and which partially overlaps the range of cells made of the entire columns where is located the currently selected range of cells STDM_range, or which is included in the range of cells made of the entire columns where is located the currently selected range of cells STDM_range, then the local test variable STDM_vertical_critical takes the value "YES"; otherwise the local test variable STDM_vertical_critical takes the value "NO".

If there exists at least one existing STI whose "Critical" field 755 takes the value "NO" and which partially overlaps the range of cells made of the entire columns where is located the currently selected range of cells STDM_range, or which is included in the range of cells made of the entire columns where is located the currently selected range of cells STDM_range, then the local test variable STDM_vertical_other takes the value "YES"; otherwise the local test variable STDM_vertical_other takes the value "NO".

If all the cells within the range of cells made of the entire columns where is located the currently selected range of cells STDM_range are empty (containing no data), then the local test variable STDM_vertical_data takes the value "NO"; otherwise the local test variable STDM_vertical_data takes the value "YES".

Fourth the VERTICAL_DELETE_BY_RANGE mode of deletion is investigated.

If there exists at least one existing STI whose "Critical" field 755 takes the value "YES" and which partially overlaps the range of cells constituted by the concatenation of the two ranges of cells STDM_range and STDM_right_range, or which partially overlaps or is included in the range of cells STDM_range, then the local test variable STDM_vertical_range_critical takes the value "YES"; otherwise the local test variable STDM_vertical_range_critical takes the value "NO".

If there exists at least one existing STI whose "Critical" field 755 takes the value "NO" and which partially overlaps the range of cells constituted by the concatenation of the two ranges of cells STDM_range and STDM_right_range, or which partially overlaps or is included in the range of cells STDM_range, then the local test variable STDM_vertical_range_other takes the value "YES"; otherwise the local test variable STDM_vertical_range_other takes the value "NO".

If all the cells within the range of cells STDM_range are empty (containing no data), then the local test variable STDM_vertical_range_data takes the value "NO"; otherwise the local test variable STDM vertical_range_data takes the value "YES".

Fifth the CONTENT_DELETE mode of deletion is investigated.

If there exists at least one existing STI whose "Critical" field 755 takes the value "YES" and whose intersection with the range of cells STDM_range contains at least one element or meta-element cell specified as "OUT" cell, then the local test variable STDM_content_critical takes the value "YES"; otherwise the local test variable STDM_content_critical takes the value "NO".

If there exists at least one existing STI whose "Critical" field 755 takes the value "NO" and whose intersection with the range of cells STDM_range contains at least one element or meta-element cell specified as "OUT" cell, then the local test variable STDM_content_other takes the value "YES"; otherwise the local test variable STDM_content_other takes the value "NO".

If all the cells within the range of cells STDM_range are empty (containing no data), then the local test variable STDM_content_data takes the value "NO"; otherwise the local test variable STDM_content_data takes the value "YES".

At step 1813, a test is performed to check the deletion impact on any existing STI, according to the values assigned during the step 1812 to the local variables STDM_horizontal_critical, STDM_horizontal_other, STDM_horizontal_range_critical, STDM_horizontal_range_other, STDM_vertical_critical, STDM_vertical_other, STDM_vertical_range_critical, STDM_vertical_range_other, STDM_content_critical, STDM_content_other.

If none of these local variables takes the value "YES", then control is given to step 1814; otherwise if at least one of these local variables takes the value "YES", then control is given to step 1815.

At step 1814, the conventional deletion method as used and defined in conventional electronic spreadsheet environments is triggered, and then control is given back to the initial step 1801 for processing any future STI Deletion Manager command.

At step 1815, the ST Delete Manager Dialog Box 1920 is displayed on the display device 106. The label box 1929 is initialized with the reserved value "None". The 15 label boxes 1924 are filled row after row, starting with the top row, from the left to the right, with the values of the following local variables in the following order:
STDM_content_critical,
STDM_content_other,
STDM_content_data,
STDM_horizontal_critical,
STDM_horizontal_other,
STDM_horizontal_data,
STDM_horizontal_range_critical,
STDM_horizontal_range_other,
STDM_horizontal_range_data,
STDM_vertical_critical,
STDM_vertical_other,
STDM_vertical_data,
STDM_vertical_range_critical,
STDM_vertical_range_other,
STDM_vertical_range_data.

Then if the local variable STDM_mode takes the respective value CONTENT_DELETE, or HORIZONTAL_DELETE, or HORIZONTAL_DELETE_BY_RANGE, or VERTICAL_DELETE, or VERTICAL_DELETE_BY_RANGE, then the option button 1930, or 1928, or 1927, or 1926, or 1925 displays alone a black point.

Finally the "Delete" push-button 1923 is disabled as soon as one of the following local variables takes the value "YES":
STDM_content_critical (only taken into account if the local variable STDM_mode is equal to CONTENT_DELETE),
STDM_horizontal_critical (only taken into account if the local variable STDM_mode is equal to HORIZONTAL_DELETE),
STDM_vertical_critical (only taken into account if the local variable STDM_mode is equal to VERTICAL_DELETE),
STDM_horizontal_range_critical (only taken Into account if the local variable STDM_mode is equal to HORIZONTAL_DELETE_BY_RANGE),
STDM_vertical_range_critical (only taken into account if the local variable STDM_mode is equal to VERTICAL_DELETE_BY_RANGE);
otherwise the "Delete" push-button 1923 is enabled.

At step 1816, the method is waiting for any user action on the ST Insert Manager Dialog Box 1920. Such user action is typically resulting from a click with the pointing device 105, but take other similar forms such as, but not limited to a specific combination of key on the keyboard 104, or any other similar means not further specified here.

At step 1817, a user action on the ST Insert Manager Dialog Box 1920 is detected. If the user action is a click on the "Delete" push-button 1923, then control is given to step 1819; if the user action is a click on one of the option buttons 1930, or 1928, or 1927, or 1926, or 1925, then control is given to step 1818; if the user action is a click on the "Cancel" push-button 1922, or on the closing-window push-button 1921, then control is given to step 1830.

At step 1818, the local variable STDM_mode takes the value CONTENT_DELETE, or HORIZONTAL_DELETE, or HORIZONTAL_DELETE_BY_RANGE, or VERTICAL_DELETE, or VERTICAL_DELETE_BY_RANGE if the spreadsheet user has respectively clicked with the pointing device 105 on the option button 1930, or 1928, or 1927, or 1926, or 1925. Then control is given to step 1815.

At step 1819, the STIT table 750 is visited to remove from it every record 751 corresponding to a STI corrupted by the deletion operation, as identified during the step 1812 for the deletion mode represented by the local variable STDM_mode. Then the STT table 720 is updated to reflect the removal of each STI. For each removed STI, the INSTANCE REFERENCE (IR) field 729*c* of the "REFERENCED" attribute 729 of the record 721 whose "Name" field 722 is equal to the "ST" field 753 of the record 751 of the STIT table 750 corresponding to the removed STI, is divided by 2 (two). Then control is given to the step 1825.

At step 1820, the local variable STDM_height is decremented by 1 (one), as long as its value remains strictly positive. If the decrement has been done, then the currently selected range of cells STDM_range is reduced by removing from the current selection the last row. Then control is given to step 1805.

At step 1821, the local variable STDM_height is incremented by 1 (one), as long as its value remains less than the value of the local variable STDM_element. If the increment has been done, then the currently selected range of cells STDM_range is enlarged by adding to the current selection a new row below the last one. Then control is given to step 1805.

At step 1822, the local variable STDM_critical is updated in order to swap between the values "YES" and "NO". In addition, a check mark is respectively added within or removed from the "Critical" check box 1910 if it was previously absent or present in this same check box 1910. Then the field "Critical" 755 within the record 751 of the STIT table 750, as found at step 1803 is updated with the value of the local variable STDM_critical. Then control is given to step 1805.

At step 1823, the local variable STDM_mode takes the value "DELETE_IN_FIELDS_IN_SELECTED_RANGE", or DELETE_IN_FIELDS_IN_SELECTED_ROWS", or "DELETE_SELECTED_ELEMENTS", or "DELETE_SELECTED_INSTANCE", if the spreadsheet user has respectively clicked with the pointing device 105 on the option button 1905, or 1906, or 1912, or 1913. Then control is given to step 1805.

At step 1824 a test is performed to check the value of the local variable STDM_mode.
If this value is found equal to "DELETE_IN_FIELDS_IN_SELECTED_RANGE" then control is given to step 1826;
if this value is found equal to "DELETE_IN_FIELDS_IN_SELECTED_ROWS" then control is given to step 1827;
if this value is found equal to "DELETE_SELECTED_ELEMENTS" then control is given to step 1828;
if this value is found equal to "DELETE_SELECTED_INSTANCE" then control is given to step 1829.

At step 1825 a test is performed to check the value of the local variable STDM_mode.
If this value is found equal to HORIZONTAL_DELETE then control is given to step 1831;
if this value is found equal to HORIZONTAL_DELETE_BY_RANGE then control is given to step 1833;
if this value is found equal to VERTICAL_DELETE then control is given to step 1832;
if this value is found equal to VERTICAL_DELETE_BY_RANGE then control is given to step 1834;
If this value is found equal to CONTENT_DELETE then control is given to step 1837.

At step 1826, the "IN" cells belonging to the currently selected range of cells STDM_range are cleared. For this purpose, the "ST" field 753 of the record 751 of the STIT table 750, as identified at step 1803, is visited to get a memory pointer on the STDT table 760 of the ST, which specifies for each meta-element and for each element of the STI what is the associated EP, which in turn indicates which cells are "IN" cells and which cells are "OUT" cells. Then each row of the range of cells STDM_range is selected one after the other, and for each selected row, the corresponding element or MEP is retrieved from the STDT table 760 to determine which cells are "IN" cells. For this purpose, a temporary local variable STDM_out_fields memorizes the relative positions of all the cells specified as "IN" or "OUT" cells, as an ordered set of IN or OUT values. For instance in an EP made of 5 cells, where only the third and fifth cells are "OUT" cells, this local variable STDM_out_fields takes the value (IN, IN, OUT, IN, OUT). With the same example, if the selected range of cells was only occupying the second, third and fourth columns of the STI, then the first cell is ignored because although it is an "IN" cell, it falls outside the limits of the range of cells STDM_range, so that only the second and fourth cells are taken into account. Once the "IN" cells belonging to the range of cells STDM_range are determined, these cells are updated by clearing their content.

At step 1827, the currently selected range of cells STDM_range is updated in order to align its columns with those occupied by the STI STDM_instance_range. Then control is given to step 1826.

At step 1828, the elements belonging to the rows of the currently selected range of cells STDM_range are removed from the current STI STDM_instance_range. For this purpose is first selected the range of cells constituted by the same columns as the range of cells STDM_instance_range, and whose rows are located between the bottom row of the range of cells STDM_range (excluded) and the bottom row of the range of cells STDM_instance_range (included). Then this selected range of cells is moved upwards, row after row, up to the position where its top row occupies the same row as the top row of the former range of cells STDM_range. For each step of this move, a row within the range of cells STDM_range is removed, so that at the end all the rows of the range of cells STDM_range are removed. Then control is given to step 1836.

At step 1829, the range of cells corresponding to the STI STDM_instance_range becomes a regular ranges of cells and looses its quality of STI. For this purpose, the content of all the cells of this range of cells STDM_instance_range is cleared, and then this whole range of cells receives the default display attributes defined within the current spreadsheet file. Then control is given to step 1835.

At step 1830, the ST Delete Manager Dialog Box 1900 or 1920 is closed so that it disappears from the display device 106. Finally control is given back to the initial step 1801 for processing any future STI Deletion Manager command.

At step 1831, the range of cells STDM_range is selected to become the currently selected range of cells so that STDM_height rows are selected, and then a regular operation of "row deletion" is performed. Then control is given to step 1830.

At step 1832, the range of cells STDM_range is selected to become the currently selected range of cells so that STDM_width columns are selected, and then a regular operation of "column deletion" is performed. Then control is given to step 1830.

At step 1833, the range of cells STDM_range is selected to become the currently selected range of cells so that STDM_height rows are selected, and then a regular operation of "row deletion within selected range" is performed. Then control is given to step 1830.

At step 1834, the range of cells STDM_range is selected to become the currently selected range of cells so that STDM_width columns are selected, and then a regular operation of "column deletion within selected range" is performed. Then control is given to step 1830.

At step 1835, the record 751 identified at step 1803 is removed from the STIT table 750. Then the STT table 720 is updated to reflect the removal of this STI. The INSTANCE REFERENCE (IR) field 729c of the "REFERENCED" attribute 729 of the record 721 whose "Name" field 722 is equal to the "ST" field 753 of the record 751 of the STIT table 750 corresponding to the removed STI, is divided by 2 (two), before giving control to the step 1830.

At step 1836, the current STI STDM_instance_range is updated by restoring in all the remaining elements the "OUT" cells to prevent any corruption due to the element deletion. First the STT table 720 is parsed to identify the record 721 whose "Name" field 722 matches the value of the local variable ST_name. Within this record 721 is retrieved the "Description Ptr" field 724 allowing to locate in memory the STDT table 760 associated to the ST that the current STI STDM_instance_range abides by. Then the element pair 762 within this STDT table 760 is accessed to retrieve the EP, recorded in the local variable STDM_profile. Then the EPT table 710 is parsed to identify a record 711 whose "Name" field 712 matches the local variable STDM_profile. Once found, the "Description Ptr" field 714 is used to access in memory a description of the EP which indicates which cells are "IN" cells and which cells are "OUT" cells. For this purpose, a temporary local variable STDM_out_fields memorises the relative positions of all the cells specified as "OUT" cells, as an ordered set of IN or OUT values. For instance with an EP made of 5 cells, where only the third and fifth cells are "OUT" cells, this local variable STDM_out_fields takes the value (IN, IN, OUT, IN, OUT). Then each "OUT" cell of the illustrative range of cells (pointed by the "Description Ptr" field 714 of the record 711 of the EPT table 710 whose "Name" 712 field matches the local variable STDM_profile) is individually copied and pasted onto the cell of the top element of the STI STDM_instance_range which has the same relative column offset within the element (corresponding to a position taking the value "OUT" in the local variable STDM_out_fields). Then the top element of the STI STDM_instance_range is selected as the currently selected range of cells. Then each cell within this selection is individually deselected if it corresponds to a position taking the value "IN" in the local variable STDM_out_fields. Within this selection, the leftmost cell is set as the currently selected cell. At this stage, the current selection corresponds to the collection of all the "OUT" cells. Then the current selection is extended to include as many rows as needed below the top element, so that it spreads over all the elements of the STI STDM_instance_range. Then a conventional "copy-down" operation is done to copy the first row onto the below ones, so that all the "OUT" cells of the current STI STDM_instance_range receive a correct content. Finally the "Element #" field 754 within the record 751 of the STIT table 750, as found at step 1803 is updated with the difference of the local variables STDM_element and STDM_height. Finally control is to step 1830.

At step 1837, the content of every cell comprised within the currently selected range of cells STDM_range is cleared. Then control is given to step 1830.

E8. RSTI Deletion Manager Method

Figure 15B:
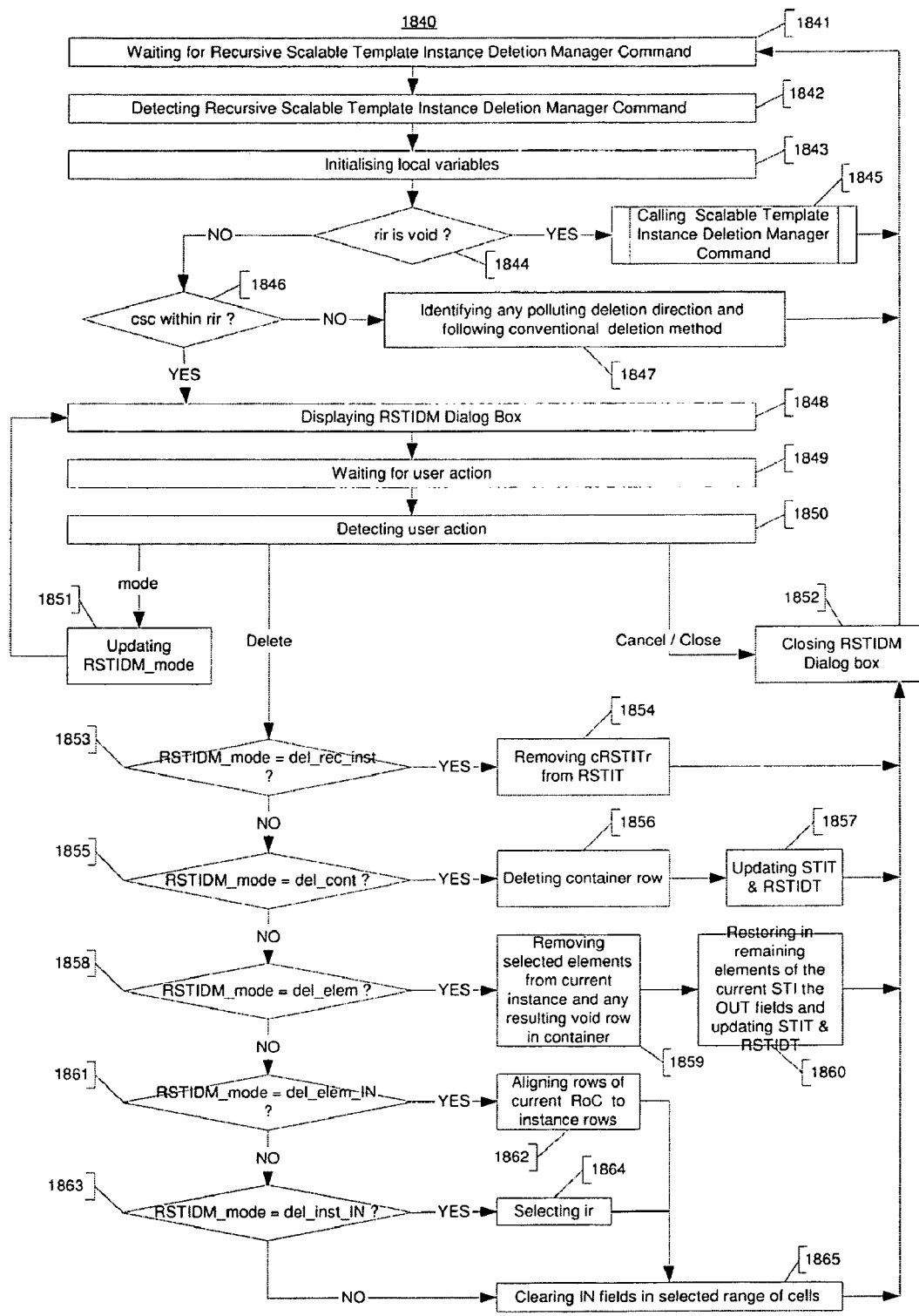
FIG. 15B is a flow chart illustrating a preferred method for managing deletion in RSTI's according to a preferred embodiment of the present invention.

The method for deleting objects within a RSTI used in the preferred embodiment of the present invention is summarized in flowchart 1840 of FIG. 15B. This method can be seen as the processing of the STI Deletion Manager command.

At step 1841, the method is in its default state, waiting for an event to initiate the process.

At step 1842, the RSTI Deletion Manager command is detected, as a result of a user action. This action can be for instance a specific combination of keys on the keyboard 104, or the click of the pointing device 105 on a specific button, or any other similar means no further specified here.

At step 1843, some local variables are initialized:

The local variable csr ("currently selected range") is a range of cells corresponding to the currently selected range of cells.

The local variable csc ("currently selected cell") is the individual cell corresponding to the currently selected cell.

The local variable cRSTITr ("current RSTIT record") corresponds, if it exists, to the record 2261 of the RSTIT table 2260, the "Address" field 2262 of which belongs to the same sheet as the local variable range of cells csc. If the RSTIT table 2260 does not contain any record 2261 with the "Address" field 2262 occupying the same sheet as the local variable range of cells csc, then the local variable cRSTITr defaults to the value "void".

The local variable rir ("recursive instance range") is the range of cells 2001 whose address is given by the "Address" field 2262 of the cRSTITr record 2261, if not equal to "void". If the local variable cRSTITr takes the value "void", then the local variable rir defaults also to the value "void".

The local variable cRSTIDT ("current RSTIDT") is the RSTIDT table 2270 pointed by the "RSTIDT Ptr" field 2265 of the cRSTITr record 2261, if not void. If the local variable cRSTITr takes the value "void", then the local variable cRSTIDT defaults also to the value "void".

If the local variable rir is not equal to "void", then the local variable RST_name is initialized with the name of the RST abided by the RSTI rir. This name is given by the "RST" field 2263 of the cRSTITr record 2261 of the RSTIT table 2260 whose "Address" field 2262 belongs to the same sheet as the range of cells csc.

The local variable ir ("instance range") is a range of cells corresponding, if it exists, to the STI containing the currently selected cell csc. If the currently selected cell csc does not belong to a STI, then the local variable ir takes a default value set to "void". The initialization of this local variable ir is determined by comparing the address of the local variable csc with the "Address" field 752 of each record 751 of the STIT table 750. For instance, by referring to the FIG. 17A, the local variable ir takes the value void if the local variable csc corresponds to one of the ranges of cells 2024, or 2022, and corresponds to the respective ranges of cells 2034, or 2032 or 2030, or 2031, or 2033, or 2013, if the local variable csc corresponds to one of the ranges of cells 2018, or 2019, or 2020, or 2021, or 2023, or 2025.

The local variable ccirb ("current cell in recursive body") is a Boolean variable taking the values TRUE or FALSE if the currently selected cell csc is respectively located or not within the body part 2003 of the rir range of cells 2001. For instance, by referring to the FIG. 17A, the local variable ccirb takes the value TRUE if the local variable csc corresponds to one of the ranges of cells 2018, or 2020, or 2022, or 2023, and the value FALSE if the local variable csc corresponds to one of the ranges of cells 2019, or 2021, or 2024, or 2025.

The local variable cr ("container row") corresponds, if the local variable ccirb is equal to TRUE, to the container row range of cells where the currently selected cell csc is located. If the local variable ccirb is equal to the value "void", then the local variable cr also defaults to the value "void". For instance, by referring to the FIG. 17A, the local variable cr takes the value void if the local variable csc corresponds to one of the ranges of cells 2019, or 2021, or 2024, or 2025 and corresponds to the respective ranges of cells 2008, or 2009, or 2010, or 2010, if the local variable csc corresponds to one of the ranges of cells 2023, or 2020, or 2018, or 2022.

The local variable csii ("current selection in instance") is a Boolean variable taking the values TRUE or FALSE if the selected range of cells csr is respectively comprised or not within a STI. For instance, by referring to the FIG. 17A, the local variable csii takes the value TRUE if the local variable csr corresponds to one of the ranges of cells 2018, or 2019, or 2020, or 2021, and the value FALSE if the local variable csr corresponds to one of the ranges of cells 2022, or 2023, or 2024, or 2025.

The local variable ccii ("current cell in instance") is a Boolean variable taking the values TRUE or FALSE if the currently selected cell csc is respectively comprised or not within a STI. For instance, by referring to the FIG. 17A, the local variable ccii takes the value TRUE if the local variable csc corresponds to one of the ranges of cells 2018, or 2019, or 2020, or 2021, or 2023, or 2025, and the value FALSE if the local variable csc corresponds to one of the ranges of cells 2022, or 2024.

The local variable csib ("current selection in body") is a Boolean variable taking the values TRUE or FALSE if the selected range of cells csr is respectively comprised or not within the body part of a STI. For instance, by referring to the FIG. 17A, the local variable csib takes the value TRUE if the local variable csr corresponds to one of the ranges of cells 2018, or 2019, and the value FALSE if the local variable csr corresponds to one of the ranges of cells 2020, or 2021, or 2022, or 2023, or 2024, or 2025.

The local variable RSTIDM_mode is initialized with the value "del_rec_inst".

At step 1844, a test is performed to determine if the local variable rir is void or not. If it is the case, then control is given to step 1845; otherwise control is given to step 1846.

At step 1845, the STI Deletion Manager command is invoked (as a sub-routine). When this command completes and returns control to the current process, the control is given to the initial step 1841 for processing any future RSTI Deletion Manager command.

At step 1846, a test is performed to determine if the cell represented by the local variable csc is part of the range of cell represented by the local variable rir. If it is the case, then control is given to step 1848; otherwise control is given to step 1847.

At step 1847, the conventional deletion method available in existing electronic spreadsheet environments is followed, after having disabled any deletion mode that could pollute the RSTI range rir. These polluting deletion modes are identified as follows:

If the range of cells csr shares some rows with the range of cells rir, then the conventional row deletion mode is disabled.

If the range of cells csr shares some columns with the range of cells rir, then the conventional column deletion mode is disabled.

If the range of cells csr shares some cells with the range of cells rir, then the conventional cell content deletion mode is disabled.

Then control is given to the initial step 1841 for processing any future RSTI Deletion Manager command.

At step 1848, the RSTI Deletion Manager dialog box 1940 is displayed on the display device 106, according to the values of some local variables.

The text box 1950 is filled with the value of the local variable RST_name.

If the local variable RSTIDM_mode takes the respective values "del_rec_inst", or "del_cont", or "del_elem", or "del_inst_IN", or "del_elem_IN", or "del_select_IN", then the option button 1944, or 1945, or 1946, or 1947, or 1948, or 1949 is filled with a black point whereas the other options buttons belonging to the dialog box 1940 are kept void.

If the local variable ccirb is equal to TRUE, then the option button 1945 is enabled, so that any future click on it with the pointing device 105 will be recognized as a valid event. If the local variable ccirb is equal to FALSE, then the option button 1945 is disabled, so that any future click on it with the pointing device 105 will not be recognized as a valid event.

If the local variable csib is equal to TRUE, then the option button 1946 is enabled, so that any future click on it with the pointing device 105 will be recognized as a valid event. If the local variable csib is equal to FALSE, then the option button 1946 is disabled, so that any future click on it with the pointing device 105 will not be recognized as a valid event.

If the local variable csii is equal to TRUE, then the option buttons 1948 and 1949 are enabled, so that any future click on them with the pointing device 105 will be recognized as a valid event. If the local variable csii is equal to FALSE, then the option buttons 1948 and 1949 are disabled, so that any future click on them with the pointing device 105 will not be recognized as a valid event.

If the local variable ccii is equal to TRUE, then the option button 1947 is enabled, so that any future click on it with the pointing device 105 will be recognized as a valid event. If the local variable ccii is equal to FALSE, then the option button 1947 is disabled, so that any future click on it with the pointing device 105 will not be recognized as a valid event.

At step 1849, the method is waiting for any user action on the RSTI Deletion Manager dialog box 1940. Such user action is typically resulting from a click with the pointing device 105, but take other similar forms such as, but not limited to a specific combination of keys on the keyboard 104, or any other similar means not further specified here.

At step 1850, a user action on the RSTI Deletion Manager dialog box 1940 is detected.

If the user action is a click with the pointing device 105 on one of the enabled option buttons 1944, or 1945, or 1946, or 1947, or 1948, or 1949, then control is given to step 1851.

If the user action is a click with the pointing device 105 on the "Delete" push-button 1942, then control is given to step 1853.

If the user action is a click with the pointing device 105 on the "Cancel" push button 1943, or on the closing-window push-button 1941, then control is given to step 1852.

At step 1851, the local variable RSTIDM_mode is updated, according to the enabled option button clicked on by the user at step 1850:

If the user has clicked on the option button 1944, then the local variable RSTIDM_mode takes the value "del_rec_inst".

If the user has clicked on the option button 1945, then the local variable RSTIDM_mode takes the value "del_cont".

If the user has clicked on the option button 1946, then the local variable RSTIDM_mode takes the value "del_elem".

If the user has clicked on the option button 1947, then the local variable RSTIDM_mode takes the value "del_inst_IN".

If the user has clicked on the option button 1948, then the local variable RSTIDM_mode takes the value "del_elem_IN".

If the user has clicked on the option button 1949, then the local variable RSTIDM_mode takes the value "del_select_IN".

Then control is given to step 1848.

At step 1852, the RSTI Deletion Manager dialog box 1940 is closed on the display device 106, and then control is given to the initial step 1841 for processing any future RSTI Deletion Manager command.

At step 1853, a test is performed to check if the local variable RSTIDM_mode takes the value "del_rec_inst". If it is the case, then control is given to step 1854; otherwise control is given to step 1855.

At step 1854, the current record cRSTITr 2261 of the RSTI Table RSTIT 2260 is removed from this table RSTIT 2260, and the associated RSTI Descriptor Table RSTIDT 2270 pointed by the "RSTIDT Ptr" field 2265 of the record cRSTITr 2261 is deleted. Then the RSTT table 2220 is scanned to identify the record 2221 whose "Name" field 2222 is found equal to the local variable RST_name. Once found, the "REFERENCED" attribute 2229 within the "Type" field 2227 of this record 2221 is updated by dividing the "INSTANCE REFERENCE" subfield 2229c by 2 (two). Then control is given to step 1852.

At step 1855, a test is performed to check if the local variable RSTIDM_mode takes the value "del_cont". If it is the case, then control is given to step 1856; otherwise control is given to step 1858.

At step 1856, the container row cr is deleted from the current sheet by removing the rows it occupies.

At step 1857, the STIT table 750 is updated by removing all the records 751 with an "Address" field 752 which were pointing within the container row cr. The RSTIDT table cRSTIDT 2270 is then updated by removing the record 2271 corresponding to the deleted container row cr. Then control is given to step 1852.

At step 1858, a test is performed to check if the local variable RSTIDM_mode takes the value "del_elem". If it is the case, then control is given to step 1859; otherwise control is given to step 1861.

At step 1859, the elements belonging to the rows of the currently selected range of cells csr are removed from the STI ir. For this purpose is first selected the range of cells constituted by the same columns as the range of cells ir, and whose rows are located between the bottom row of the range of cells csr (excluded) and the bottom row of the range of cells ir (included). Then this selected range of cells is moved upwards, row after row, up to the position where its top row occupies the same row as the top row of the former range of cells csr. For each step of this move, a row within the range of cells csr ir removed, so that at the end all the rows of the range of cells csr are removed. If the result of this element removal is to leave one empty row or a plurality of empty rows at the bottom of the container row range of cells cr, then this empty row or this plurality of empty rows is removed.

At step 1860, the STI ir is updated by restoring in all the remaining elements the "OUT" cells to prevent any corruption due to the element deletion. The followed method is the same as the one described at step 1836 of the STI Deletion Manager command, and is not repeated here. Then the STIT table 750 is changed by updating the record 751 corresponding to the STI ir the "Address" field 752 is updated to reflect the new range address of ir; and the "Element #" field 754 is updated to reflect the new number of elements within the STI ir. Then the RSTIDT table cRSTIDT 2270 is updated by modifying in the record 2271 the attributes corresponding to the modified STI ir and (potentially) modified container row cr. Within the cell 2280 associated with the STI ir, the attribute "STI_row" 2279 is updated to reflect the new number of rows within the STI ir, the attribute "Container_row" 2281 is updated to reflect the new number of container rows, and the "Container_range" attribute 2276 is updated to reflect the new address of the container comprising the STI ir. If one row or a plurality of rows were removed at the end of the step 1859, then the other cells 2280 of the same record 2271 are also updated by modifying similarly the attributes "Container_row 2281 and "Container_range" 2276. Then control is given to step 1852.

At step 1861, a test is performed to check if the local variable RSTIDM_mode takes the value "del_elem_IN". If it is the case, then control is given to step 1862; otherwise control is given to step 1863.

At step 1862, the currently selected range of cells csr is updated in order to align its columns with those occupied by the STI ir. Then control is given to step 1865.

At step 1863, a test is performed to check if the local variable RSTIDM_mode takes the value "del_inst_IN". If it is the case, then control is given to step 1864; otherwise control is given to step 1865.

At step 1864, the currently selected range of cells csr is set equal to the local variable range of cells ir, so that ir becomes the new currently selected range of cells.

At step 1865, the "IN" cells belonging to the currently selected range of cells csr are cleared. The followed method is the same as the one described at step 1826 of the STI Deletion Manager command, and is not repeated here. Then control is given to step 1852.

E9. RST Instanciator Method

Figure 18A:
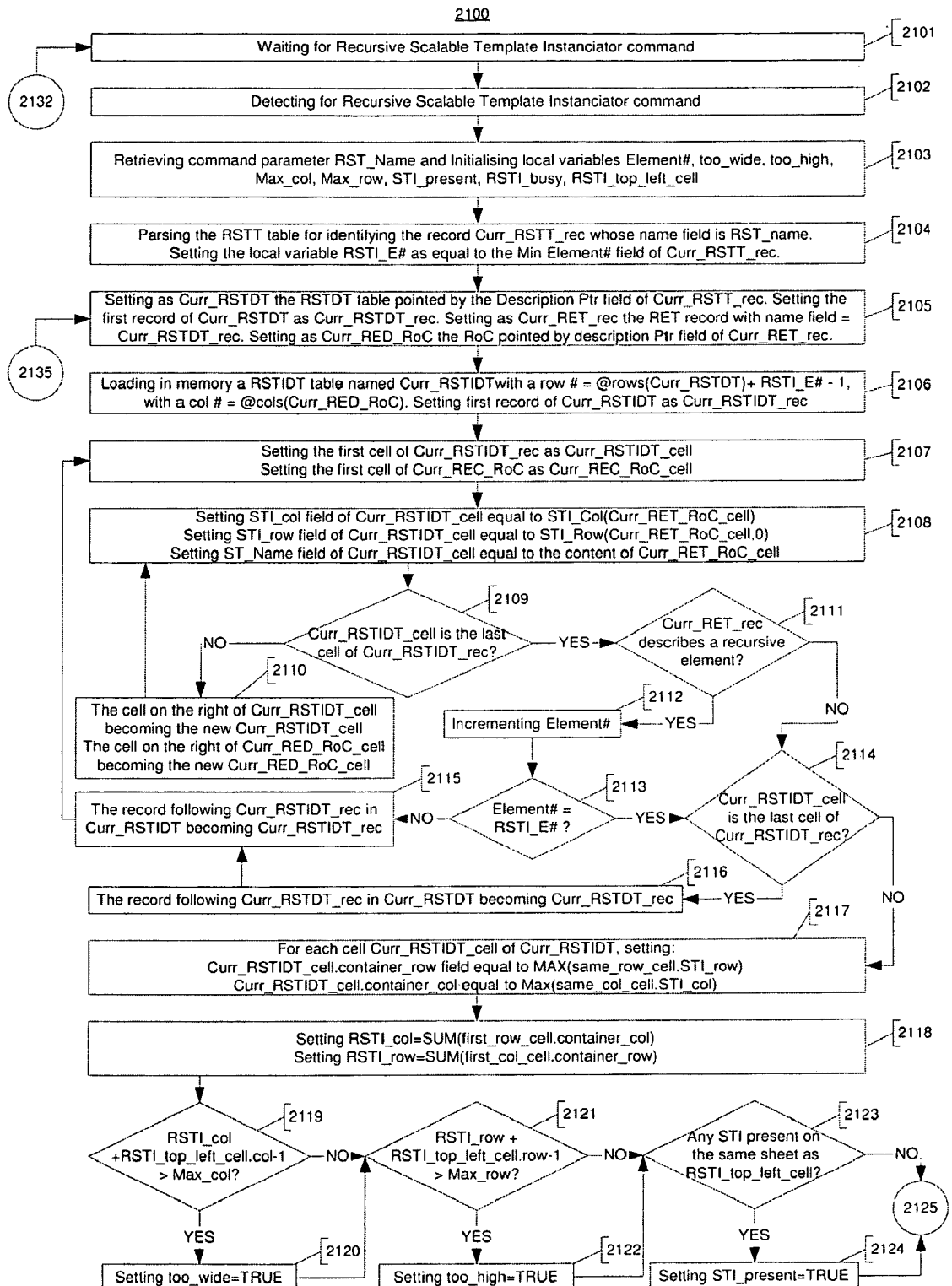
FIGS. 18A and 18B constitute a flow chart illustrating a preferred method for creating RSTI's according to a preferred embodiment of the present invention.
Figure 18B:
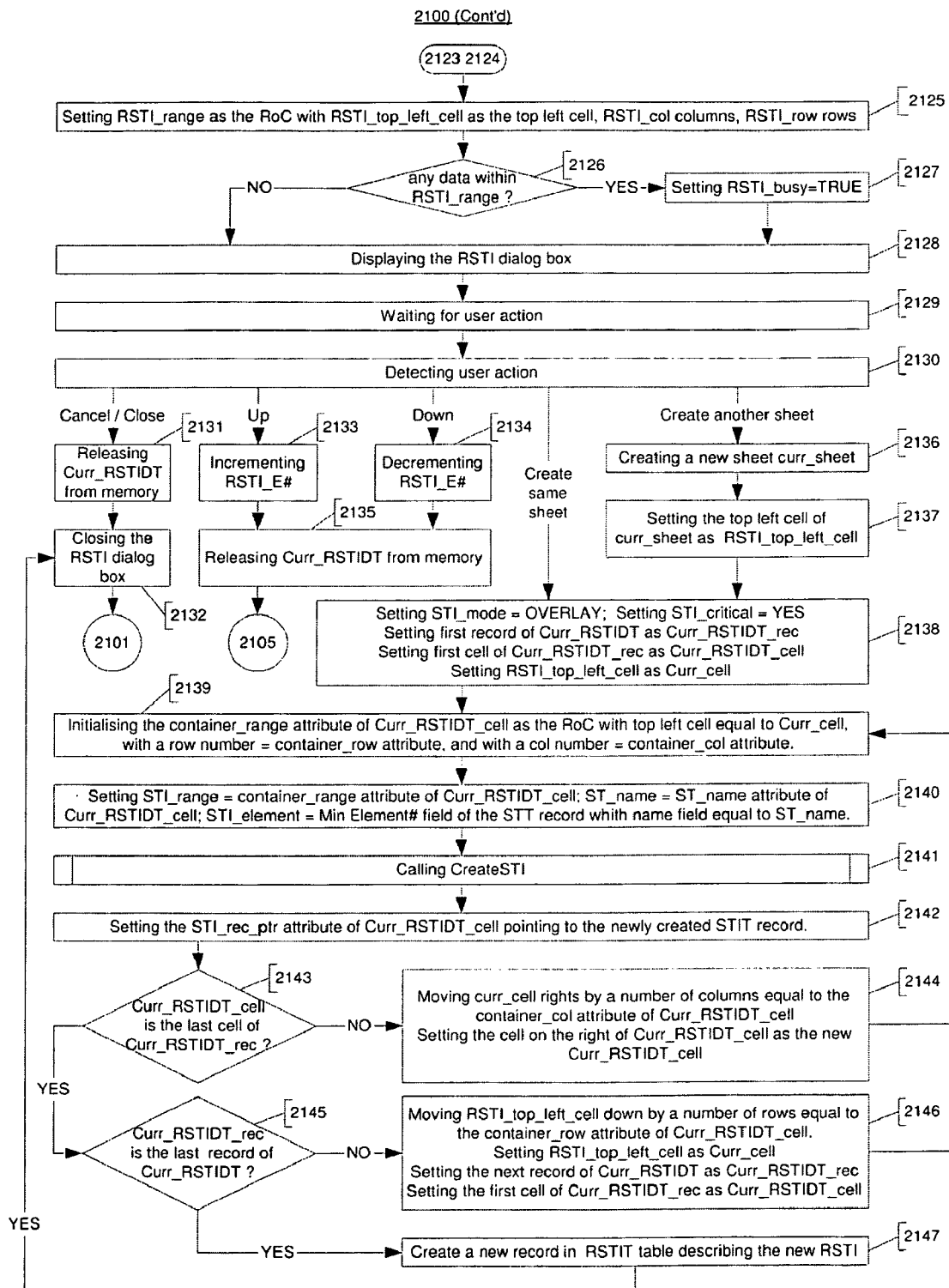

The method for instanciating a RST used in the preferred embodiment of the present invention is summarized in flowchart 2100 of FIGS. 18A and 18B. This method can be seen as the processing of the ST Instanciator command.

At step 2101, the method is in its default state, waiting for an event to initiate the process.

At step 2102, the RST Instanciator command is detected, as a result of a user action. This action can be for instance a specific combination of keys on the keyboard 104, or the click of the pointing device 105 on a specific button, or any other similar means no further specified here.

At step 2103, the command parameter is retrieved and some local variables are initialized:

The command parameter is recorded in the RST_Name variable.

The local variable Element# is initialized with the value 0 (zero).

The local variable too_wide is initialized with the default value FALSE.

The local variable too_high is initialized with the default value FALSE.

The local variable Max_col is initialized with the maximum number of available columns on a sheet.

If the local variable Max_row is initialized with the maximum number of available rows on a sheet.

The local variable STI_present is initialized with the default value FALSE.

The local variable RSTI_busy is initialized with the default value FALSE.

The local variable RSTI_top_left_cell is initialized as being the currently selected cell.

At step 2104, the RSTT table 2220 is parsed to identify the record 2221 (identified by the local variable Curr_RSTT_rec) whose "Name" field 2222 is equal to the command parameter RST_Name. Then the local variable RSTI_E# is set equal to the value of the "Min Element#" field 2225 of this record Curr_RSTT rec 2221.

At step 2105, the local variable Curr_RSTDT is set equal to the RSTDT table 2250 pointed by the "Description Ptr" field 2224 of the record Curr_RSTT_rec 2221. Then the local variable Curr_RSTDT_rec is set equal to the first single-cell record 2251 of the Curr_RSTDT table 2250. Then the local variable Curr_RET_rec is set equal to the record 2211 of the RET table 2210, with a "Name" field 2212 equal to the local variable Curr_RSTDT_rec. Then the local variable Curr_RED_RoC is set equal to the range of cells pointed by the "Description Ptr" field 2214 of the record Curr_RET_rec 2211.

At step 2106, a RSTIDT table 2270 is loaded in memory and named through the local variable Curr_RSTIDT This table has a number of rows equal to the numbers of rows of the Curr_RSTDT table 2250, incremented by the value of the local varaibel RSTI_E# and decremented by 1 (one). This table has a number of columns equal to the number of columns of the Curr_RED_RoC range of cells. Then the local variable Curr_RSTIDT_rec is initialized as the first record 2271 of the Curr_RSTIDT table 2270.

At step 2107, the local variable Curr_RSTIDT_cell is initialized as the first cell 2280 of the Curr_RSTIDT_rec 2271. Then the local variable Curr_REC_Roc_cell is initialized as the first cell of the Curr_REC_RoC range of cells.

At step 2108, the "STI_col" field 2278 of the Curr_RSTIDT_cell 2280 is set equal to the value returned by the function STI_col when called with the unique parameter equal to the value of the local variable Curr_RET_RoC_cell. Then the "STI_row" field 2279 of the Curr_RSTIDT_cell 2280 is set equal to the value returned by the function STI_row when called with the two parameters respectively equal to the value of the local variable Curr_RET_RoC_cell and to 0 (zero). Then the "ST_name" field 2280 of the Curr_RSTIDT_cell 2280 is set equal to the value of the local variable Curr_RET_RoC_cell.

At step 2109, a test is performed to check if the cell represented by the local variable Curr_RSTIDT_cell 2280 is the last cell of the record represented by the local variable Curr_RSTIDT_rec 2271. If it is the case, then control is given to step 2111; otherwise control is given to step 2110.

At step 2110, the cell located on the right of the cell represented by the local variable Curr_RSTIDT_cell 2280 becomes the new Curr_RSTIDT_cell 2280. Then the cell located on the right of the cell represented by the local variable Curr_RET_RoC_cell becomes the new Curr_RET_RoC_cell. Then control is given to step 2108.

At step 2111, a test is performed to check if the record represented by the local variable Curr_RET_rec 2211 describes a RE. This can be determined if the "META" attribute 2218 of the "Type" field 2217 of the Curr_RET_ rec record 2211 is equal to the value "NO". If it is the case, then control is given to step 2112; otherwise control is given to step 2114.

At step 2112, the local variable Element# is incremented by 1 (one).

At step 2113, a test is performed to determine if the local variable Element# is equal to the local variable RSTI_E#. If it is the case, then control is given to step 2114; otherwise control is given to step 2115.

At step 2114, a test is performed to check if the cell represented by the local variable Curr_RSTIDT_cell 2280 is the last cell of the record represented by the local variable Curr_RSTIDT_rec 2271. If it is the case, then control is given to step 2116; otherwise control is given to step 2117.

At step 2115, the record following the Curr_RSTIDT_rec record 2271 in the Curr_RSTIDT table 2270 becomes the new Curr_RSTIDT_rec record 2271. Then control is given to step 2107.

At step 2116, the record following the Curr_RSTDT_rec record in the Curr_RSTDT table 2250 becomes the new Curr_RSTDT_rec. Then control is given to step 2115.

At step 2117, for each cell Curr_RSTIDT_cell 2280 belonging to the Curr_RSTIDT table 2270, the "container_row" attribute 2281 is set equal to the maximum value of the "STI_row" attribute 2279 of the cells Same_row_cell located within the Curr_RSTIDT table 2270 on the same row as Curr_RSTIDT_cell. Then for each cell Curr_RSTIDT_cell 2280 belonging to the Curr_RSTIDT table 2270, the "container_col" attribute 2277 is set equal to the maximum value of the "STI_col" attribute 2278 of the cells Same_col_cell located within the Curr_RSTIDT table 2270 on the same column as Curr_RSTIDT_cell.

At step 2118, the local variable RSTI_col is set equal to the sum of the "container_col" attributes 2277 of the cells belonging to the first row of the Curr_RSTIDT table 2270. Then the local variable RSTI_row is set equal to the sum of the "container_row" attributes 2281 of the cells belonging to the first column of the Curr_RSTIDT table 2270.

At step 2119, a test is performed to determine if the sum of the local variable RSTI_col and of the column index of the individual cell RSTI_top_left_cell decremented by 1 (one) is strictly greater than the local variable Max_coL If it is the case, then control is given to step 2120; otherwise control is given to step 2121.

At step 2120, the local variable too_wide is set equal to the value TRUE.

At step 2121, a test is performed to determine if the sum of the local variable RSTI_row and of the row index of the individual cell RSTI_top_left_cell decremented by 1 (one) is strictly greater than the local variable Max_row. If it is the case, then control is given to step 2122; otherwise control is given to step 2123.

At step 2122, the local variable too_high is set equal to the value TRUE.

At step 2123, a test is performed to determine if there is any existing STI present on the same sheet as the individual cell RSTI_top_left_cell. This test can simply be done by parsing the STIT table 750 for identifying any record 751 with an "Address" field 752 pointing to the same sheet as the individual cell RSTI_top_left_cell. If it is the case, then control is given to step 2124; otherwise control is given to step 2125.

At step 2124, the local variable STI_present is set equal to the value TRUE.

At step 2125, the local variable RSTI_range is initialized as being the range of cells with RSTI_top_left_cell as the top left cell, with a number of rows equal to the value of the local variable RSTI_row, and with a number of columns equal to the value of the local variable RSTI_col At step 2126, a test is performed to check if there is any data present within the range of cells RSTI_range. If it is the case, then control is given to step 2127; otherwise control is given to step 2128.

At step 2127, the local variable RSTI_busy is set equal to the value TRUE.

At step 2128, the RST Instanciator dialog box 2300 is displayed on the display device 106. Within this dialog box 2300, the text field 2302 is filled with the value of the local variable RST_name, the text field 2311 is filled with the value of the local variable RSTI_E#, the text field 2304 is filled with the value of the local variable too_wide, the text field 2305 is filled with the value of the local variable too_high, the text field 2306 is filled with the value of the local variable STI_present, the text field 2307 is filled with the value of the local variable RSTI_busy. The "Create Instance" push-button 2310 is enabled if and only if the three local variables tool_wide, too_high and STI_present take the same value FALSE. The "Create instance in a new sheet" push-button 2309 is enabled if and only if the two local variables too_wide and too_high take the same value FALSE.

At step 2129, the method is waiting for any user action on the RST Instanciator dialog box 2300. Such user action is typically resulting from a click with the pointing device 105, but take other similar forms such as, but not limited to a specific combination of keys on the keyboard 104, or any other similar means not further specified here.

At step 2130, a user action on the RST Instanciator dialog box 2300 is detected.

If the user action is a click with the pointing device 105 on one "Up" arrow of the spin-button 2303, then control is given to step 2133.

If the user action is a click with the pointing device 105 on one "Down" arrow of the spin-button 2303, then control is given to step 2134.

If the user action is a click with the pointing device 105 on the "Create instance" push-button 2310, then control is given to step 2138.

If the user action is a click with the pointing device 105 on the "Create instance in a new sheet" push-button 2309, then control is given to step 2136.

If the user action is a click with the pointing device 105 on the "Cancel" push button 2308, or on the closing-window push-button 2301, then control is given to step 2131.

At step 2131, the range of cells Curr_RSTIDT is released from memory.

At step 2132, the RST Instanciator dialog box 2300 is closed on the display device 106 and then control is given back to the initial step 2101 for processing any future RST Instanciator command.

At step 2133, the local variable RSTI_E# is incremented by 1 (one).

At step 2134, the local variable RSTI_E# is decremented by 1 (one).

At step 2135, the range of cells Curr_RSTIDT is released from memory, and then control is given to the step 2105.

At step 2136, a new sheet is created and named curr_sheet.

At step 2137, the top left cell of the sheet curr_sheet becomes the new individual cell RSTI_top_left_cell.

At step 2138, the local variable STI_mode is initialized with the value OVERLAY. Then the local variable STI_critical is initialized with the value YES. Then the local variable Curr_RSTIDT_rec is initialized as being the first record 2271 of the Curr_RSTIDT table 2270. Then the local variable Curr_RSTIDT_cell is initialized as being the first cell 2280 of the record Curr_RSTIDT_rec 2271. Then the local variable Curr_cell is initialized as being equal to RSTI_top_left_cell.

At step 2139, the "container_range" attribute 2276 of the Curr_RSTIDT_cell 2280 is initialized as the range of cell having as the top left cell the individual cell Curr_cell, having a number of rows equal to the value of the "container_row" attribute 2281, and having a number of columns equal to the value of the "container_col" attribute 2277.

At step 2140, the local variable STI_range is set equal to the "container_range" attribute 2276 of the Curr_RSTIDT_cell 2280. Then the local variable ST_name is set equal to the "ST_name" attribute 2280 of the Curr_RSTIDT_cell 2280. Then the local variable STI_element is set equal to the "Min Element#" field 2225 of the record 721 of the STT table 720 with a "Name" field 722 equal to ST_Name.

At step 2141, the CreateSTI command is invoked (as a sub-routine). When this command completes and returns control to the current process, the control is given to the next step 2142.

At step 2142, the "STIT_rec_ptr" attribute 2282 of the Curr_RSTIDT_cell 2280 is set as pointing to the STIT record 751 that has just been created during the previous step 2141.

At step 2143, a test is performed to check if the cell represented by the local variable Curr_RSTIDT_cell 2280 is the last cell of the record represented by the local variable Curr_RSTIDT_rec 2271. If it is the case, then control is given to stop 2143; otherwise control is given to step 2144.

At step 2144, the individual cell curr_cell is moved to the right by a number of columns equal to the value of the "container_col" attribute 2277 of Curr_RSTIDT_cell 2280. Then the cell located on the right of the individual cell Curr_RSTIDT_cell 2280 becomes the new Curr_RSTIDT_cell 2280.

At step 2145, a test is performed to check if the record represented by the local variable Curr_RSTIDT_rec 2271 is the last record of the RSTIDT table represented by the local variable Curr_RSTIDT 2270. If it is the case, then control is given to step 2147; otherwise control is given to step 2146.

At step 2146, the individual cell RSTI_top_left_cell is moved down by a number of rows equal to the value of the "container_row" attribute 2281 of the Curr_RSTIDT_cell 2280. Then the individual cell curr_cell is set equal to the individual cell RSTI_top_left_cell. Then the record 2271 following Curr_RSTIDT_rec in Curr_RSTIDT 2270 becomes the new record Curr_RSTIDT_rec 2271. Then the first cell of Curr_RSTIDT_rec 2271 becomes the new individual cell Curr_RSTIDT_cell 2280.

At step 2147, a new record 2261 is created in the RSTIT table 2260 for describing the RSTI that has just been created. The "Address" field 2262 is filled with the address of the rir range of cell 2001. The "RST" field 2263 is filled with the local variable RST_Name. The "Element #" field 2264 is filled with the local variable Element#. The "RSTIDT Ptr" field 2265 is filled with the local variable Curr_RSTIDT. The "Header Size" field 2266 is filled with the number of rows of the container rows constituting the RSTI header 2002. The "Footer Size" field 2267 is filled with the number of rows of the container rows constituting the RSTI footer 2004. Then the RSTT table 2220 is scanned to identify the record 2221 whose "Name" field 2222 is found equal to the local variable RST_name. Once found, the "REFERENCED" attribute 2229 within the "Type" field 2227 of this record 2221 is updated by multiplying the "INSTANCE REFERENCE" subfield 2229c by 2 (two). Then control is given to step 2132.

E10. RE Editor Method

Figure 20C:
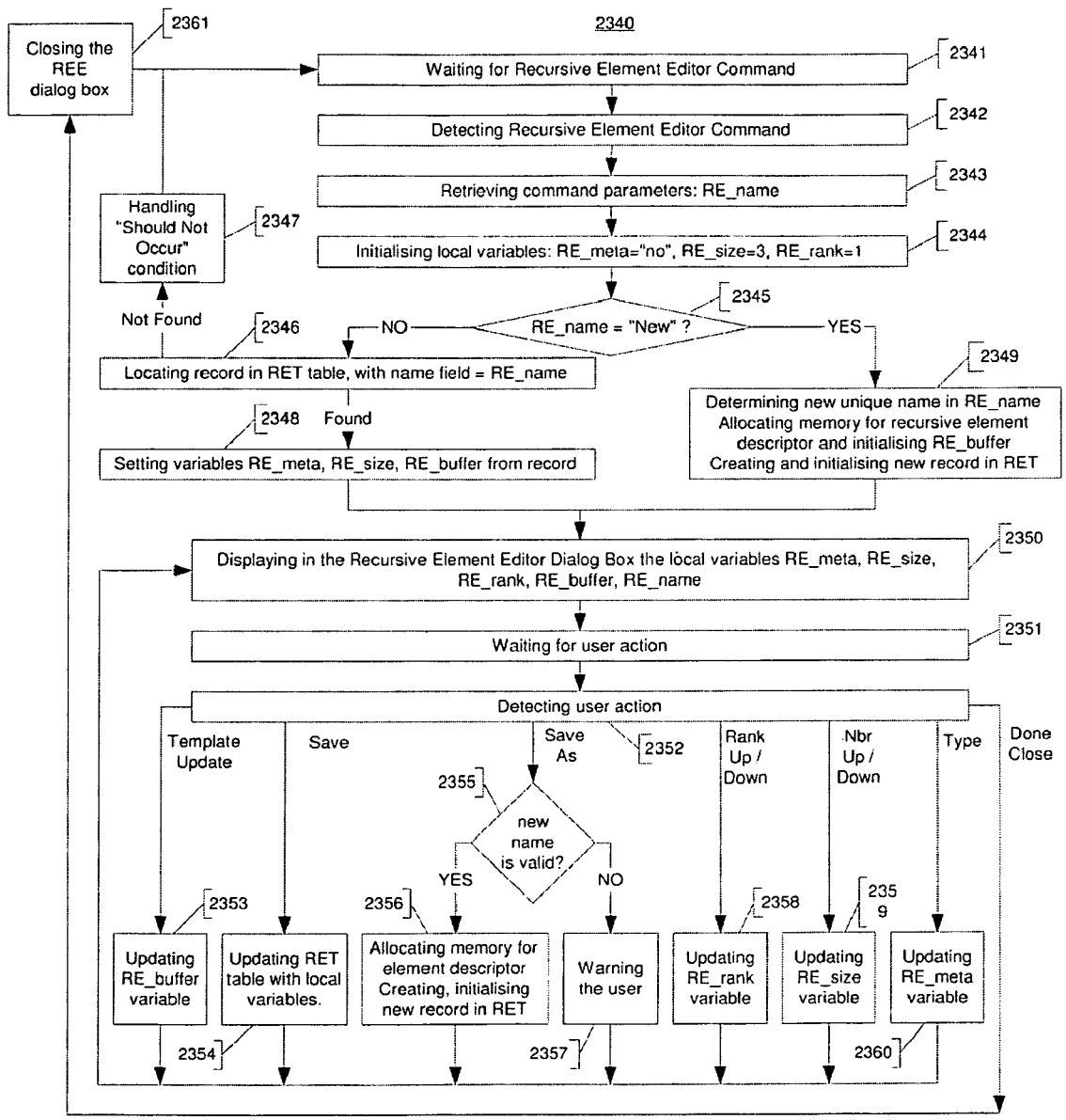
FIG. 20C is a flow chart illustrating a preferred method for editing RE's in RST's according to a preferred embodiment of the present invention.

The method for creating or updating RE's or meta-elements used in the preferred embodiment of the present invention is summarized in flowchart 2340 of FIG. 20C. This method can be seen as the processing of the RE Editor command.

At step 2341, the method is in its default state, waiting for an event to initiate the process.

At step 2342, the RE Editor command is detected, as a result of an user action. This action can be for instance:
a specific combination of key on the keyboard 104, or
the click of the pointing device 105 on a specific button, or
any other similar means not further specified here.

At step 2343, the parameter of the command is retrieved. It corresponds to a mandatory parameter RE_name which can either take a reserved value "NEW" or another value corresponding to a character string name, as found in the "Name" field 2232 of a record 2231 within the RSTMT table 2230. This parameter is recorded as a local variable.

At step 2344, some local variables are initialized: the local variable RE_meta is set to the value "NO", the local variable RE_size is set to the value 3 (three), and the local variable RE_rank is set to the value 1 (one).

At step 2345, a test is performed to determine the value taken by the local variable RE_name. If found equal to "NEW", then control is given to step 2349; otherwise control is given to step 2346.

At step 2346, the RET table 2210 is looked up to locate a record 2211 whose "Name" field 2212 is found equal to the value taken by the local variable RE_name. If such a record is found, then control is given to step 2348; otherwise control is given to step 2347.

At step 2347, an exception handler is invoked to treat this "should not occur" condition. Such operation is implementation dependent and can take different forms such as the display on the display device 106 of an error message pop-up window. Then control is given to step 2341.

At step 2348,
the local variable RE_meta is set to the value "YES" or "NO" according to the value of the "META" attribute 2218 within the "Type" field 2217 of the record 2211 found at step 2346,
the local variable RE_size is set to the value found in the "Column #" field 2216 of the record 2211 found at step 2346, and
the memory location pointed by the "Description Ptr" field 2214 of the record 2211 found at step 2346 is copied onto a temporary buffer recorded as the local variable RE_buffer.

Then control is given to step 2350.

At step 2349, a new name for the newly created RE is determined, according to a name string taking in a preferred embodiment of the present invention the form "New XX" where XX corresponds to a counter value ensuring the name uniqueness with respect to all the names previously defined and recorded in the "Name" fields 702, 712, 722, 2212 and 2222 found in the respective records 701, 711, 721, 2211 and 2221 of the respective tables EFT 700, EPT 710, STT 720, RET 2210 and RSST 2220. Any other similar conventional means could be used instead without departing from the spirit of the invention, as long as the uniqueness of the newly created name is ensured.

Then the new name is recorded in the local variable RE_name. Then memory space is allocated within the main memory 102 to later record the illustrative range of cells for the RE or RME. This allocated memory, recorded as the local variable RE_buffer is part of the memory space corresponding to the currently opened electronic spreadsheet file.

Then a new record 2211 is created in the RET table 2210, and this new record 2211 is initialized as follows:
the "Name" field 2212 is set to the value of the local variable RE_name;
the "Last Change Date" field 2213 is set to the system time reference, as known by the central processor 101;
the "Description Ptr" field 2214 is set to the memory location RE_buffer which has just been allocated;
the "Row #" field 2215 is set to the value 1 (as in the preferred embodiment of the present invention the RST's are managed in a 2D environment; this field would carry the number of defined rows for the created RE in a 3D environment);
the "Column #" field 2216 is set to the value of the local variable RE_size;
the "Type" field 2217 is set as follows: the attribute "META" 2218 is set equal to the value of the local variable RE_meta, and the attribute "REFERENCED" 2219 is initialized as follows:

The "OWN REFERENCE" (OR) subfield 2219a is initialized with a prime number not yet assigned to any other OR subfield 709a, or 719a, or 729a, or 780a, or 2219a, or 2229a, or 2240a. Various conventional techniques can be used for identifying a prime number, and are not further detained here.

The "FILIATION REFERENCE" (FR) subfield 2219b is initialized according to the following formula, where the F set corresponds to the set of ST's constituting the new RE or meta-element, according to the structure recorded in the "Description Ptr" field 2214:

$$FR = \Pi_{i \in F} OR_i \times LCM(\{FR_i\})_{i \in F}$$

The "INSTANCE REFERENCE" (IR) subfield 2219c is initialized with the value 1 (one).

The "REFERENCED OBJECT" (RO) subfield 2219d is initialized with the following formula, where the P set corresponds to the set of RST's:

$$RO = \text{"YES"} \text{ if } LCM(\{FR_i\})_{i \in P} \text{ Mod } OR = 0;$$

$$RO = \text{"NO"} \text{ otherwise.}$$

The "SELECTED CHILDREN" (SC) subfield 2219e is initialized with the following formula, where the S set corresponds to the set of selected objects (having the "SELECTED" attribute 2242 equal to the value "YES" in the RSTMT table 2230):

$$SC = \text{"YES"} \text{ if } LCM(\{FR_i\})_{i \in S} \text{ Mod } OR = 0 \#_{OR}\# RSTE\_name \in S;$$

$$SC = \text{"NO"} \text{ otherwise.}$$

Then control is given to step 2350.

At step 2350, the RE Editor Dialog Box 2321 is displayed on the display device 106.

The label box 2324 is initialized with the value of the local variable RE_name.

The top option button 2331 (respectively bottom option button 2330) is filled with a black point if the local variable RE_meta is found equal to "NO" (respectively "YES").

The text box 2326 is filled with the value of the local variable RE_size.

The push-button "Save" 2333 is enabled if the local variable RE_size is found equal to the "Column #" field 2216 of the current record 2211, or if the attribute "REFERENCED" 2219 within the "Type" field 2217 of this same record 2211 is found with the subfield "REFERENCED OBJECT" 2219d (RO) equal to "NO", so that any future click with the pointing device 105 on this push-button "Save" 2333 will be recognized as a valid event.

The push-button "Save" 2333 is disabled otherwise (local variable RE_size is not found equal to the "Column #" field 2216 of the current record 2211, and the attribute "REFERENCED" 2219 within the "Type" field 2217 of this same record 2211 is found with the subfield "REFERENCED OBJECT" 2219d (RO) equal to "YES"), so that any future click with the pointing device 105 on this push-button "Save" 2333 will not be recognized as an event.

The text box 2335 is initialized with the value of the local variable RE_rank.

The list box 2334 is initialized with the content of the cell belonging to RE_buffer and whose offset is equal to RE_rank. The list of names available within this list box 2334 (by clicking on the spin button 2328) is constituted by the names of the ST's recorded in the STT table 720.

At step 2351, the method is waiting for any user action on the RE Editor Dialog Box 2321. Such user action is typically resulting from a click with the pointing device 105, but take other similar forms such as, but not limited to a specific combination of key on the keyboard 104, or any other similar means not further specified here.

At step 2352, a user action on the RE Editor Dialog Box 2321 is detected.

If the user action is a click on the spin button 2328, to select a ST name, then control is given to step 2353;

if the user action is a click on the push-button "Save" 2333, then control is given to step 2354;

if the user action is a click on the push-button "Save As" 2332, then control is given to step 2355;

if the user action is a click on the spin button 2329, then control is given to step 2358;

if the user action is a click on the spin button 2327, then control is given to step 2359;

if the user action is a click on one of the two option buttons 2330 or 2331, then control is given to step 2360;

if the user action is a click on the push-button "Done" 2323, or on the closing-window push-button 2322, then control is given to step 2361.

At step 2353, the local variable RE_buffer is updated by setting equal to the content of the list box 2334 the content of the cell with offset equal to the value of the local variable RE_rank. Then control is given to step 2350.

At step 2354, the RET table 2210 is updated and saved as part of the electronic spreadsheet file by refreshing the record 2211 whose "Name" field 2212 is equal to the local variable RE_name. For this purpose, the "Last Change Date" field 2213 is set to the system time reference, as known by the central processor 101;

the "Column #" field 2216 is set to the value of the local variable RE_size; and the "Type" field 2217 is set as follows: the attribute "META" 2218 is set equal to the value of the local variable RE_meta.

In addition the range of cells RE_buffer illustrating the current definition of the RE or meta-element is copied onto the memory location pointed by the "Description Ptr" field 2214. Then control is given to step 2350.

At step 2355, a test is performed on the value found in the text box 2325 to determine if it corresponds to a valid new name. The corresponding criteria are implementation dependent and may take different forms without departing from the spirit of the invention, as long as the new proposed name is a unique character string against all the already defined names recorded in the "Name" fields 702, 712, 722, 2212 and 2222. If validity and uniqueness are proven, then control is given to step 2356; otherwise control is given to step 2357.

At step 2356, memory space is allocated within the main memory 102 to later record the illustrative range of cells for the EF or MEF. This allocated memory is part of the memory space corresponding to the currently opened electronic spreadsheet file. Then a new record 2211 is created in the RET table 2210 which is saved as part of the electronic spreadsheet file, and this new record 2211 is initialized as follows:

the "Name" field 2212 is set to the value found in the text box 2325 and validated at step 2355;

the "Last Change Date" field 2213 is set to the system time reference, as known by the central processor 101;

the "Description Ptr" field 2214 is set to the memory location RE_buffer which has just been allocated;

the "Row #" field 2215 is set to the value 1 (as in the preferred embodiment of the present invention the RST's are managed in a 2D environment; this field would carry the number of defined rows for the created RE in a 3D environment);

the "Column #" field 2216 is set to the value of the local variable RE_size;

the "Type" field 2217 is set as follows: the attribute "META" 2218 is set equal to the value of the local variable RE_meta, and the attribute "REFERENCED" 2219 is initialized as follows:

The "OWN REFERENCE" (OR) subfield 2219a is initialized with a prime number not yet assigned to any other subfield 709a, or 719a, or 729a, or 780a, or 2219a, or 2229a, or 2240a. Various conventional techniques can be used for identifying a prime number, and are not further detailled here.

The "FILIATION REFERENCE" (FR) subfield 2219b is initialized according to the following formula, where the F set corresponds to the set of ST's constituting the new RE or meta-element, according to the structure recorded in the "Description Ptr" field 2214:

$$FR = \Pi_{i \in F} OR_i \times LCM(\{FR_i\})_{i \in F}$$

The "INSTANCE REFERENCE" (IR) subfield 2219c is initialized with the value 1 (one).

The "REFERENCED OBJECT" (RO) subfield 2219d is initialized with the following formula, where the P set corresponds to the set of RST's:

$$RO = \text{"YES"} \text{ if } LCM(\{FR_i\})_{i \in P} \text{ Mod } OR = 0;$$

$$RO = \text{"NO"} \text{ otherwise.}$$

The "SELECTED CHILDREN" (SC) subfield 2219e is initialized with the following formula, where the S set corresponds to the set of selected objects (having the "SELECTED" attribute 2242 equal to the value "YES" in the RSTMT table 2230):

$$SC = \text{"YES"} \text{ if } LCM(\{FR_i\})_{i \in S} \text{ Mod } OR = 0 \text{ \#}_{OR}\text{\# } RSTE\_name \in S,$$

$$SC = \text{"NO"} \text{ otherwise.}$$

Then control is given to step 2350.

At step 2357, a warning message notification is issued for informing the user that a valid and unique name must be specified in the text box 2325 prior to clicking on the "Save As" push-button 2332. This can typically be done by displaying on the display device 106 a warning message in a pop-up window, or in a status bar area, but any other similar means could be used instead, without departing from the spirit of the invention. Once the user has acknowledged this notification message through conventional means such as clicking with the pointing device 105 on an "OK" push-button present within a warning message pop-up window, or any other similar means without departing from the spirit of the invention, control is given to step 2350.

At step 2358, the local variable RE_rank is decremented by 1 (one) as long as it remains strictly positive if the user has clicked with the pointing device 106 on the down side of the spin button 2329, and the local variable RE_rank is incremented by 1 (one) as long as it remains lower than or equal to the value of the local variable RE_size, if the user has clicked with the pointing device 106 on the up side of the spin button 2329. Then control is given to step 2350.

At step 2359, the local variable RE_size is either incremented or decremented by 1 (one) according to the direction (up or down) specified by the pointing device 105 on the spin button 2327, and as long as it value remains positive and less than or equal to an upper limit set equal to 254 in a preferred embodiment of the present invention. Then control is given to step 2350.

At step 2360, the local variable RE_meta is updated, so that its value becomes "YES" (respectively "NO") if the bottom option button 2330 (respectively the top option button 2331) has been clicked on. Then control is given to step 2350.

At step 2361, the RE Editor Dialog Box 2321 is closed so that it disappears from the display device 106. Finally control is given back to the initial step 2341 for processing any future RE Editor command.

E11. STI Column/Row Counter Method

Figure 21A:
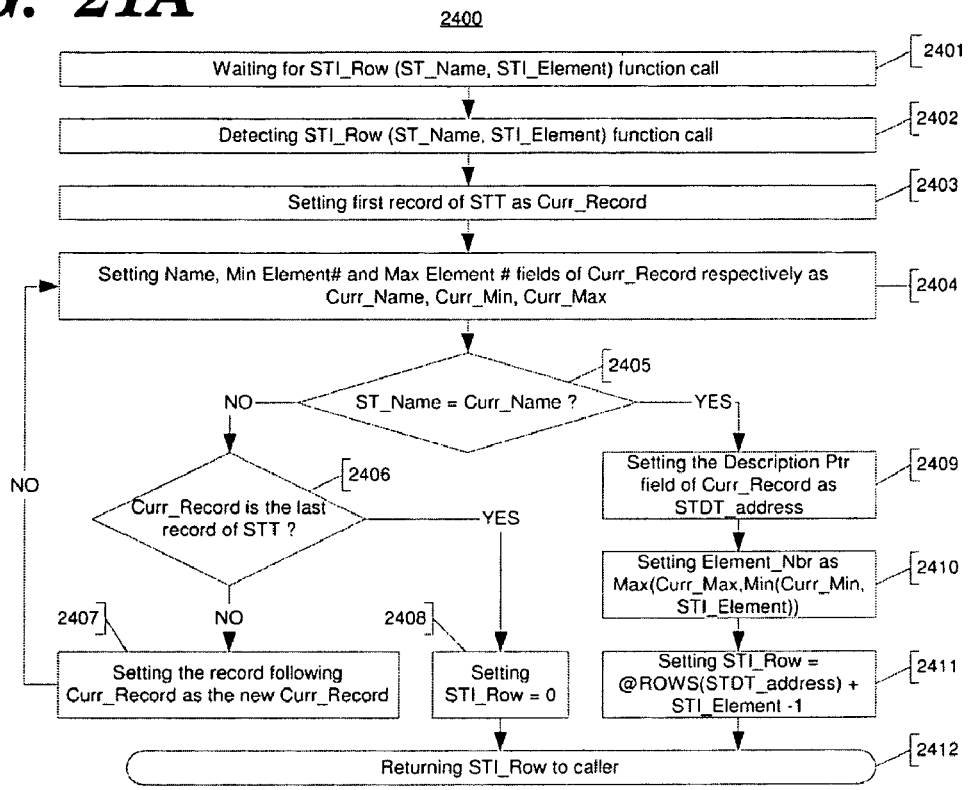
FIG. 21A is a flow chart illustrating a preferred method for computing the number of rows comprised in a STI according to a preferred embodiment of the present invention.
Figure 21B:
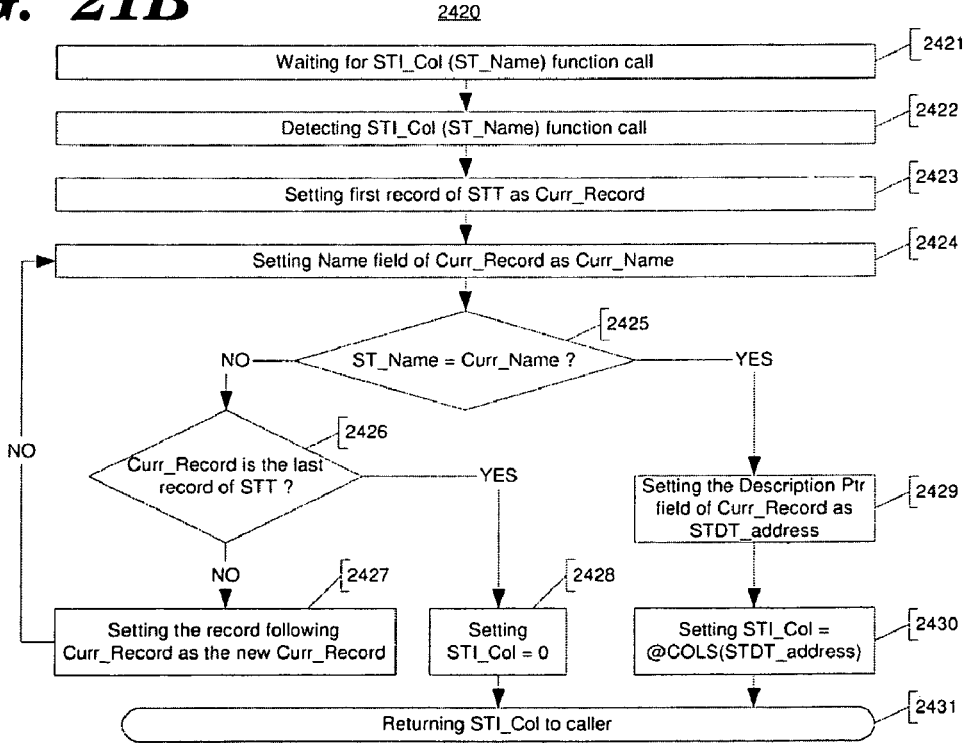
FIG. 21B is a flow chart illustrating a preferred method for computing the number of columns comprised in a STI according to a preferred embodiment of the present invention.

The method for counting the number of columns or rows within a STI used in the preferred embodiment of the present invention is summarized in flowcharts 2400 and 2420 of FIGS. 21A and 21B. These methods can be seen as the processing of the STI_Row and STI_col functions.

At step 2401, the first method is in its default state, waiting for a call to the STI_Row function.

At step 2402, the STI_Row function call is detected, as a result of a user action. The function is called with two parameters named ST_Name and STI_Element.

At step 2403, the first record 721 of the STT table 720 is set as Curr_Record.

At step 2404, the fields Name 722, Min Element# 725, and Max Element# 726 of the record Curr_Record 721 are respectively set as the local variables Curr_Name, Curr_Min and Curr_Max.

At step 2405, a test is performed to check if the local variable Curr_Name is equal to the function parameter ST_Name. If it is the case, then control is given to step 2409; otherwise control is given to step 2406.

At step 2406, a test is performed to chek if the record 721 Curr_Record is the last record of the STT table 720. If it is the case, then control is given to step 2408; otherwise control is given to step 2407.

At step 2407, the record following Curr_Record in the STT table 720 becomes the new record 721 Curr_Record. Then control is given to step 2404.

At step 2408, the local variable STI_Row is set equal to the value 0 (zero). Then control is given to step 2412.

At step 2409, the range of cells pointed by the description Ptr field 724 of the record 721 Curr_Record is set as STDT_address.

At step 2410, the local variable Element_Nbr is set equal to the input parameter STI_Element, upper bounded by the local variable Curr_Max, and minored by the local variable Curr_Min.

At step 2411, the local variable STI_row is set equal to the number of rows of the range of cells STDT_adress, incremented by the value of the local variable STI_Element, and decremented by 1 (one).

At step 2412, the execution of the STI_row function completes as control is returned to the function calller.

At step 2421, the second method is in its default state, waiting for a call to the STI_Col function.

At step 2422, the STI_Col function call is detected, as a result of a user action. The function is called with one parameter named ST_Name.

At step 2423, the first record 721 of the STT table 720 is set as Curr_Record.

At step 2424, the field Name 722 of the record Curr_Record 721 is set as the local variables Curr_Name.

At step 2425, a test is performed to check if the local variable Curr_Name is equal to the function parameter ST_Name. If it is the case, then control is given to step 2429; otherwise control is given to step 2426.

At step 2426, a test is performed to chek if the record 721 Curr_Record is the last record of the STT table 720. If it is the case, then control is given to step 2428; otherwise control is given to step 2427.

At step 2427, the record following Curr_Record in the STT table 720 becomes the new record 721 Curr_Record. Then control is given to step 2424.

At step 2428, the local variable STI_Row is set equal to the value 0 (zero). Then control is given to step 2431.

At step 2429, the range of cells pointed by the description Ptr field 724 of the record 721 Curr_Record is set as STDT_address.

At step 2430, the local variable STI_col is set equal to the number of columns of the range of cells STDT_adress.

At step 2431, the execution of the STI_col function completes as control is returned to the function callier.

Alternate Embodiments

The methods and systems according to the present invention may be used advantageously in those environments where elements of information are organized as vertically structured two dimensions tables.

The methods and systems according to the present invention may be used advantageously in those environments where elements of information are organized as multidimensional tables having more than two dimensions.

While the invention has been particularly shown and described with reference to a preferred embodiment, it will be understood that various changes in form and detail may be made therein without departing from the spirit, and scope of the invention.

What is claimed is:

1. A method for managing deletion operations in a recursive scalable template instance (RSTI) of a multi-dimensional electronic data table having a first data table dimension (D1) and a second data table dimension (D2), said RSTI comprising a plurality of contiguous recursive element instances (REIs) ordered and aligned along the dimension D1, at least two REIs having a different size along the dimension D1, each REI having a same size along the dimension D2, each REI comprising at least one scalable template instance (STI), said method implemented by execution of a computer program by a processor of a computer system, said method comprising:

deleting, upon satisfaction of a consistency condition, one or more contiguous elements in a first STI of at the least one STI of a first REI of the plurality of REIs of the RSTI, the RSTI structured according to an associated recursive scalable template (RST), said RST comprising a recursive element (RE) including at least one scalable template (ST), each STI of each REI structured according to an associated ST of the at least one ST, each STI of each REI having a first dimension aligned along the dimension D1 and a second dimension aligned along the dimension D2, an element being defined as a range of data that comprises at least one datum, all remaining elements in the first STI being contiguous after said deleting the one or more contiguous elements; and adjusting a size of the first REI along the dimension D1 according to a size of a largest STI in the first REI, all REIs of the RSTI remaining contiguous after said adjusting the size of the first REI.

2. The method of claim 1, wherein the at least one consistency condition has been satisfied, and wherein the method further comprises:

deleting the one or more contiguous elements in the first STI.

3. The method of claim 2, wherein the method further comprises after said deleting:

structuring each output cell of each remaining element of the first STI according to element profile (EP) defined in the first STI; and maintaining unchanged the content of each input cell of each said remaining element within the first STI.

4. The method of claim 1, wherein the RST comprises a header part and/or a footer part, the header part and/or the footer part of the RST comprising at least one recursive meta-elements (RME), wherein each RME comprises at least one ST, wherein the RSTI comprises a header part and/or a footer part, wherein the header part and/or the footer part of the RSTI corresponds to the header part and/or the footer part of the RST, wherein the header part and/or the footer part of the RSTI comprises at least one REI of the plurality of REIs of the RSTI, wherein the method further comprises:

deleting one or more contiguous meta-elements in a second STI of at the least one STI of a second REI of the at least one REI of the header part and/or the footer part of the RSTI, all remaining meta-elements in the second STI being contiguous after said deleting the one or more contiguous meta-elements; and adjusting a size of the second REI along the dimension D1 according to a size of a largest STI in the second REI, all REIs of the RSTI remaining contiguous after said adjusting the size of the second REI.

5. The method of claim 1, wherein the method further comprises:

determining whether said deleting one or more contiguous elements in the first STI of the RSTI would corrupt another RSTI in the data table, wherein said another RSTI is corrupted if said another RSTI is no longer structured according to its associated RST, and wherein said consistency condition is that said determining has determined that said deleting one or more contiguous elements in the first STI of the RSTI would corrupt said another RSTI in the data table.

6. The method of claim 5, wherein the method further comprises:

cancelling said deleting one or more contiguous elements in the first STI of the RSTI if said determining has determined that said deleting one or more contiguous elements in the first STI of the RSTI would corrupt said another RSTI, wherein said another RSTI has been defined as a critical RST.

7. The method of claim 1, wherein the method further comprises:

determining whether said deleting one or more contiguous elements in the first STI of the RSTI would corrupt another STI in the data table, wherein said another STI is corrupted if said another STI is no longer structured according to its associated ST, and wherein said consistency condition is that said determining has determined that said deleting one or more contiguous elements in the first STI of the RSTI would corrupt said another STI in the data table.

8. The method of claim 7, wherein the method further comprises:
cancelling said deleting one or more contiguous elements in the first STI of the RSTI if said determining has determined that said deleting one or more contiguous elements in the first STI of the RSTI would corrupt said another STI, wherein said another STI has been defined as a critical STI.

9. The method of claim 1, wherein the multidimensional electronic data table is an electronic spreadsheet having a plurality of dimensions and comprising a plurality of cells identified by a cell address along each dimension of the plurality of dimensions, and wherein the plurality of dimensions comprises the dimension D1 and the dimension D2.

10. The method of claim 1, wherein each STI of the at least one STI comprises contiguous elements of a same size ordered and aligned along the dimension D1 or D2, an element of each STI being defined as a range of cells, wherein the first ST comprises an element format (EF) and/or an element profile (EP), said EF defining for each cell within each element of the first ST at least one format attribute, said EP defining a cell content and a cell destination for each cell within each element of the first ST, said cell destination specifying whether the cell is an input cell for receiving an entry or an output cell for producing a result.

11. A computer system comprising a processor and a computer readable memory unit coupled to the processor via a system bus, said memory unit containing instructions that when executed by the processor implement a method for managing deletion operations in a recursive scalable template instance (RSTI) of a multi-dimensional electronic data table having a first data table dimension (D1) and a second data table dimension (D2), said RSTI comprising a plurality of contiguous recursive element instances (REIs) ordered and aligned along the dimension D1, at least two REIs having a different size along the dimension D1, each REI having a same size along the dimension D2, each REI comprising at least one scalable template instance (STI), said method comprising:
deleting, upon satisfaction of a consistency condition, one or more contiguous elements in a first STI of at the least one STI of a first REI of the plurality of REIs of the RSTI, the RSTI structured according to an associated recursive scalable template (RST), said RST comprising a recursive element (RE) including at least one scalable template (ST), each STI of each REI structured according to an associated ST of the at least one ST, each STI of each REI having a first dimension aligned along the dimension D1 and a second dimension aligned along the dimension D2, an element being defined as a range of data that comprises at least one datum, all remaining elements in the first STI being contiguous after said deleting the one or more contiguous elements; and
adjusting a size of the first REI along the dimension D1 according to a size of a largest STI in the first REI, all REIs of the RSTI remaining contiguous after said adjusting the size of the first REI.

12. The computer system of claim 11, wherein the at least one consistency condition has been satisfied, and wherein the method further comprises:
deleting the one or more contiguous elements in the first STI.

13. The computer system of claim 12, wherein the method further comprises after said deleting:

structuring each output cell of each remaining element of the first STI according to the element profile (EP) defined in the first STI; and
maintaining unchanged the content of each input cell of each said remaining element within the first STI.

14. The computer system of claim 11, wherein said RST comprises a header part and/or a footer part, the header part and/or the footer part of the RST comprising at least one recursive meta-elements (RME), wherein each RME comprises at least one ST, wherein the RSTI comprises a header part and/or a footer part, wherein the header part and/or the footer part of the RSTI corresponds to the header part and/or the footer part of the RST, wherein the header part and/or the footer part of the RSTI comprises at least one REI of the plurality of REIs of the RSTI, wherein the method further comprises:
deleting one or more contiguous meta-elements in a second STI of at the least one STI of a second REI of the at least one REI of the header part and/or the footer part of the RSTI, all remaining meta-elements in the second STI being contiguous after said deleting the one or more contiguous meta-elements; and
adjusting a size of the second REI along the dimension D1 according to a size of a largest STI in the second REI, all REIs of the RSTI remaining contiguous after said adjusting the size of the second REI.

15. The computer system of claim 11, wherein the method further comprises:
determining whether said deleting one or more contiguous elements in the first STI of the RSTI would corrupt another RSTI in the data table, wherein said another RSTI is corrupted if said another RSTI is no longer structured according to its associated RST, and wherein said consistency condition is that said determining has determined that said deleting one or more contiguous elements in the first STI of the RSTI would corrupt said another RSTI in the data table.

16. The computer system of claim 15, wherein the method further comprises:
cancelling said deleting one or more contiguous elements in the first STI of the RSTI if said determining has determined that said deleting one or more contiguous elements in the first STI of the RSTI would corrupt said another RSTI, wherein said another RSTI has been defined as a critical RST.

17. The computer system of claim 11, wherein the method further comprises:
determining whether said deleting one or more contiguous elements in the first STI of the RSTI would corrupt another STI in the data table, wherein a said another STI is corrupted when if said another STI is no longer structured according to its associated ST, and wherein said consistency condition is that said determining has determined that said deleting one or more contiguous elements in the first STI of the RSTI would corrupt said another STI in the data table.

18. The computer system of claim 17, wherein the method further comprises:
cancelling said deleting one or more contiguous elements in the first STI of the RSTI if said determining has determined that said deleting one or more contiguous elements in the first STI of the RSTI would corrupt said another STI, wherein said another STI has been defined as a critical STI.

19. The computer system of claim 11, wherein said multi-dimensional electronic data table is an electronic spreadsheet having a plurality of dimensions and comprising a plurality of cells identified by a cell address along each dimension of the plurality of dimensions, and wherein the plurality of dimensions comprises the dimension D1 and the dimension D2.

20. The computer system of claim 11, wherein each STI of the at least one STI comprises contiguous elements of a same size ordered and aligned along the dimension D1 or D2, an element of each STI being defined as a range of cells, said first ST comprising an element format (EF) and/or an element profile (EP), said EF defining for each cell within each element of the first ST at least one format attribute said EP defining a cell content and a cell destination for each cell within each element of the first ST, said cell destination specifying whether the cell is an input cell for receiving an entry or an output cell for producing a result.

21. A computer program stored in a computer readable memory unit, said computer program comprising instructions that when executed by a processor of a computer system implement a method for managing deletion operations in a recursive scalable template instance (RSTI) of a multi-dimensional electronic data table having a first data table dimension (D1) and a second data table dimension (D2), said RSTI comprising a plurality of contiguous recursive element instances (REIs) ordered and aligned along the dimension D1, at least two REIs having a different size along the dimension D1, each REI having a same size along the dimension D2, each REI comprising at least one scalable template instance (STI), said method comprising:
   deleting, upon satisfaction of a consistency condition, one or more contiguous elements in a first STI of at the least one STI of a first RET of the plurality of REIs of the RSTI, the RSTI structured according to an associated recursive scalable template (RST), said RST comprising a recursive element (RE) including at least one scalable template (ST), each STI of each REI structured according to an associated ST of the at least one ST, each STI of each REI having a first dimension aligned along the dimension D1 and a second dimension aligned along the dimension D2, an element being defined as a range of data that comprises at least one datum, all remaining elements in the first STI being contiguous after said deleting the one or more contiguous elements; and
   adjusting a size of the first REI along the dimension D1 according to a size of a largest STI in the first RET, all REIs of the RSTI remaining contiguous after said adjusting the size of the first REI.

22. The computer program of claim 21, wherein the at least one consistency condition has been satisfied, and wherein the method further comprises:
   deleting the one or more contiguous elements in the first STI.

23. The computer program of claim 22, wherein the method further comprises after said deleting:
   structuring each output cell of each remaining element of the first STI according to the element profile (EP) defined in the first STI; and
   maintaining unchanged the content of each input cell of each said remaining element within the first STI.

24. The computer program of claim 21, wherein said RST comprises a header part and/or a footer part, the header part and/or the footer part of the RST comprising at least one recursive meta-elements (RME), wherein each RME comprises at least one ST, wherein the RSTI comprises a header part and/or a footer part, wherein the header part and/or the footer part of the RSTI corresponds to the header part and/or the footer part of the RST, wherein the header part and/or the footer part of the RSTI comprises at least one REI of the plurality of REIs of the RSTI, wherein the method further comprises:
   deleting one or more contiguous meta-elements in a second STI of at the least one STI of a second REI of the at least one REI of the header part and/or the footer part of the RSTI, all remaining meta-elements in the second STI being contiguous after said deleting the one or more contiguous meta-elements; and
   adjusting a size of the second REI along the dimension D1 according to a size of a largest STI in the second REI, all REIs of the RSTI remaining contiguous after said adjusting the size of the second REI.

25. The computer program of claim 21, wherein the method further comprises:
   determining whether said deleting one or more contiguous elements in the first STI of the RSTI would corrupt another RSTI in the data table, wherein said another RSTI is corrupted if said another RSTI is no longer structured according to its associated RST, and wherein said consistency condition is that said determining has determined that said deleting one or more contiguous elements in the first STI of the RSTI would corrupt said another RSTI in the data table.

26. The computer program of claim 25, wherein the method further comprises:
   cancelling said deleting one or more contiguous elements in the first STI of the RSTI if said determining has determined that said deleting one or more contiguous elements in the first STI of the RSTI would corrupt said another RSTI, wherein said another RSTI has been defined as a critical RST.

27. The computer program of claim 21, wherein the method further comprises:
   determining whether said deleting one or more contiguous elements in the first STI of the RSTI would corrupt another STI in the data table, wherein a said another STI is corrupted when if said another STI is no longer structured according to its associated ST, and wherein said consistency condition is that said determining has determined that said deleting one or more contiguous elements in the first STI of the RSTI would corrupt said another STI in the data table.

28. The computer program of claim 27, wherein the method further comprises:
   cancelling said deleting one or more contiguous elements in the first STI of the RSTI if said determining has determined that said deleting one or more contiguous elements in the first STI of the RSTI would corrupt said another STI, wherein said another STI has been defined as a critical STI.

29. The computer program of claim 21, wherein said multidimensional electronic data table is an electronic spreadsheet having a plurality of dimensions and comprising a plurality of cells identified by a cell address along each dimension of the plurality of dimensions, and wherein the plurality of dimensions comprises the dimension D1 and the dimension D2.

30. The computer program of claim 21, wherein each STI of the at least one STI comprises contiguous elements of a same size ordered and aligned along the dimension D1 or D2, an element of each STI being defined as a range of cells, said first ST comprising an element format (EF) and/or an element profile (EP), said EF defining for each cell within each element of the first ST at least one format attribute said EP defining a cell content and a cell destination for each cell within each element of the first ST, said cell destination specifying whether the cell is an input cell for receiving an entry or an output cell for producing a result.

* * * * *